United States Patent
Klein et al.

(10) Patent No.: US 11,074,525 B2
(45) Date of Patent: *Jul. 27, 2021

(54) AUTOMATIC ALLOCATION OF PHYSICAL FACILITIES

(71) Applicant: AT&T Intellectual Property I, L.P., Atlanta, GA (US)

(72) Inventors: Craig Arthur Klein, San Antonio, TX (US); Gregory O. Harp, Allen, TX (US); Joseph Eric Sineath, Orange Park, FL (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 184 days.

This patent is subject to a terminal disclaimer.

(21) Appl. No.: 16/368,918

(22) Filed: Mar. 29, 2019

(65) Prior Publication Data

US 2019/0228350 A1 Jul. 25, 2019

Related U.S. Application Data

(63) Continuation of application No. 14/684,338, filed on Apr. 11, 2015, now Pat. No. 10,296,851.

(51) Int. Cl.
*G06Q 10/02* (2012.01)
*H04W 8/00* (2009.01)
*H04W 8/02* (2009.01)

(52) U.S. Cl.
CPC ........... *G06Q 10/02* (2013.01); *H04W 8/005* (2013.01); *H04W 8/02* (2013.01)

(58) Field of Classification Search
None
See application file for complete search history.

(56) References Cited

U.S. PATENT DOCUMENTS

| | | |
|---|---|---|
| 7,035,650 B1 | 4/2006 | Moskowitz |
| 7,130,630 B1 | 10/2006 | Enzmann |
| 7,203,497 B2 | 4/2007 | Belcea |
| 7,245,900 B1 | 7/2007 | Lamb |
| 7,315,949 B1 | 1/2008 | Cortopassi et al. |
| 7,428,571 B2 | 9/2008 | Ichimura |
| 8,040,216 B2 | 10/2011 | Jordan et al. |
| 8,320,939 B1 | 11/2012 | Vincent |
| 8,559,979 B2 | 10/2013 | Gonzales |
| 8,618,931 B2 | 12/2013 | Rossmann et al. |
| 8,749,392 B2 | 6/2014 | Wedig |

(Continued)

FOREIGN PATENT DOCUMENTS

| | | |
|---|---|---|
| CN | 103780867 | 5/2014 |
| CN | 103068039 | 4/2015 |

(Continued)

*Primary Examiner* — Paul Danneman
(74) *Attorney, Agent, or Firm* — Guntin & Gust, PLC; Jay H. Anderson

(57) ABSTRACT

Physical space is allocated to members of a group to maximize collaborative efforts. Each member of the group is determined based on presence or detection of a wireless device. As the members of the group are wirelessly detected, physical space may be assigned based on historical usage, calendar entries, physical needs, and infrastructure traits. Desks, office space, conference rooms, and other facilities may thus be dynamically reserved to maximize collaboration and yet efficiently utilize existing physical spaces.

20 Claims, 44 Drawing Sheets

(56) References Cited

U.S. PATENT DOCUMENTS

| | | | |
|---|---|---|---|
| 8,922,433 B2 | 12/2014 | Whiting et al. | |
| 9,080,883 B2 | 7/2015 | Frey | |
| 9,135,612 B1 | 9/2015 | Proctor, Jr. | |
| 9,563,991 B2 | 2/2017 | Menzel | |
| 9,582,841 B2 | 2/2017 | Klein | |
| 9,813,886 B2 | 11/2017 | Klein | |
| 9,824,515 B2 | 11/2017 | Klein | |
| 9,972,144 B2 | 5/2018 | Klein | |
| 10,021,552 B2 | 7/2018 | Klein | |
| 10,296,851 B2 * | 5/2019 | Klein | H04W 8/005 |
| 2002/0169539 A1 | 11/2002 | Menard | |
| 2003/0060212 A1 | 3/2003 | Thomas | |
| 2003/0103075 A1 | 6/2003 | Rosselot | |
| 2004/0006697 A1 | 1/2004 | Noyama | |
| 2004/0160909 A1 | 8/2004 | Sheynblat | |
| 2004/0201470 A1 | 10/2004 | Reed | |
| 2005/0014522 A1 | 1/2005 | Tirabassi | |
| 2005/0032532 A1 | 2/2005 | Kokkonen | |
| 2005/0048990 A1 | 3/2005 | Lauriol | |
| 2005/0148340 A1 | 7/2005 | Guyot | |
| 2006/0211432 A1 | 9/2006 | Kokkonen | |
| 2006/0273878 A1 | 12/2006 | Michmerhuizen | |
| 2007/0049259 A1 | 3/2007 | Onishi | |
| 2008/0045232 A1 | 2/2008 | Cone | |
| 2008/0057873 A1 | 3/2008 | Huang et al. | |
| 2008/0102859 A1 | 5/2008 | Karr | |
| 2008/0195665 A1 | 8/2008 | Mason | |
| 2009/0027165 A1 | 1/2009 | Cristache | |
| 2009/0027203 A1 | 1/2009 | Cristache | |
| 2009/0138353 A1 | 5/2009 | Mendelson | |
| 2009/0170468 A1 | 7/2009 | Kane | |
| 2009/0177336 A1 | 7/2009 | McClellan | |
| 2009/0247116 A1 | 10/2009 | Sennett | |
| 2009/0270065 A1 | 10/2009 | Hamada | |
| 2010/0069086 A1 | 3/2010 | Ahlin | |
| 2010/0075656 A1 | 3/2010 | Howarter | |
| 2010/0136945 A1 | 6/2010 | Givens | |
| 2010/0164732 A1 | 7/2010 | Wedig | |
| 2010/0246522 A1 | 9/2010 | Hirose | |
| 2010/0267389 A1 | 10/2010 | Gallagher et al. | |
| 2010/0267398 A1 | 10/2010 | Kim | |
| 2010/0321722 A1 | 12/2010 | Koga | |
| 2011/0103360 A1 | 5/2011 | Ku | |
| 2011/0130636 A1 | 6/2011 | Daniel | |
| 2011/0136463 A1 | 6/2011 | Ebdon | |
| 2011/0254659 A1 | 10/2011 | Bowen | |
| 2012/0047083 A1 | 2/2012 | Qiao | |
| 2012/0068818 A1 | 3/2012 | Mizon | |
| 2012/0072106 A1 | 3/2012 | Han | |
| 2012/0075068 A1 | 3/2012 | Walker | |
| 2012/0077438 A1 | 3/2012 | Jung | |
| 2012/0077468 A1 | 3/2012 | Fan | |
| 2012/0108259 A1 | 5/2012 | Weiss | |
| 2012/0154148 A1 | 6/2012 | Mohandes | |
| 2012/0157113 A1 | 6/2012 | Brisebois | |
| 2012/0268243 A1 | 10/2012 | Kappeler | |
| 2012/0280789 A1 | 11/2012 | Gerhardt | |
| 2013/0225115 A1 | 8/2013 | Sasaki | |
| 2013/0262223 A1 | 10/2013 | Catane et al. | |
| 2013/0339478 A1 | 12/2013 | Edge | |
| 2014/0087686 A1 | 3/2014 | Lee | |
| 2014/0149771 A1 | 5/2014 | Krishna | |
| 2014/0222562 A1 | 8/2014 | Akgul | |
| 2014/0232522 A1 | 8/2014 | Schmidt-Lackner et al. | |
| 2014/0235266 A1 | 8/2014 | Edge et al. | |
| 2014/0253285 A1 | 9/2014 | Menzel | |
| 2014/0253326 A1 | 9/2014 | Cho | |
| 2014/0273910 A1 | 9/2014 | Ballantyne | |
| 2014/0287745 A1 | 9/2014 | Edwards | |
| 2014/0293865 A1 | 10/2014 | Shi | |
| 2014/0335823 A1 | 11/2014 | Heredia | |
| 2014/0357307 A1 | 12/2014 | Zwaal | |
| 2015/0045054 A1 | 2/2015 | Emadzadeh et al. | |
| 2015/0067792 A1 | 3/2015 | Benoit | |
| 2015/0075914 A1 | 3/2015 | Armistead | |
| 2015/0098442 A1 | 4/2015 | Shatsky et al. | |
| 2015/0160328 A1 | 6/2015 | Peinhardt | |
| 2015/0179012 A1 | 6/2015 | Sharpe | |
| 2015/0181548 A1 | 6/2015 | Varoglu | |
| 2015/0228153 A1 | 8/2015 | Hedrick | |
| 2015/0281960 A1 | 10/2015 | Keisala | |
| 2015/0327039 A1 | 11/2015 | Jain | |
| 2015/0334530 A1 | 11/2015 | Scott | |
| 2016/0035160 A1 | 2/2016 | Friedli | |
| 2016/0044466 A1 | 2/2016 | Branson | |
| 2016/0088658 A1 | 3/2016 | Padden | |
| 2016/0127878 A1 | 5/2016 | Clarke | |
| 2016/0162706 A1 | 6/2016 | Famulari | |
| 2016/0192163 A1 | 6/2016 | Miner | |
| 2016/0205514 A1 | 7/2016 | Ikeda | |
| 2016/0247105 A1 | 8/2016 | Vaze | |
| 2016/0300160 A1 | 10/2016 | Klein | |
| 2017/0019755 A1 | 1/2017 | Thacher | |
| 2017/0147189 A1 | 5/2017 | Ryu | |

FOREIGN PATENT DOCUMENTS

| | | |
|---|---|---|
| JP | 11295097 A | 10/1999 |
| JP | 2012087462 A | 5/2012 |
| WO | WO 2010150031 | 12/2010 |

* cited by examiner

AUTOMATIC ALLOCATION OF PHYSICAL FACILITIES

CROSS-REFERENCE TO RELATED APPLICATION

This application is a continuation of U.S. application Ser. No. 14/684,338 filed Apr. 11, 2015 and since issued as U.S. Patent X, which is incorporated herein by reference in its entirety.

BACKGROUND

Physical space is often wasted. When physical space is allocated to a group of people, conventional planning allocates the physical space for the entire group. That is, the physical space is planned for one hundred percent (100%) capacity. Most times, though, only a smaller percentage of the group is present at any time. People may be absent due to vacation, business travel, training, weather, illness, and many other factors. Inefficient allocation of physical space also detracts from collaborative efforts, which further introduces inefficiencies.

BRIEF DESCRIPTION OF THE SEVERAL VIEWS OF THE DRAWINGS

The features, aspects, and advantages of the exemplary embodiments are understood when the following Detailed Description is read with reference to the accompanying drawings, wherein.

DETAILED DESCRIPTION

The exemplary embodiments will now be described more fully hereinafter with reference to the accompanying drawings. The exemplary embodiments may, however, be embodied in many different forms and should not be construed as limited to the embodiments set forth herein. These embodiments are provided so that this disclosure will be thorough and complete and will fully convey the exemplary embodiments to those of ordinary skill in the art. Moreover, all statements herein reciting embodiments, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, illustrations, and the like represent conceptual views or processes illustrating the exemplary embodiments. The functions of the various elements shown in the figures may be provided through the use of dedicated hardware as well as hardware capable of executing associated software. Those of ordinary skill in the art further understand that the exemplary hardware, software, processes, methods, and/or operating systems described herein are for illustrative purposes and, thus, are not intended to be limited to any particular named manufacturer.

As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. Furthermore, "connected" or "coupled" as used herein may include wirelessly connected or coupled. As used herein, the term "and/or" includes any and all combinations of one or more of the associated listed items.

It will also be understood that, although the terms first, second, etc. may be used herein to describe various elements, these elements should not be limited by these terms. These terms are only used to distinguish one element from another. For example, a first device could be termed a second device, and, similarly, a second device could be termed a first device without departing from the teachings of the disclosure.

Figure 1:
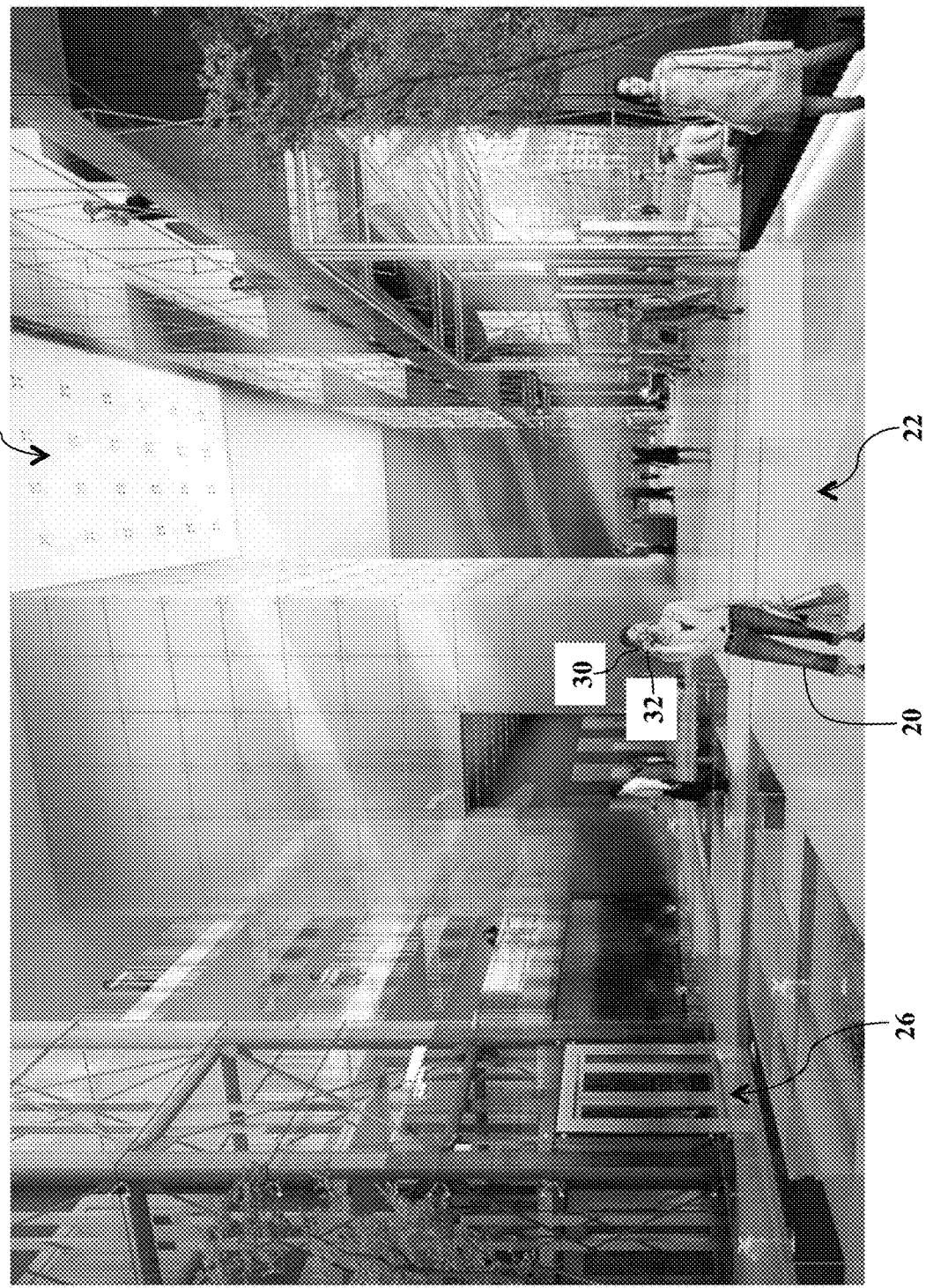
FIGS. 1-7 are simplified schematics illustrating an environment in which exemplary embodiments may be implemented.

FIGS. 1-7 are simplified schematics illustrating an environment in which exemplary embodiments may be implemented. FIG. 1 illustrates a human user 20 in a lobby 22 of a building 24. The human user 20 may be an employee working within the building 24, or the human may be visiting someone within the building 24. The human user 20, in short, may be an employee, a visitor, a contractor, a tenant, or a guest requesting entry into the building 24. For simplicity, the human user 20 will mainly be described as a visitor. When the visitor 20 wishes to enter an elevator 26 and proceed into secure areas of the building 24, the visitor 20 usually must check-in with a security guard. Here, though, exemplary embodiments detect the wireless presence of the visitor's mobile device 30, such as her smartphone 32. That is, if the visitor's smartphone 32 is recognized, then exemplary embodiments may permit entry of the visitor 20 to the secure areas within the building 24. However, if the visitor's smartphone 32 is unrecognized, then exemplary embodiments may require more authentication credentials or additional measures, as later paragraphs will explain.

Figure 2:
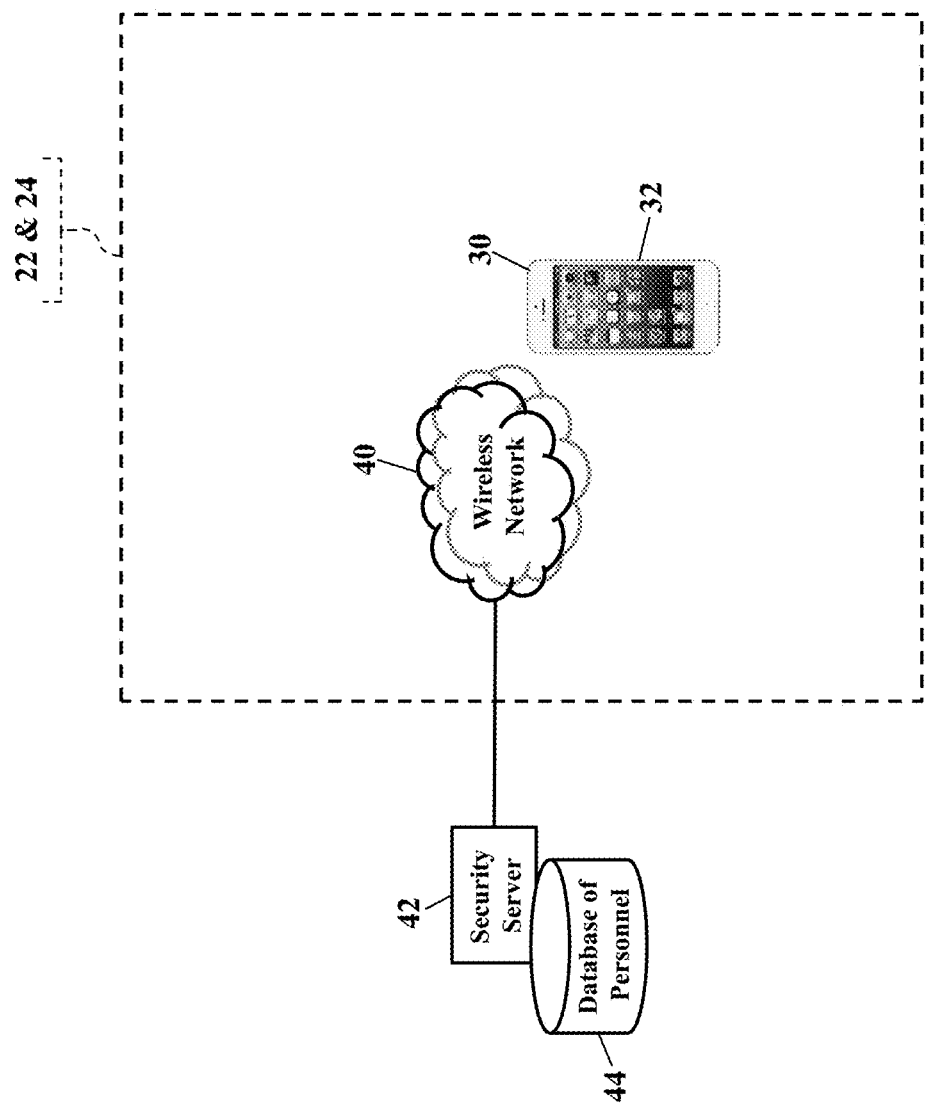

FIG. 2 illustrates wireless presence. When the visitor enters some area (such as the lobby 22 or other area of the building 24), the visitor's smartphone 32 may attempt to access a wireless network 40 serving the lobby 22. As the reader likely understands, many people carry a smartphone that interfaces with wireless networks. So, when the visitor's smartphone 32 enters the lobby 22, the smartphone 32 may establish wireless communication with the wireless network 40 serving the lobby 22. The smartphone 32, for example, may request access or permission to a local area wireless fidelity (or WI-FI®) network serving the lobby 22 or any other area.

A security server 42 may be consulted. Once the wireless network 40 detects the radio presence of the visitor's smartphone 32, the security server 42 may determine whether the visitor 20 is authorized for entry, based on the wireless presence of the visitor's smartphone 32. For example, the security server 42 may consult a database 44 of personnel. The database 44 of personnel may store names, addresses, and/or other information for personnel who are authorized to enter the secure area of the building 24. The database 44 of personnel, however, may be arranged according to mobile devices. That is, the database 44 of personnel may store database associations between different names or identities of people and different unique identifiers of their mobile devices. If an entry in the database 44 of personnel matches the unique identifier of the visitor's smartphone 32, then the corresponding visitor 20 is authorized entry. Employees and tenants may thus quickly and easily enter the building, merely based on wireless recognition of their mobile devices.

Figure 3:
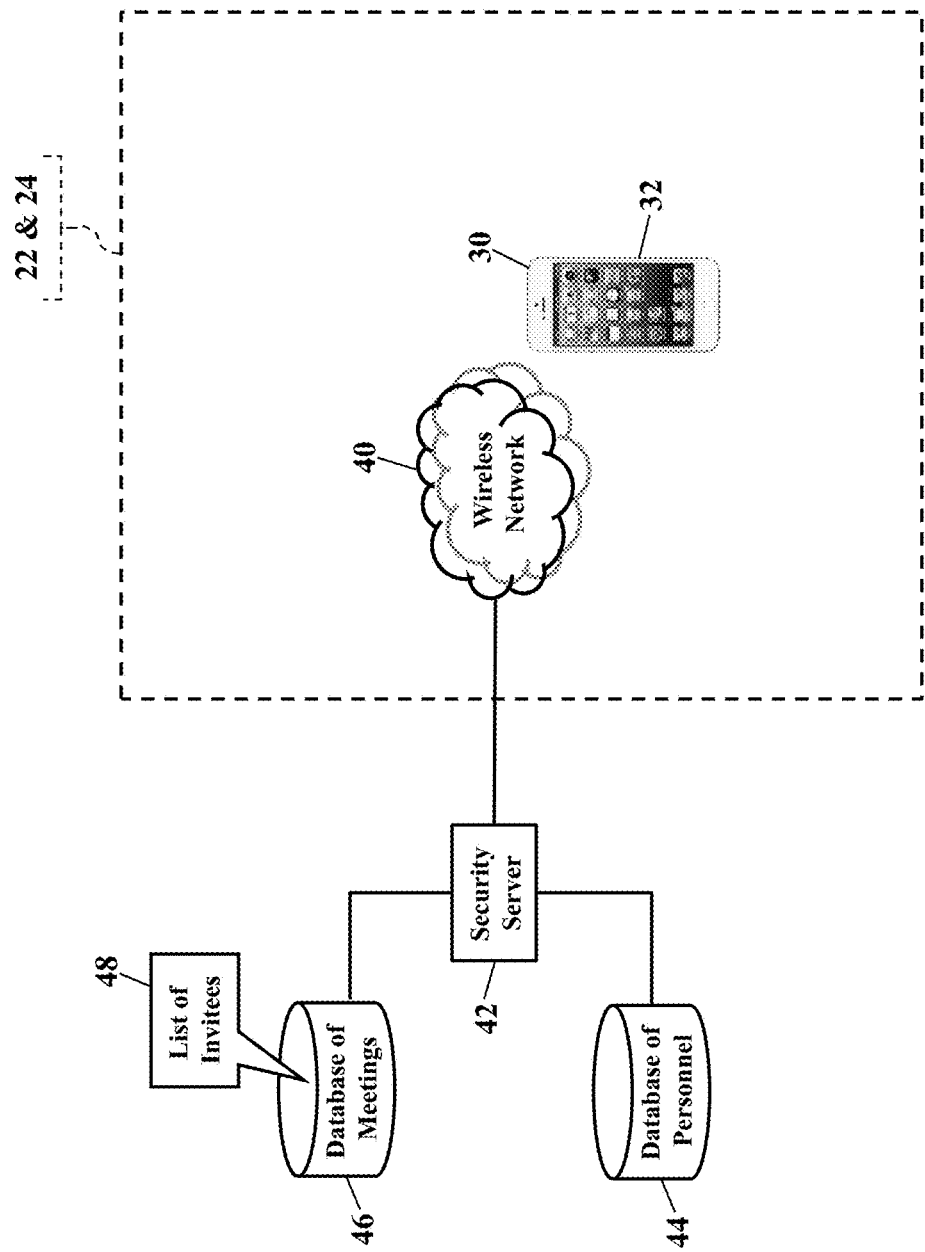

FIG. 3 further illustrates secure access. If the smartphone 32 is not matched to the database 44 of personnel, the visitor may still be granted access for legitimate purposes. For example, the visitor may be a supplier or contractor attending a meeting within the building 24. When the wireless network 40 detects the frequency presence of the visitor's smartphone 32, the security server 42 may consult a database 46 of meetings. The database 46 of meetings stores different meetings that are scheduled or calendared within the building 24. Each meeting may have an associated list 48 of invitees who are authorized to attend the meeting. Each invitee, however, may be identified according to his or her mobile device 30. That is, each invitee may be identified by a unique cellular identifier associated with, or assigned to, their cellular mobile device (such as the smartphone 32). The database 46 of meetings may thus store database associations between different scheduled meetings and different unique identifiers of the invitees' mobile devices 30. If an entry in the database 46 of meetings matches the unique identifier of the visitor's smartphone 32, then the corresponding human visitor may be authorized for entry to attend the corresponding meeting. Supplier personnel, contractors, and other invitees may thus quickly and easily enter the building, based on wireless recognition of their smartphones 32.

Figure 4:
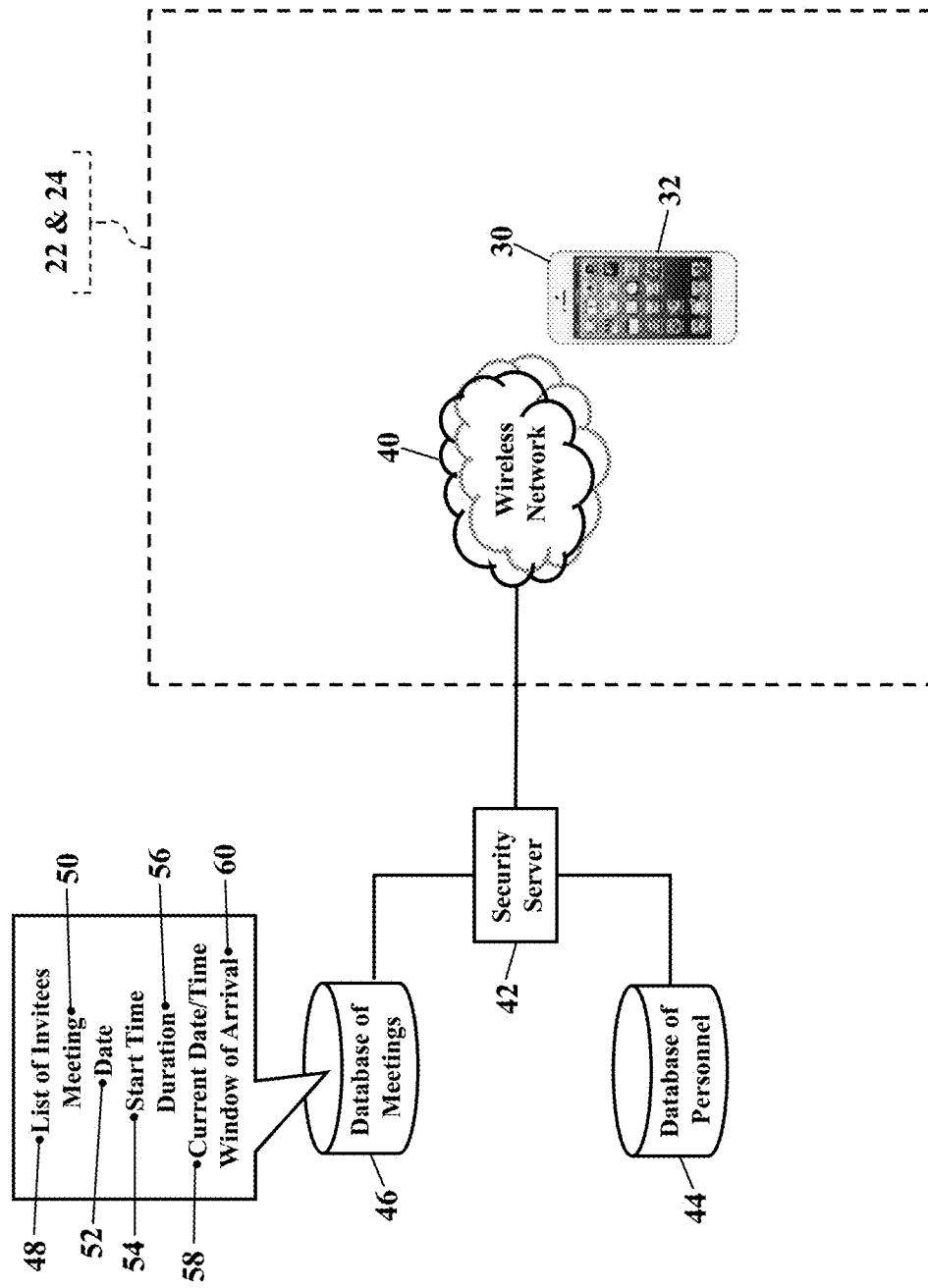

FIG. 4 further illustrates the database 46 of meetings. Here invitees may be more limited in the dates and times of their access. As FIG. 4 illustrates, each meeting 50 may also be associated with a date 52, a start time 54, and a duration 56. Even though the visitor's smartphone 32 may be matched as an invitee to the meeting 50, the visitor may still be denied access. For example, when the visitor's smartphone 32 requests access to the wireless network 40, a current date and time 58 may be time stamped. If the current date and time 58 does not match the scheduled date 52 of the meeting 50, then entry may be denied. Furthermore, if the smartphone 32 requests wireless access (to the wireless network 40) too early or too late for the scheduled meeting 50, then entry may be denied. The scheduled meeting 50 may thus have a window 60 of arrival, before or after which the visitor may not enter. So, even though a supplier or contractor is authorized for entry, admittance may be limited to nearly the scheduled date 52 and start time 54 of the meeting 50. The user of the smartphone 32 may thus be authorized for physical entry, but exemplary embodiments may require that the user wait until the window 60 of arrival is satisfied. Similarly, when the meeting 50 ends (perhaps at a stop time calculated using the duration 56), the visitor's smartphone 32 may not linger. Exemplary embodiments may thus continue tracking the smartphone 32 (as later paragraphs will explain) during and after the meeting 50 to ensure the visitor does not afterwards linger too long. If the attending visitor lingers too long after the meeting 50, exemplary embodiments may deny exit from the building, as a security precaution.

Figure 5:
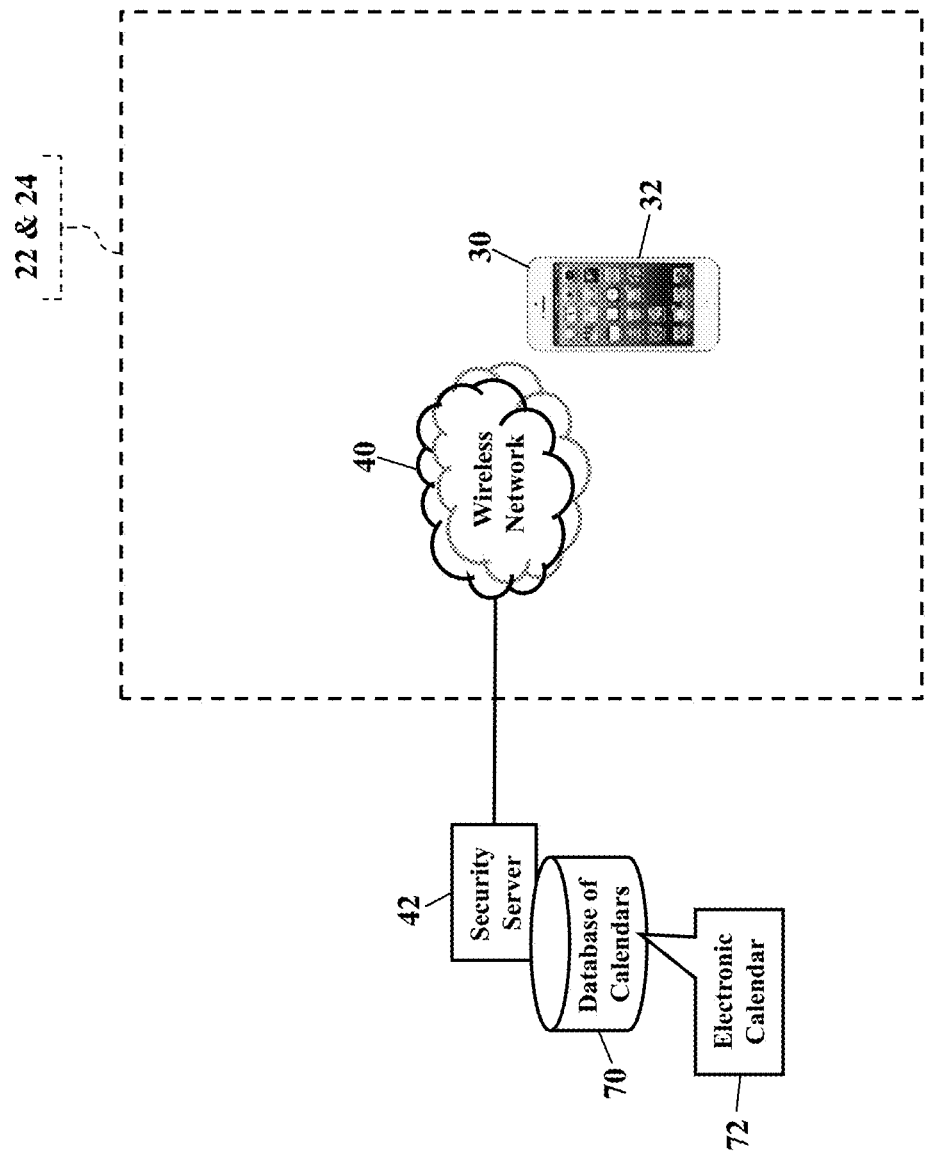

FIG. 5 illustrates a database 70 of calendars. Here the visitor's smartphone 32 may be matched to an individual employee's electronic calendar 72. As the reader likely understands, many employees maintain their electronic calendars in a central location (such as an enterprise server database). The database 70 of calendars, in other words, stores different electronic calendars for different users (such as the employees and/or tenants in the building 24). When the wireless network 40 detects the radio presence of the smartphone 32, the security server 42 may query the database 70 of calendars for the unique identifier of the smartphone 32. If a matching calendar entry is determined, then the smartphone 32 is calendared to meet an employee or tenant inside the building. Exemplary embodiment may thus authorize entry, based on wireless network recognition of the visitor's smartphone 32.

Figure 6:
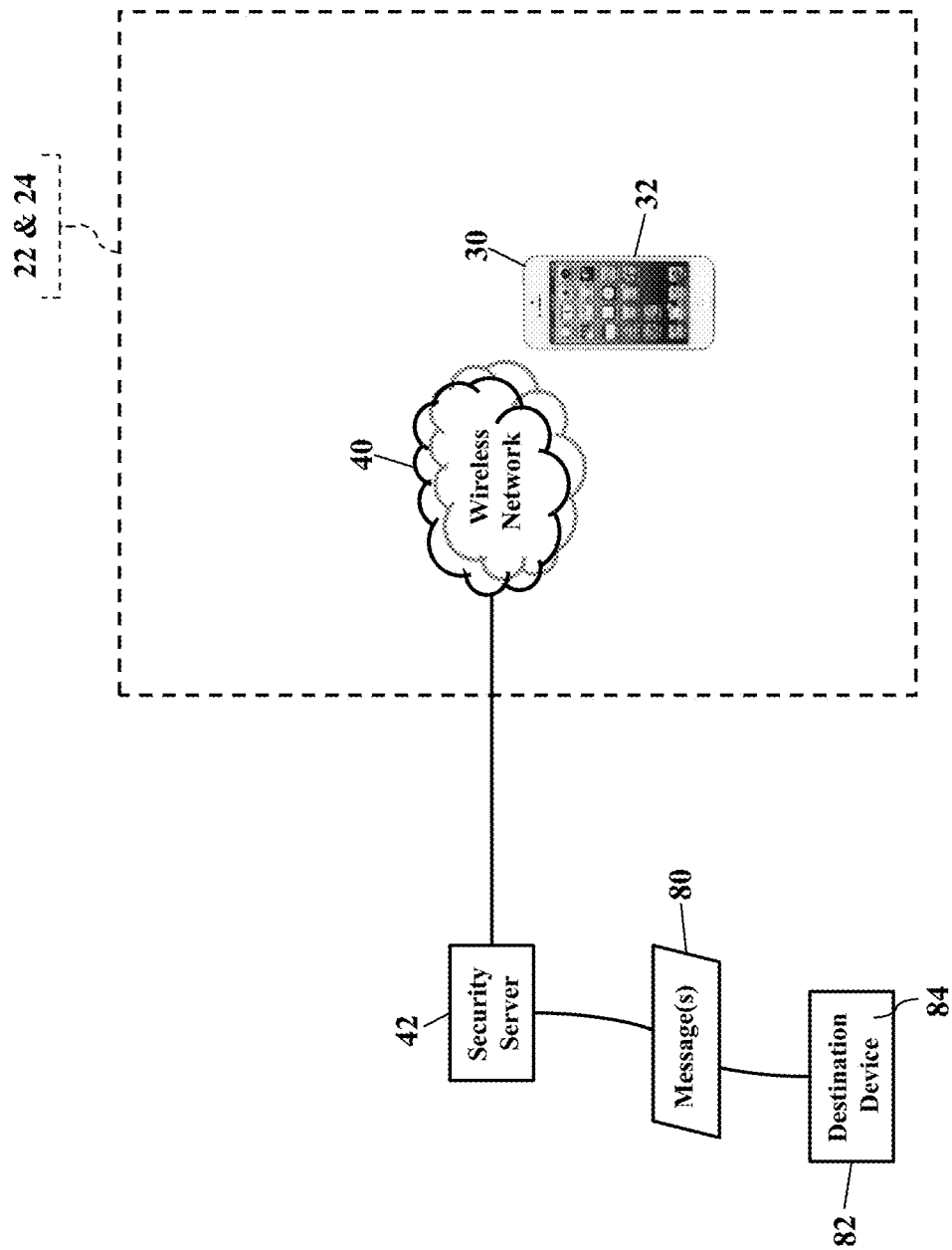

FIG. 6 illustrates notification. Once the security server 42 authorizes the visitor's smartphone 32, electronic notifications may be sent. The security server 42 may thus generate and send one or more electronic messages 80 to destination devices 82 associated with different destination addresses 84, thus alerting of the visitor's entry into the building. An employee, for example, may be alerted to the visitor's arrival. Other meeting invitees may also be notified, using the unique identifier assigned to their respective smartphones.

Figure 7:
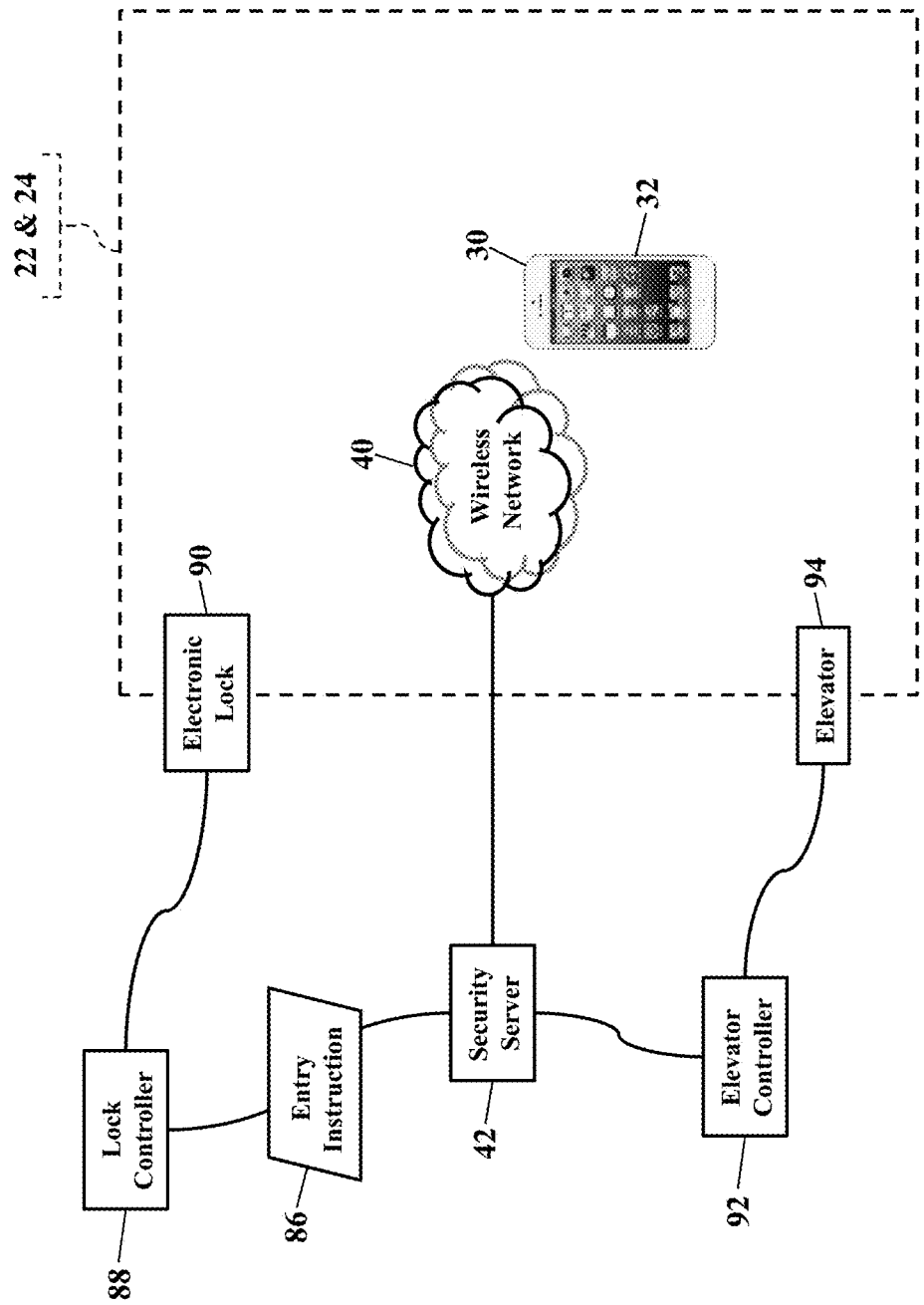

FIG. 7 illustrates entry. Once the security server 42 authorizes the visitor's smartphone 32, the corresponding visitor may enter the secure area. The security server 42 may thus generate an electronic entry instruction 86 to allow physical entry. The entry instruction 86 is then sent as packets of data to any destination device. FIG. 7, for example, illustrates the entry instruction 86 routing to a network address assigned to a lock controller 88. The lock controller 88 manages an electronic lock 90 securing some door or gate. The entry instruction 86 instructs the lock controller 88 to activate or unlock the electronic lock 90, thus allowing the visitor to physically enter the building 24 and/or some floor within the building 22. The security server 42 may further instruct an elevator controller 92 to summon an elevator 94, thus lifting the visitor to some floor or level, as later paragraphs will explain. The security server 42 may also monitor or track the movement of the visitor's smartphone 32 to prevent frolic or unauthorized detours (as later paragraphs will also explain).

Exemplary embodiments thus synchronize entry with wireless detection. Wireless detection of any mobile device 30 may thus be used to authorize entry to secure areas. Even though FIGS. 1-7 primarily illustrate the visitor's smartphone 32, exemplary embodiments may utilize any wired or wireless device (as later paragraphs will explain). Indeed, badges, watches, and other wearable smart devices may be wirelessly detected to permit access. Integration with personnel directories and calendaring systems further defines permissible locations of visitors.

Figure 8:
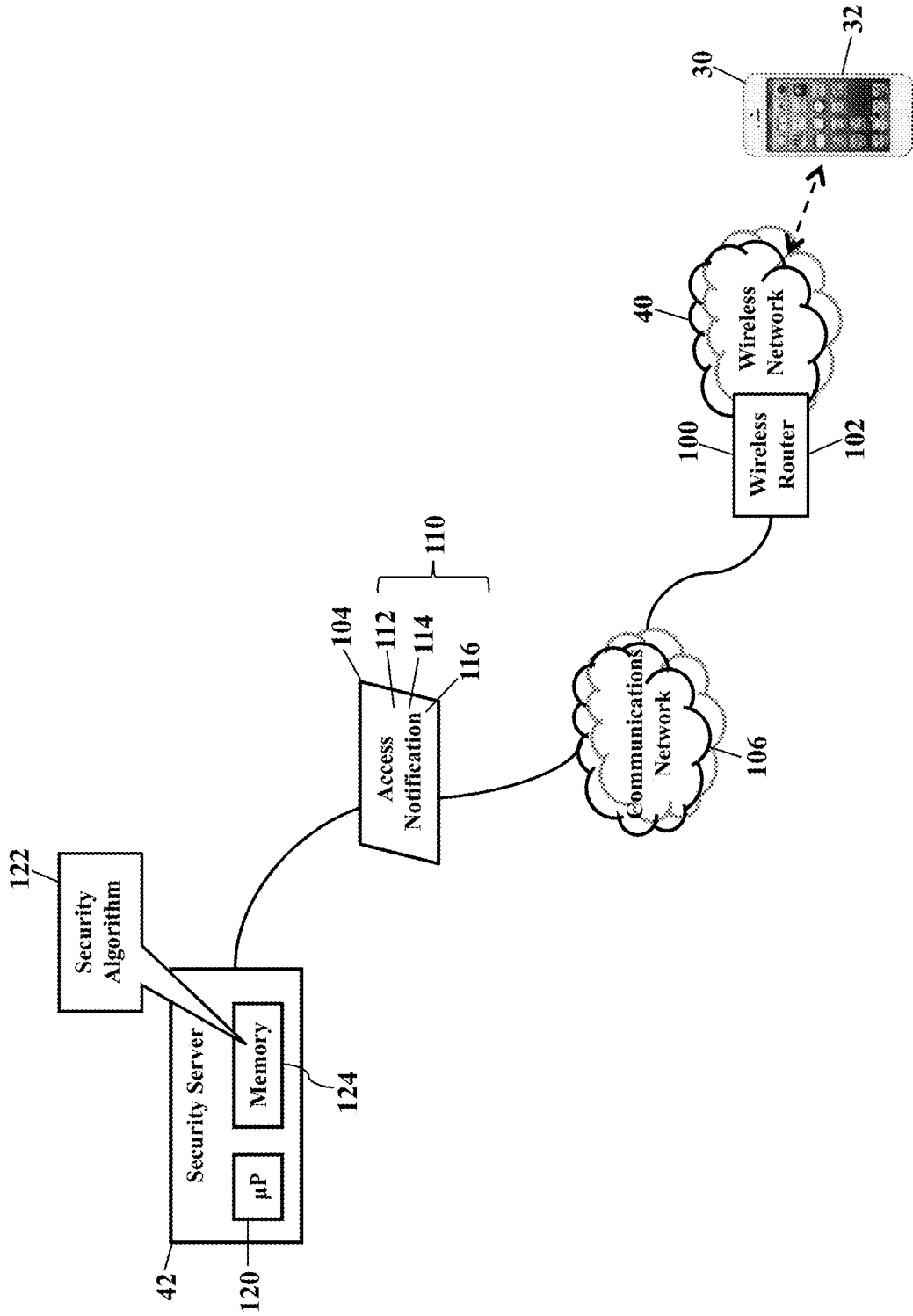
FIGS. 8-10 are more detailed block diagrams illustrating the operating environment, according to exemplary embodiments.
Figure 9:
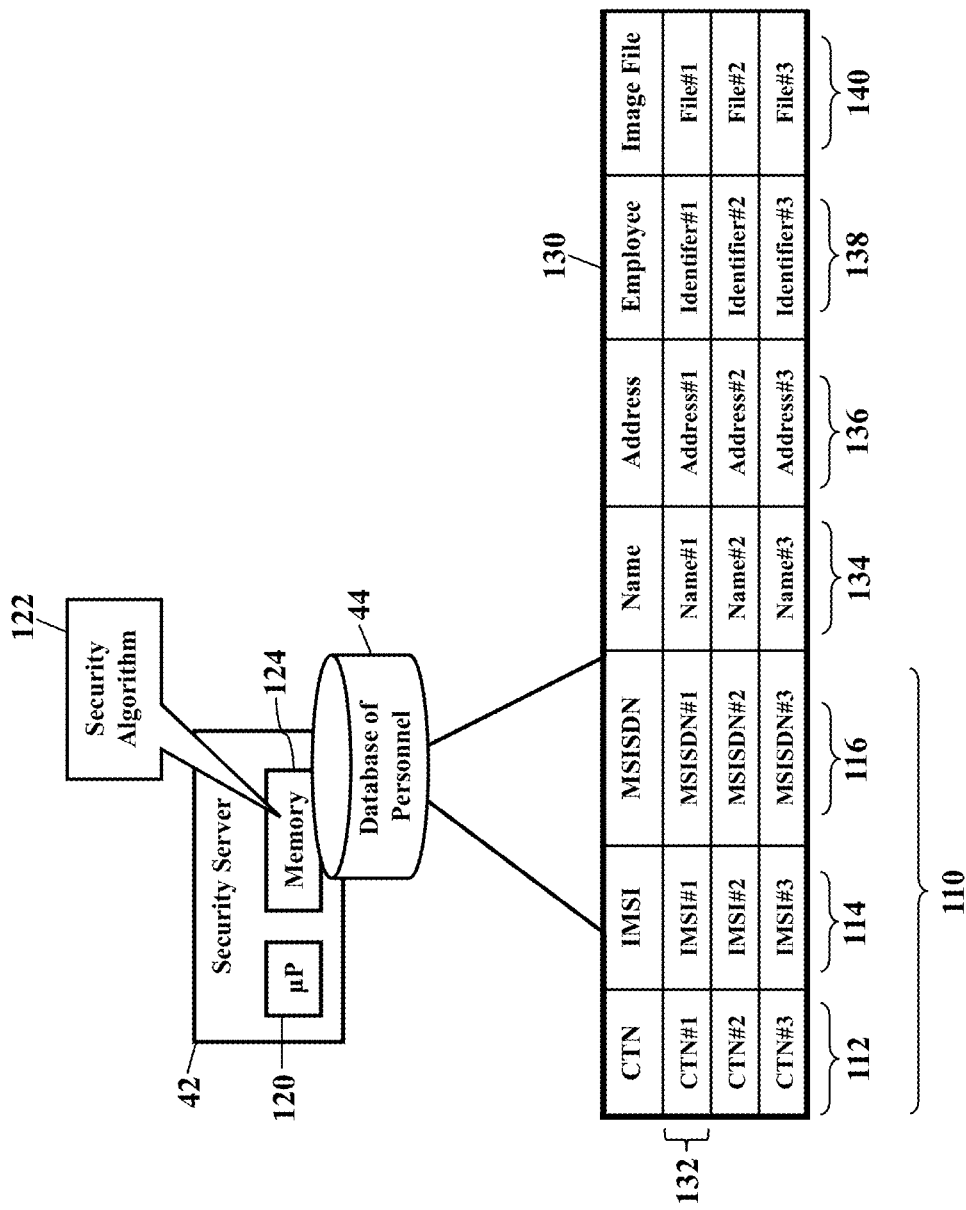
Figure 10:
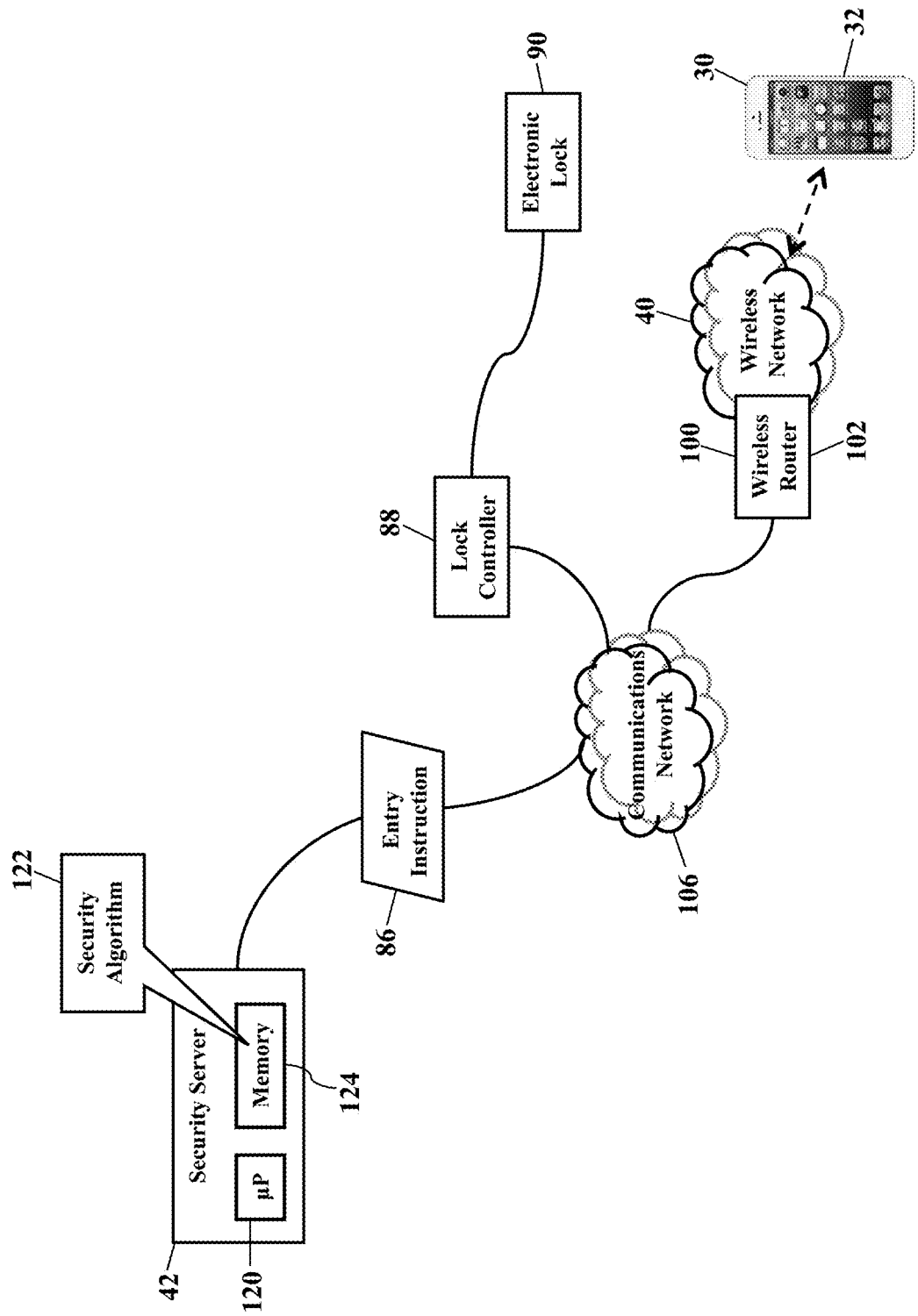

FIGS. 8-10 are more detailed block diagrams illustrating the operating environment, according to exemplary embodiments. FIG. 8 illustrates presence detection of the visitor's smartphone 32. When the smartphone 32 enters any area, the smartphone 32 may establish wireless communication with the wireless network 40 serving the area. The smartphone 32, for example, may request access or permission to a local area wireless fidelity (or WI-FI®) network, wide area cellular network, or any other network. The wireless network 40 may only recognize, or transmit/receive, using a particular frequency or band. The smartphone 32 may thus instruct its transceiver (not shown for simplicity) to wirelessly request access permission using the electromagnetic frequency band required by the wireless network 40.

The security server 42 may be notified. When the wireless network 40 detects the smartphone 32, exemplary embodiments may inform the security server 42. That is, the smartphone 32 may send an access request to an access device 100 serving the wireless network 40. FIG. 8 illustrates the access device 100 as a wireless router 102, which commonly serves many residential and business WI-FI® networks. However, the access device 100 may be any network interface to an access network, such as a gateway, cable modem, or DSL modem. Regardless, the smartphone 32 broadcasts a request that seeks access permission to the wireless network 40. When the access device 100 receives the access request, the access device 100 may send a packetized access notification 104 into a communications network 106 for routing and delivery to a network address associated with the security server 42. The wireless router 102, for example, may store or execute code or programming that forces or commands the access notification 104 when any device attempts to access the wireless network 40. The access notification 104 may thus alert the security server 42 to the radio frequency presence of the visitor's smartphone 32. The access notification 104 may further include information that uniquely identifies the smartphone 32, such as data representing a cellular identifier 110. While any alphanumeric combination may uniquely identify the smartphone 32, FIG. 8 illustrates the smartphone's cellular telephone number (or "CTN") 112, International Mobile Subscriber Identity (or "IMSI") 114, or Mobile Station International Subscriber Directory Number ("MSISDN") 116. Whenever the mobile smartphone 32 sends messages or information, the smartphone 32 may include or self-report its CTN 112, IMSI 114, and/or its MSISDN 116.

The security server 42 may authorize the smartphone 32. The security server 42 has a processor 120 (e.g., "μP"), application specific integrated circuit (ASIC), or other component that executes a security algorithm 122 stored in a local memory 124. The security algorithm 122 instructs the processor 120 to perform operations, such as receiving and processing information received from a network interface to the communications network 106. The information may be received as packets of data according to a packet protocol (such as any of the Internet Protocols). The packets of data contain bits or bytes of data describing the contents, or payload, of a message. A header of each packet of data may contain routing information identifying an origination address and/or a destination address. The security algorithm 122, for example, may instruct the processor 120 to inspect the packetized access notification 104 for the cellular identifier 110 of the visitor's smartphone 32 requesting access to the wireless network 40.

FIG. 9 illustrates the database 44 of personnel. The database 44 of personnel may store names, addresses, images, and/or other information for personnel who are authorized to enter any area. For simplicity the database 44 of personnel is illustrated as a table 130 that electronically maps, relates, or associates different employees or tenants 132 to their corresponding personal information. For example, an entry may associate each person's name 134, address 136, and/or employee number 138 to the cellular identifier 110 associated with the person's personal wireless device (such as the smartphone 32 illustrated in FIGS. 1-8). FIG. 9 illustrates the cellular identifier 110 as the cellular telephone number 112, the IMSI 114, and/or the MSISDN 116. Each person's wireless device, however, may be additionally or alternatively uniquely identified by a network address, a manufacturer's serial number, or any other alphanumeric combination. Moreover, the database 44 of personnel may further associate a digital image file 140 to the cellular identifier 110, thus allowing retrieving, recognition, and/or analysis of a facial image. The database 44 of personnel is illustrated as being locally stored in the memory 124 of the security server 42, but some or all of the database entries may be remotely maintained at some other server or location in the communications network (illustrated as reference numeral 106 in FIG. 8). While FIG. 9 only illustrates a few entries, in practice the database 44 of personnel may contain many entries for hundreds or thousands of people.

The security server 42 may query the database 44 of personnel. When the security server 42 receives the access notification 104, the security algorithm 122 causes the processor 120 to query for entries that match the query search term(s) detailed or described in the electronic access notification 104. If the database 44 of personnel contains a matching entry, then the security server 42 may authorize the smartphone 32 (and thus the corresponding user or visitor) to enter. The security server 42 thus recognizes the smartphone 32 as belonging to one of the personnel authorized to enter the building (illustrated as reference numeral 24 in FIGS. 1-7). As an example, if the CTN 112, the IMSI 114, and/or the MSISDN 116 detailed in the access notification 104 matches an entry in the database 44 of personnel, then the security server 42 may conclude that the corresponding user of the smartphone 32 is authorized to enter.

FIG. 10 illustrates the entry instruction 86. When the visitor's smartphone 32 matches an entry in the database 44 of personnel, the security server 42 may authorize entry. The security algorithm 122 may thus instruct the processor 120 to generate the entry instruction 86 to allow physical entry. The entry instruction 86 may contain any information that confirms the smartphone 32 is authorized to enter the secure area. The entry instruction 86 may thus route to the network address assigned to the lock controller 88, thus instructing the lock controller 88 to activate or unlock the electronic lock 90. The security server 42 may thus unlock a door, gate, or turnstile that permits physical entry of the corresponding user of the smartphone 32. An employee or tenant thus enters based on the wireless detection of the smartphone 32.

Exemplary embodiments thus present an elegant solution. In today's mobile environment, people may be uniquely identified by their mobile devices (such as the smartphone 32). Employees, tenants, and visitors may thus be personally identified merely by carrying their smartphones. Exemplary embodiments may thus permit authorized entry to secure areas, simply by recognizing wireless transmissions from their mobile devices. No phone calls are needed, and labor expenses are reduced.

Exemplary embodiments may be applied regardless of networking environment. Exemplary embodiments may be easily adapted to stationary or mobile devices having cellular, WI-FI®, near field, and/or BLUETOOTH® capability. Exemplary embodiments may be applied to mobile devices utilizing any portion of the electromagnetic spectrum and any signaling standard (such as the IEEE 802 family of standards, GSM/CDMA/TDMA or any cellular standard, and/or the ISM band). Exemplary embodiments, however, may be applied to any processor-controlled device operating in the radio-frequency domain and/or the Internet Protocol (IP) domain. Exemplary embodiments may be applied to any processor-controlled device utilizing a distributed computing network, such as the Internet (sometimes alternatively known as the "World Wide Web"), an intranet, a local-area network (LAN), and/or a wide-area network (WAN). Exemplary embodiments may be applied to any processor-controlled device utilizing power line technologies, in which signals are communicated via electrical wiring. Indeed, exemplary embodiments may be applied regardless of physical componentry, physical configuration, or communications standard(s).

Exemplary embodiments may utilize any processing component, configuration, or system. Any processor could be multiple processors, which could include distributed processors or parallel processors in a single machine or multiple machines. The processor can be used in supporting a virtual processing environment. The processor could include a state machine, application specific integrated circuit (ASIC), programmable gate array (PGA) including a Field PGA, or state machine. When any of the processors execute instructions to perform "operations", this could include the processor performing the operations directly and/or facilitating, directing, or cooperating with another device or component to perform the operations.

Figure 11:
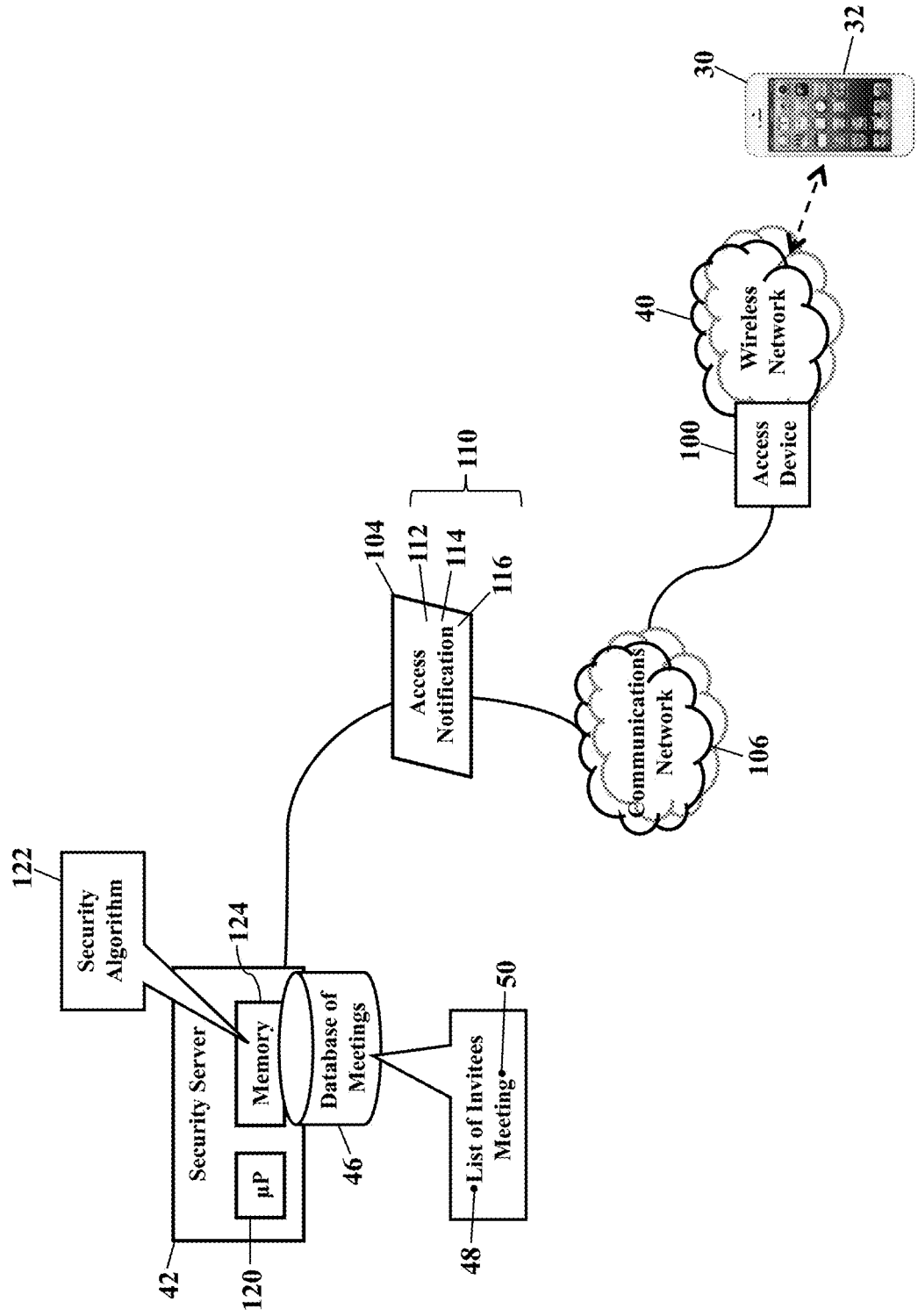
FIGS. 11-12 are schematics illustrating a database of meetings, according to exemplary embodiments.
Figure 12:
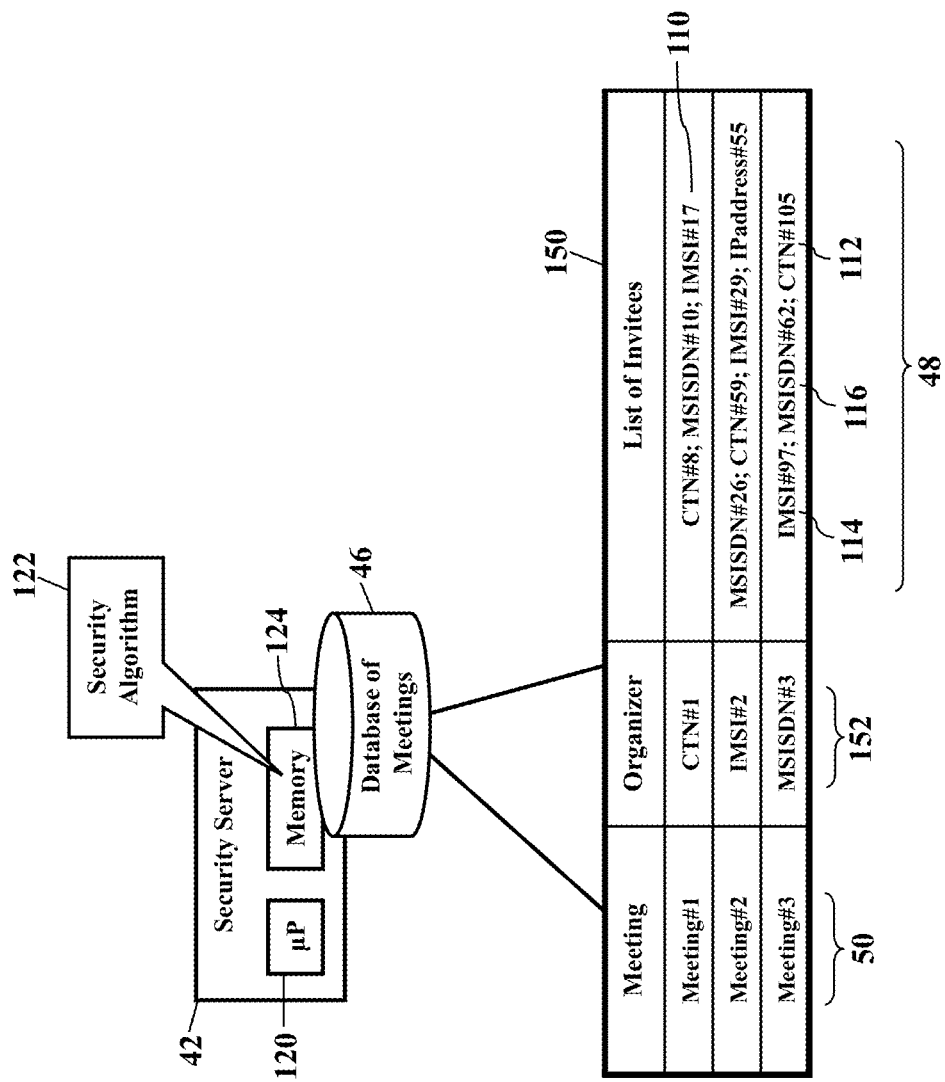

FIGS. 11-12 are schematics further illustrating the database 46 of meetings, according to exemplary embodiments. Here the smartphone 32 may be an invitee to a meeting within some secure area. When the wireless network 40 detects the radio presence of the visitor's smartphone 32, the access device 100 sends the access notification 105 to the security server 42. The access notification 104 may uniquely identify the device (such as the smartphone 32) requesting wireless access, such as data representing the cellular identifier 110 (the CTN 112, the IMSI 114, and/or the MSISDN 116). The security server 42 may then query the database 46 of meetings to determine if the smartphone 32 matches the list 48 of invitees to any scheduled meeting 50.

FIG. 12 illustrates the database 46 of meetings. For simplicity, FIG. 12 illustrates the database 46 of meetings being locally stored in the memory 124 of the security server 42. However, some or all of the database entries may be remotely maintained at some other server or location in the communications network (illustrated as reference numeral 106 in FIG. 11). While FIG. 12 only illustrates a few entries, in practice the database 46 of meetings may contain many entries for hundreds or thousands of different meetings or gatherings. The database 46 of meetings is illustrated as a table 150 that maps, relates, or associates different scheduled meetings 50 to the corresponding list 48 of invitees. While each invitee 48 may be identified by their name, here exemplary embodiments identify each invitee 48 according to his or her mobile device identifier. That is, each invitee 48 may be identified by the unique cellular identifier 110 associated with, or assigned to, their cellular device (such as the smartphone 32). FIG. 12 thus illustrates database associations between a meeting 50, an organizer or inviter 152, and the different invitees 48. Each party to the meeting 50 may thus be uniquely identified by their respective CTN 112, IMSI 114, and/or MSISDN 116. Referring back to FIG. 11, if an entry in the database 46 of meetings matches the unique cellular identifier 110 associated with the smartphone 32, then the corresponding user may be authorized for entry to attend the corresponding meeting 50. The security server 42 may thus authorize entry, such as by generating the entry instruction 86 (as illustrated with reference to FIG. 10). Supplier personnel, contractors, and other invitees may thus quickly and easily enter the building, based on wireless recognition of their smartphones.

FIGS. 13-18 are schematics illustrating locational tracking, according to exemplary embodiments. Once the smartphone 32 is authorized for entry, exemplary embodiments may monitor the movements of the smartphone 32. If the visitor's smartphone 32 strays or frolics, a security concern may develop. Exemplary embodiments, then, may track the smartphone 32 to ensure the user stays on route to the meeting 50.

Figure 13:
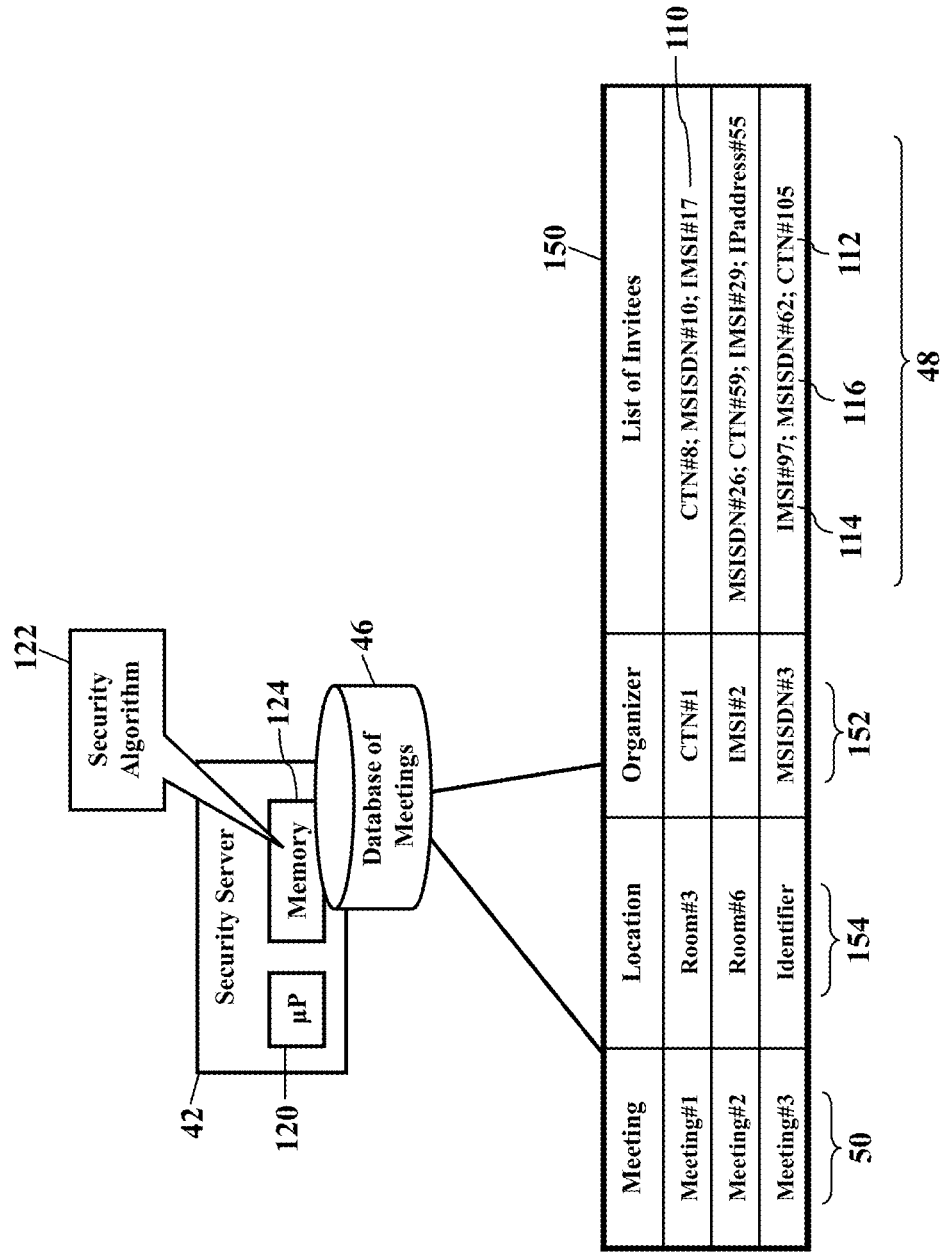
FIGS. 13-18 are schematics illustrating locational tracking, according to exemplary embodiments.

FIG. 13, for example, illustrates room assignments. Here the database 46 of meetings may also associate a meeting location 154 to each meeting 50. As the reader may realize, conference rooms, offices, beverage rooms, and auditoriums may be uniquely identified by some name and/or location. So, when the meeting 50 is scheduled or logged in the database 46 of meetings, exemplary embodiments may further store an electronic database association with the corresponding meeting location 154.

Figure 14:
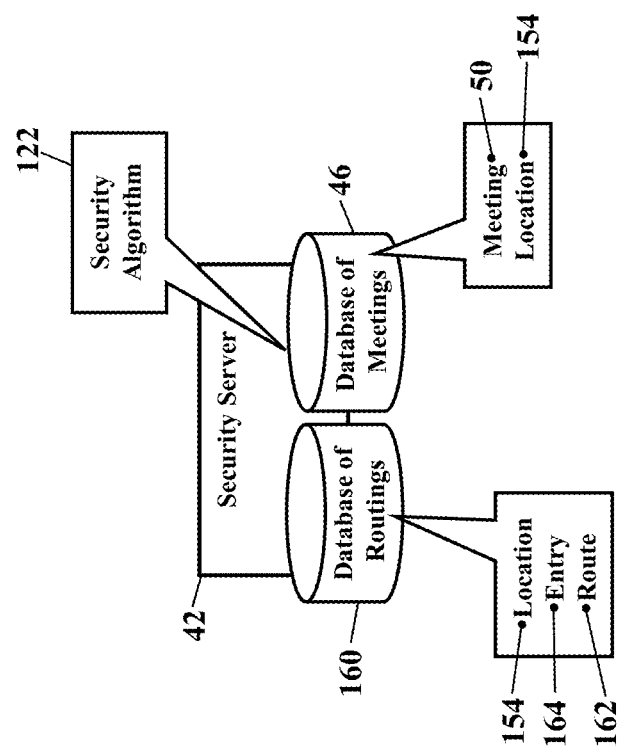

FIG. 14 illustrates security routings. Once the location 154 of the meeting 50 is determined (from the database 46 of meetings), the security server 42 may query a database 160 of routings. The database 160 of routings stores predetermined building routes 162 from some beginning location (such as a point of entry 164) to the destination at the meeting location 154. The database 160 of routings, for example, may store different routes 162 from the lobby of the building (illustrated, respectively, as reference numerals 22 and 24 in FIG. 1) to the meeting location 154 of the scheduled meeting 50. FIG. 14 illustrates the database 160 of routings as being locally stored in the security server 42, but some or all of the electronic database entries may be remotely maintained at some other server or location in the communications network (illustrated as reference numeral 106 in FIG. 11). A particular conference room, for example, may have a route 162 along which the visitor is only permitted to walk or navigate. That is, only certain paths along particular halls and/or through particular doors are available to the visitor. The database 160 of routings may thus store approved routes 162 along which employees, tenants, and/or visitors may move from any point (such as the entry 164) to the final destination at the meeting location 154.

Figure 15:
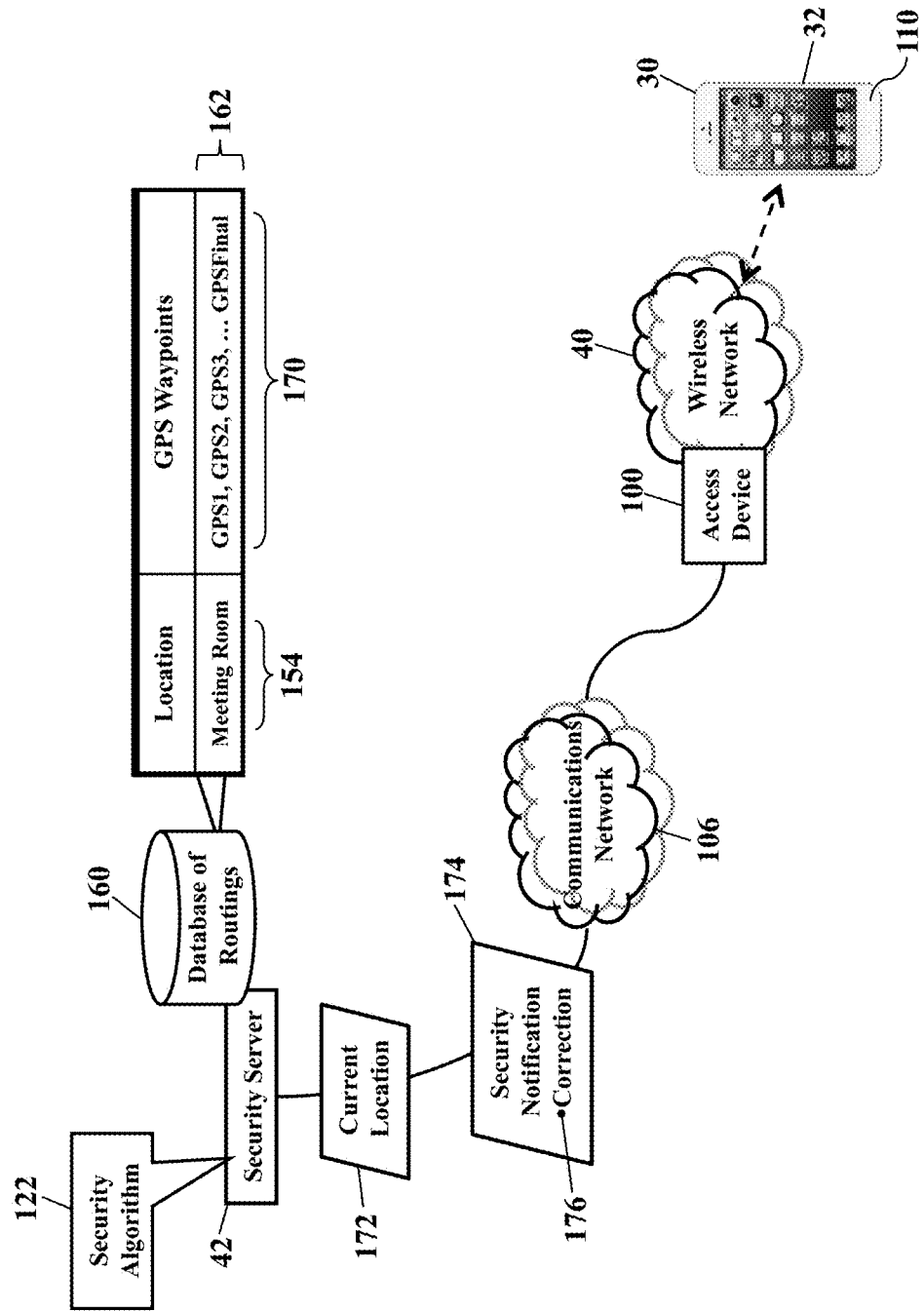

FIG. 15 illustrates GPS tracking. After the visitor's smartphone 32 is authorized for entry, the visitor should walk or travel along the predetermined route 162 to the destination meeting location 154. After all, confining the visitor to the predetermined route 162 may help prevent rogue access to unauthorized locations. Exemplary embodiments, then, may track the visitor's position or progress along the predetermined route 162. FIG. 15 thus illustrates GPS waypoints 170 along which the smartphone 32 may or must report. That is, the predetermined route 162 may be defined as a series of global positioning system information. As the visitor walks the corridors of the building, the visitor's smartphone 32 may continually, periodically, and/or randomly report its current location 172. FIG. 15 illustrates the smartphone 32 reporting its current location 172 into the wireless network 40, which the access device 100 may forward to the security server 42. The current location 172, however, may be routed into a cellular network for delivery to the network address associated with the security server 42. Regardless, when the security server 42 receives the current location 172, the security server 42 may compare the current location 172 to the GPS waypoints 170 associated with the meeting location 154. If the current location 172 matches one of the GPS waypoints (perhaps within a locational tolerance), then the security algorithm 122 may conclude that the visitor's smartphone 32 is on track and proceeding as authorized. However, if the current location 172 reported by the visitor's smartphone 32 fails to match one or any of the GPS waypoints 170, the security algorithm 122 may generate a security notification 174. The security notification 174 may be any electronic message that warns the visitor to resume the predetermined route 162 to the destination meeting location 154. The security notification 174 may route back to the access device 100 for transmission to the network address assigned to the smartphone 32. However, the security notification 174 may be a short message service (SMS) text message that is sent to the unique cellular identifier 110 of the visitor's smartphone 32. The security notification 174 may further include a correction 176 that puts the visitor back on the predetermined route 162 to the destination meeting location 154. Moreover, the security server 42 may also copy or forward the security notification 174 to a device associated with a security guard for nearly immediate human intervention.

Figure 16:
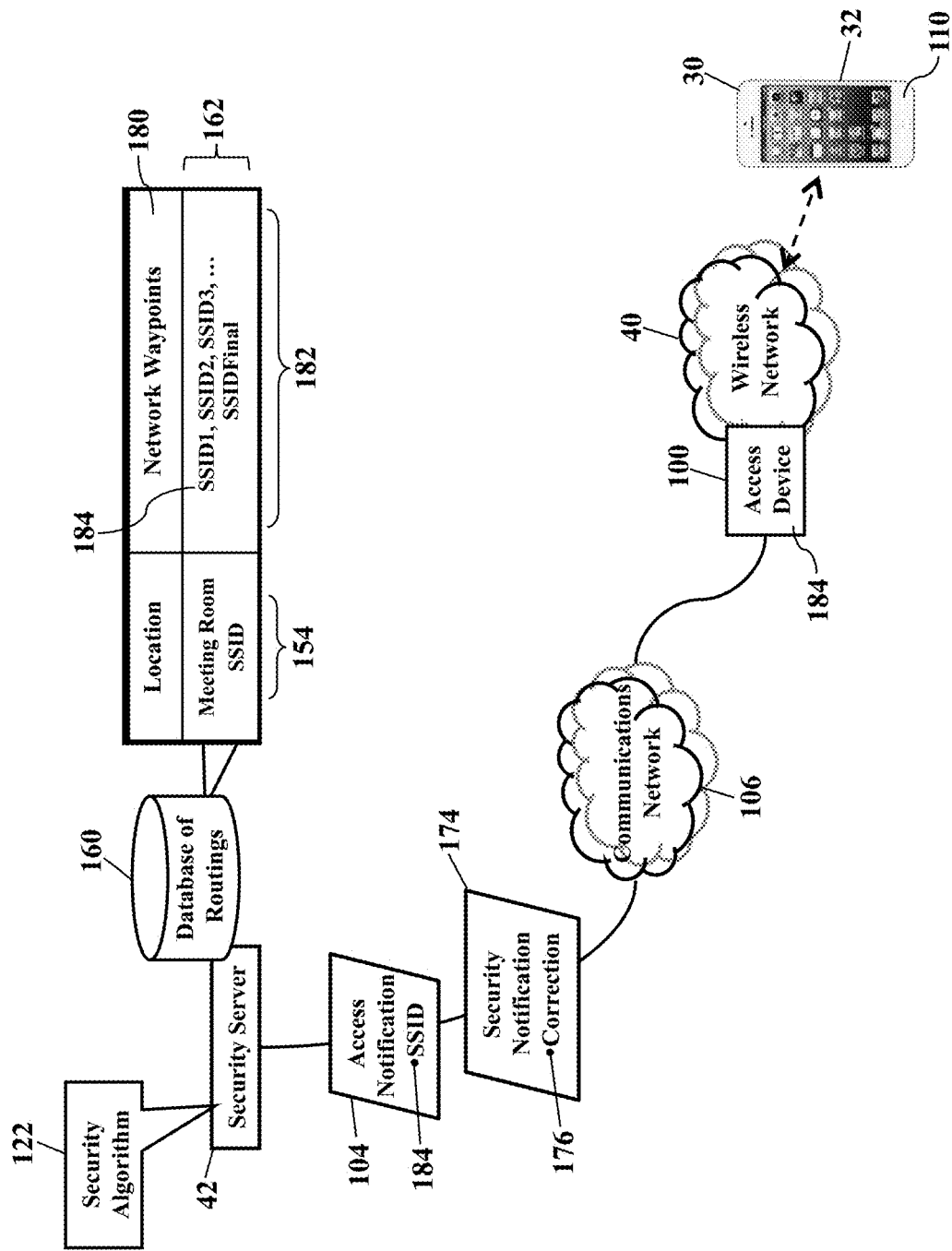

FIG. 16 illustrates network tracking. Here exemplary embodiments may track the current location 172 of the visitor's smartphone 32 using network recognition. As the reader may understand, GPS signals are sometimes not received in indoor environments. Exemplary embodiments, then, may additionally or alternatively track the current location 172 of the visitor's smartphone 32 using network identifiers. FIG. 16 thus illustrates network waypoints 180 along which the smartphone 32 must request access permission. That is, the predetermined route 162 may be defined as a series of network identifiers. For example, as the visitor walks the corridors of the building, the visitor's smartphone 32 may wirelessly encounter different wireless fidelity (WI-FI®) networks serving the different floors, hallways, and/or rooms within the building. The visitor's smartphone 32 may also detect other identifiers of other networks (such as different cellular network cells). Regardless, the smartphone 32 may request access permission to each wireless network 40. The corresponding access device 100 may thus notify the security server 42 using the access notification 104 (above explained with reference to FIG. 8). FIG. 16, for simplicity, illustrates the network waypoints 180 as a series 182 of service set identifiers. Each individual service set identifier (or "SSID") 184 uniquely identifiers a different WI-FI® network serving some portion of the predetermined route 162 to the destination meeting location 154. When the security server 42 receives each access notification 104, the access notification 104 may identify the corresponding SSID 184. The security server 42 may thus compare the SSID 184 to the network waypoints 180 associated with the meeting location 154. If the SSID 184 matches one of the network waypoints 180, then the security algorithm 122 may conclude that the visitor's smartphone 32 is on track and proceeding as authorized. However, if the SSID 184 fails to match one or any of the network waypoints 180, the security algorithm 122 may generate the security notification 174 with the correction 176 (as earlier explained).

Figure 17:
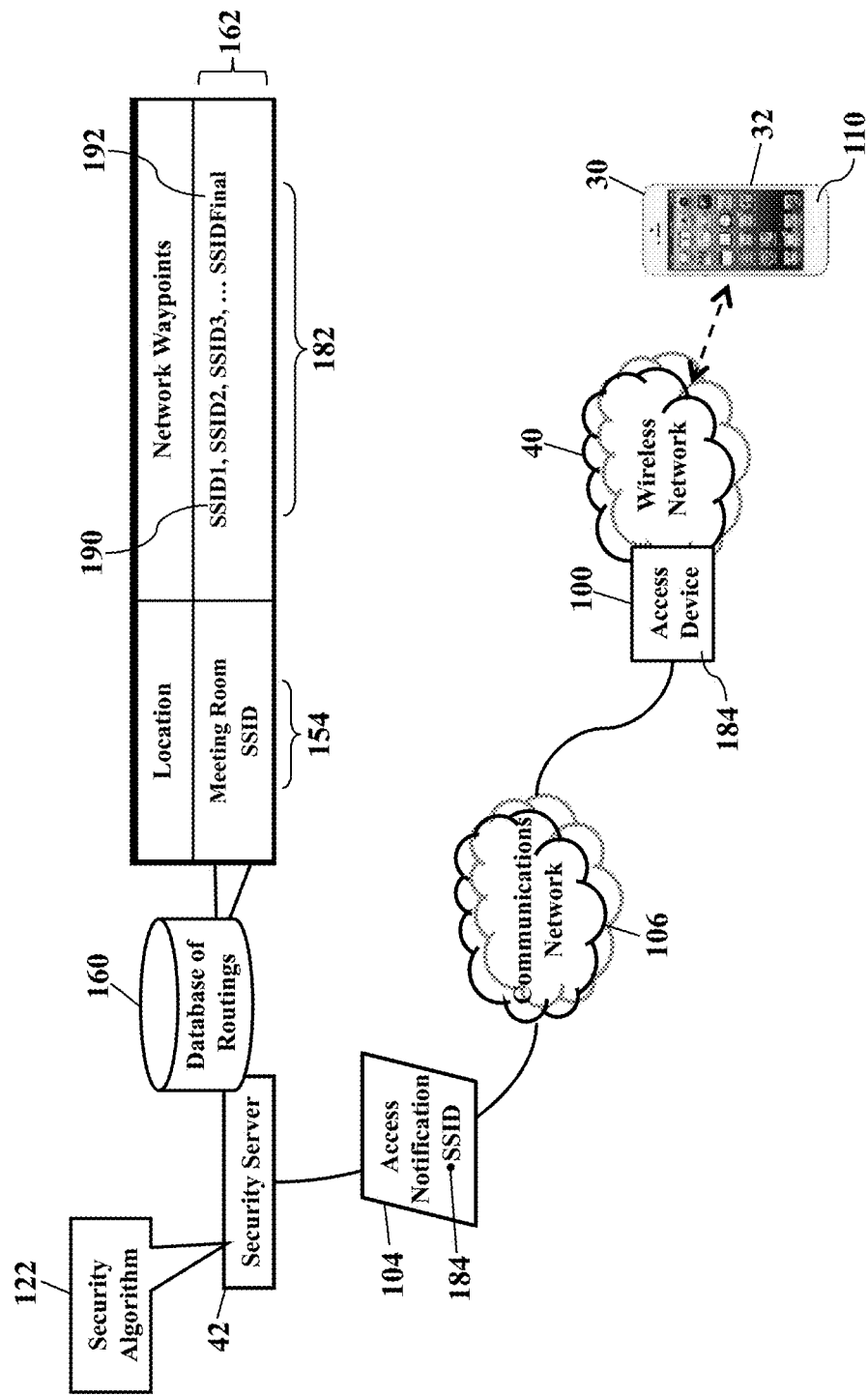

FIG. 17 illustrates a strict comparison. As the security server 42 receives each access notification 104, the security server 42 may require a strict sequential match with the network waypoints 180. The visitor's smartphone 32, in other words, may be required to traverse the network waypoints 180 in sequential order, from a first entry SSID 190 to a final destination SSID 192 serving the destination meeting location 154. If the visitor's smartphone 32 strays from the predetermined route 162, one of the access notifications 104 will identify an SSID 184 not matching the approved route 162. The smartphone 32, in other words, is requesting wireless access to an unauthorized network, thus revealing a frolic or detour. The security algorithm 122 may thus alert security (as earlier explained).

Figure 18:
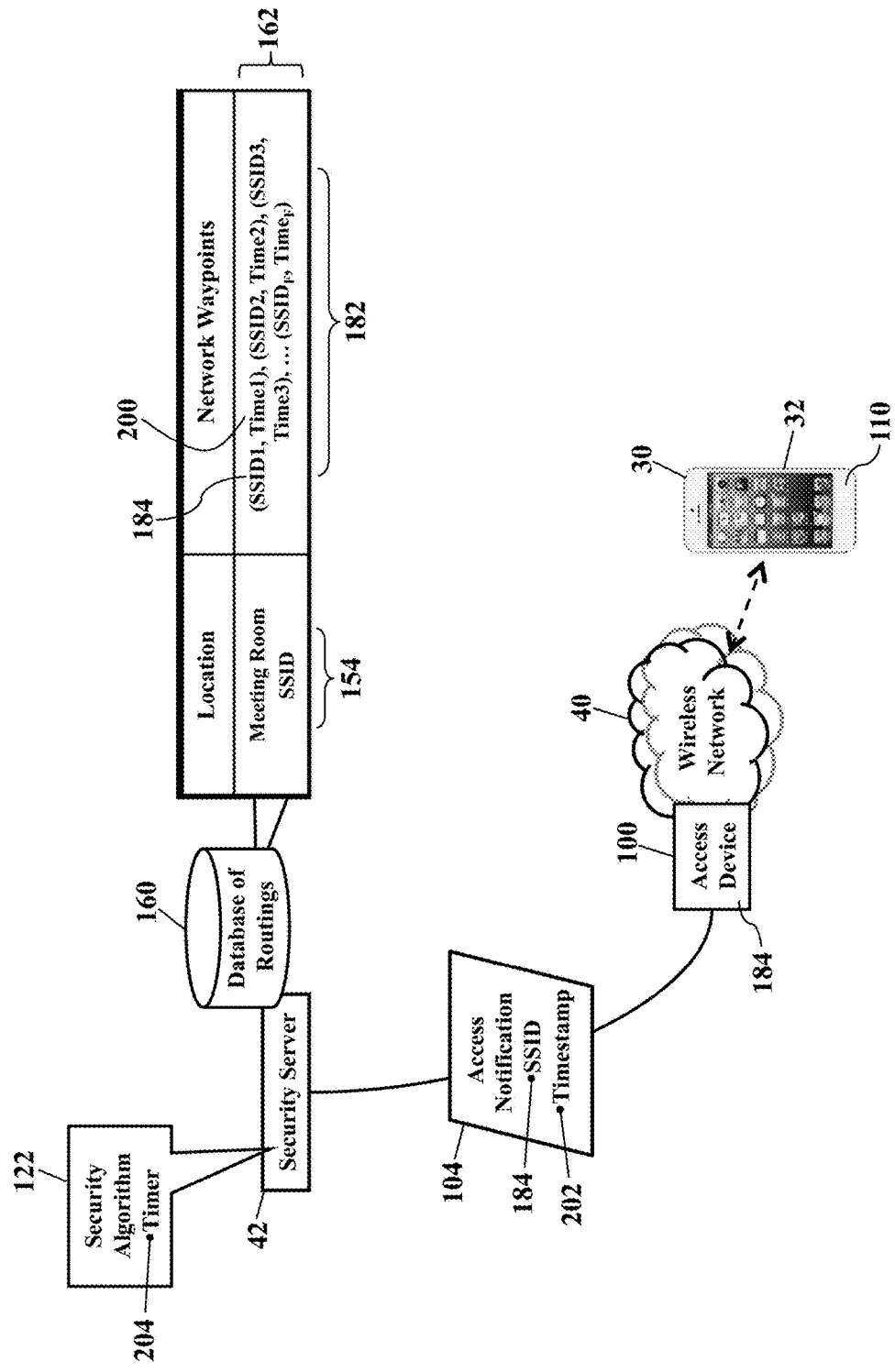

FIG. 18 illustrates timing requirements. Here each network waypoint 180 may also have a corresponding timing parameter 200. FIG. 18 thus illustrates each network waypoint 182 as an SSID/time pairing. That is, each network waypoint 182 may be a network/timing pair of values associated with each successive wireless network 40. As the visitor's smartphone 32 travels along the predetermined route 162, the security server 42 may monitor a speed or time of movement. Each access notification 104 may have a timestamp 202 that marks a time of requested access to the wireless network 40 (as identified by the SSID 184). As the security server 42 sequentially compares the SSID 184 to the network waypoints 180, the security server 42 may also require strict adherence to each corresponding timing parameter 200. The security server 42, in other words, may initialize a timer 204 with receipt of the access notification 104. The timer 204 counts up or down to a final value at a receipt of a next access notification 104 associated with the same smartphone 32 (e.g., the cellular identifier 110). The timer 204, for example, may thus count a time in seconds or minutes between successive access notifications 104 sent from different access devices 100 along the predetermined route 162. So, not only must each sequential SSID 184 match the network waypoints 180, but exemplary embodiments may also require timing compliance between the successive network waypoints 180. The security server 42 may thus compare a current value of the timer 204 to the timing parameter 200 associated with a next corresponding network waypoint 182 along the predetermined route 162. If the current value of the timer 204 is less than or equal to the timing parameter 200, then the security algorithm 122 may conclude that the visitor's smartphone 32 is on the approved route 162 and on track to arrive on time at the final meeting destination location 154. However, if the current value of the timer 204 exceeds the timing parameter 200, the security algorithm 122 may conclude that the visitor's smartphone 32 has strayed from the predetermined route 162. The security algorithm 122 may thus alert security (as earlier explained).

Figure 19:
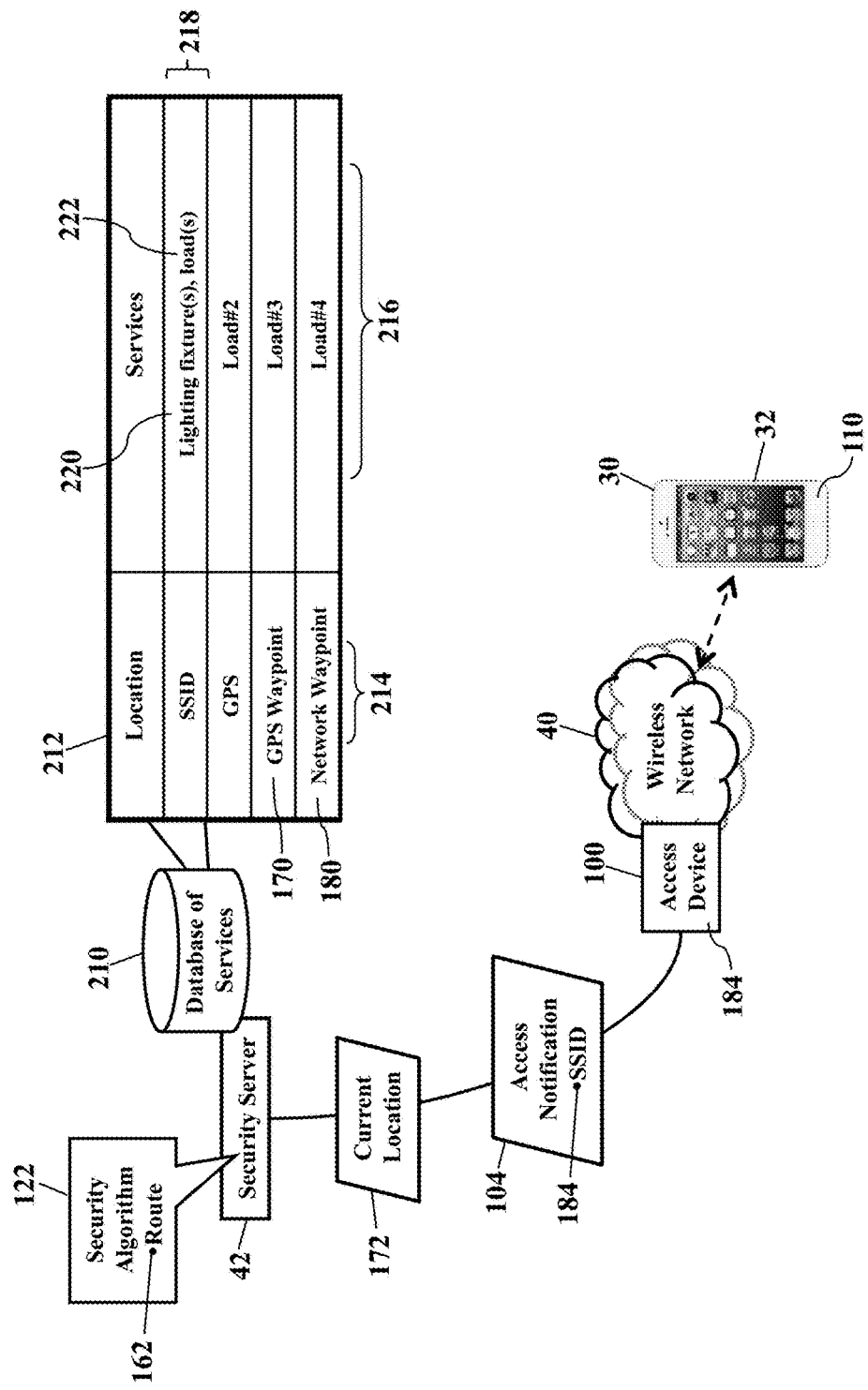
FIGS. 19-22 are schematics illustrating building services, according to exemplary embodiments.

FIGS. 19-22 are schematics illustrating building services, according to exemplary embodiments. Here exemplary embodiments may coordinate or time various building services with respect to the location of the smartphone 32. As the smartphone 32 travels along the predetermined route 162 (as represented by the GPS current location 172, any of the GPS waypoints 170, the SSID 184, and/or any of the network waypoints 180), the security server 42 may thus order up or coordinate various building services at appropriate times and locations. FIG. 19, for example, illustrates a database 210 of services. The database 210 of services is illustrated as a table 212 that associates different locations 214 to different services 216. As the reader may understand, one of the services 216 may be lighting requirements 218 for each different location 214. As the user carries the smartphone 32 through hallways and other areas, lights may need to be activated. So, as the security server 42 is informed of the smartphone's location 214 along the route 162, the security server 42 may query the database 210 of services for the corresponding lighting requirements 218.

Lights may thus be defined. The database 210 of services may thus store electronic database associations for the lights that illuminate the different locations 214. Each wireless network 40, for example, may be mapped to the light fixtures 220 and/or lighting loads 222 (such as individual electrical circuits) illuminating its wireless service area. Whenever the security server 42 receives the access notification 104, the security server 42 may thus query for the SSID 184 and retrieve the lighting requirements 218 for its wireless service area. As FIG. 19 further illustrates, electronic database associations may be defined for any GPS coordinates or waypoints along the route 162.

Figure 20:
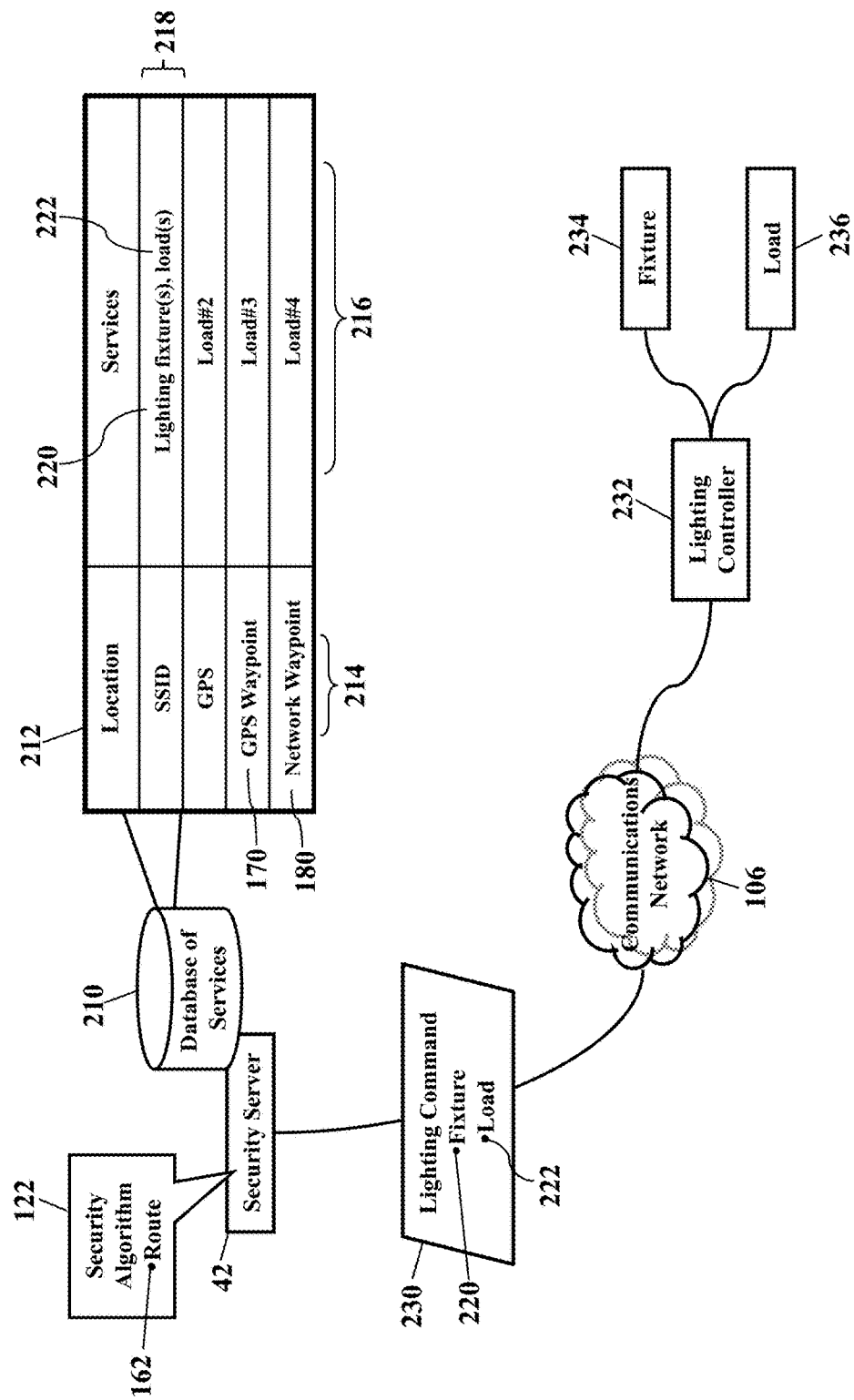

As FIG. 20 illustrates, the lights may be activated. Once the security server 42 knows the lighting requirements 218 for the location 214, the security server 42 may send a lighting command 230 into the communications network 106 for delivery to the network address associated with a lighting controller 232. The lighting controller 232 responds by activating, or turning on, the corresponding physical light fixture 234 and/or the physical electrical load 236. The security server 42 may thus coordinate the lights along the predetermined route 162 for safety and security. Lights may then be deactivated when no mobile device requests wireless access to the corresponding wireless service area. Lights may also be deactivated after some passage of time.

Figure 21:
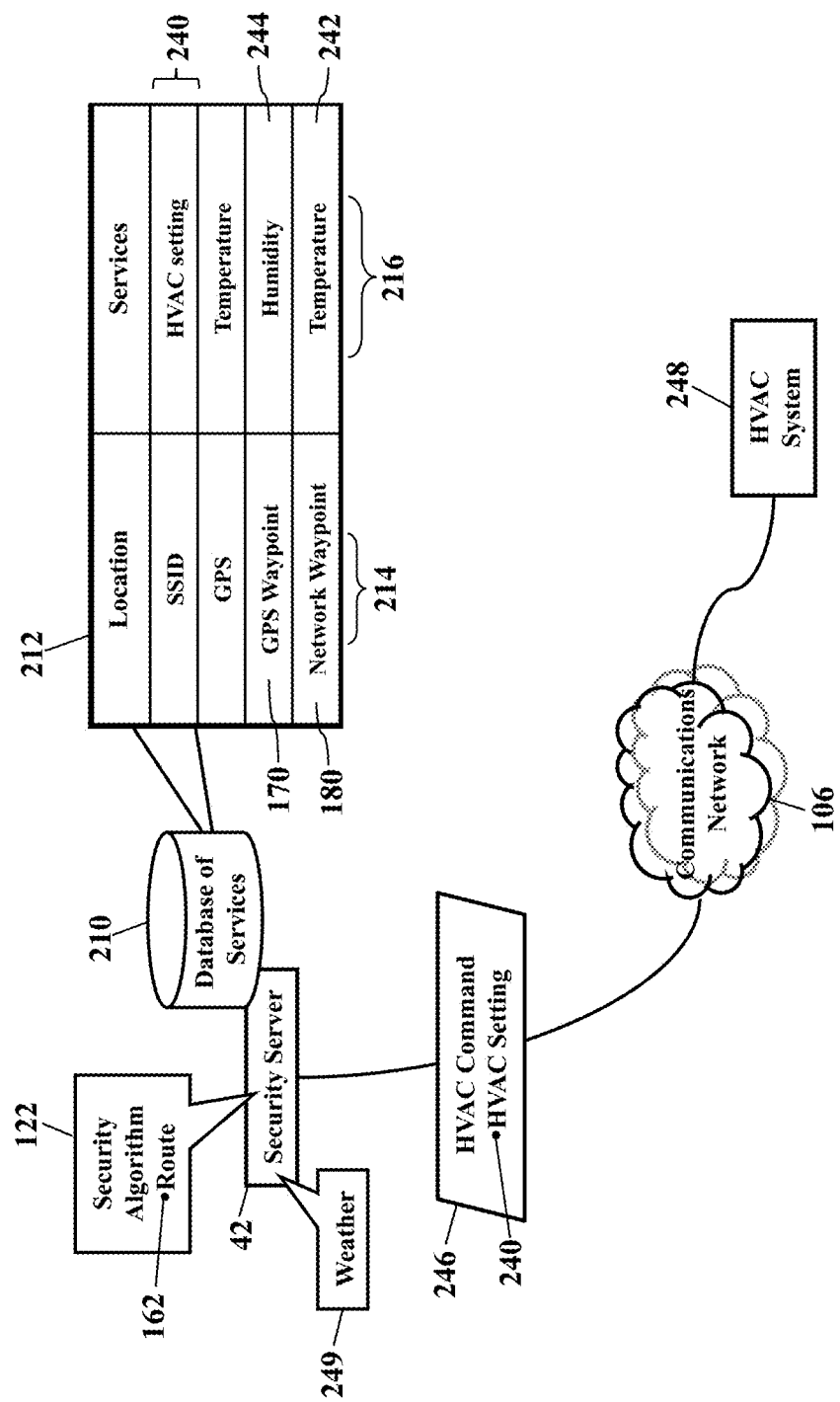

FIG. 21 illustrates HVAC services. Here exemplary embodiments may also coordinate heat or air conditioning with respect to the location 214 along the approved route 162. As the reader likely understands, as the user or visitor travels along the predetermined route 162 (as represented by the GPS current location 172, any of the GPS waypoints 170, the SSID 184, and/or any of the network waypoints 180), the security server 42 may heat or cool the corresponding physical space or area. Indeed, the security server 42 may even order up an ambient temperature within the destination meeting location (illustrated as reference numeral 154 in FIGS. 15-16). The database 210 of services may thus include entries for HVAC settings 240 associated with the location 214 along the approved route 162. For example, the security server 42 may thus query the database 210 of services for the SSID 184 and retrieve the corresponding HVAC settings 240 (such as a temperature 242 and/or humidity 244) associated with the corresponding physical space or area. The security server 42 may then send an HVAC command 246 into the communications network 106 for delivery to the network address associated with an HVAC system 248. The security server 42 may even receive weather data 249 to further analyze and satisfy the HVAC settings 240 desired for the corresponding physical space or area.

Figure 22:
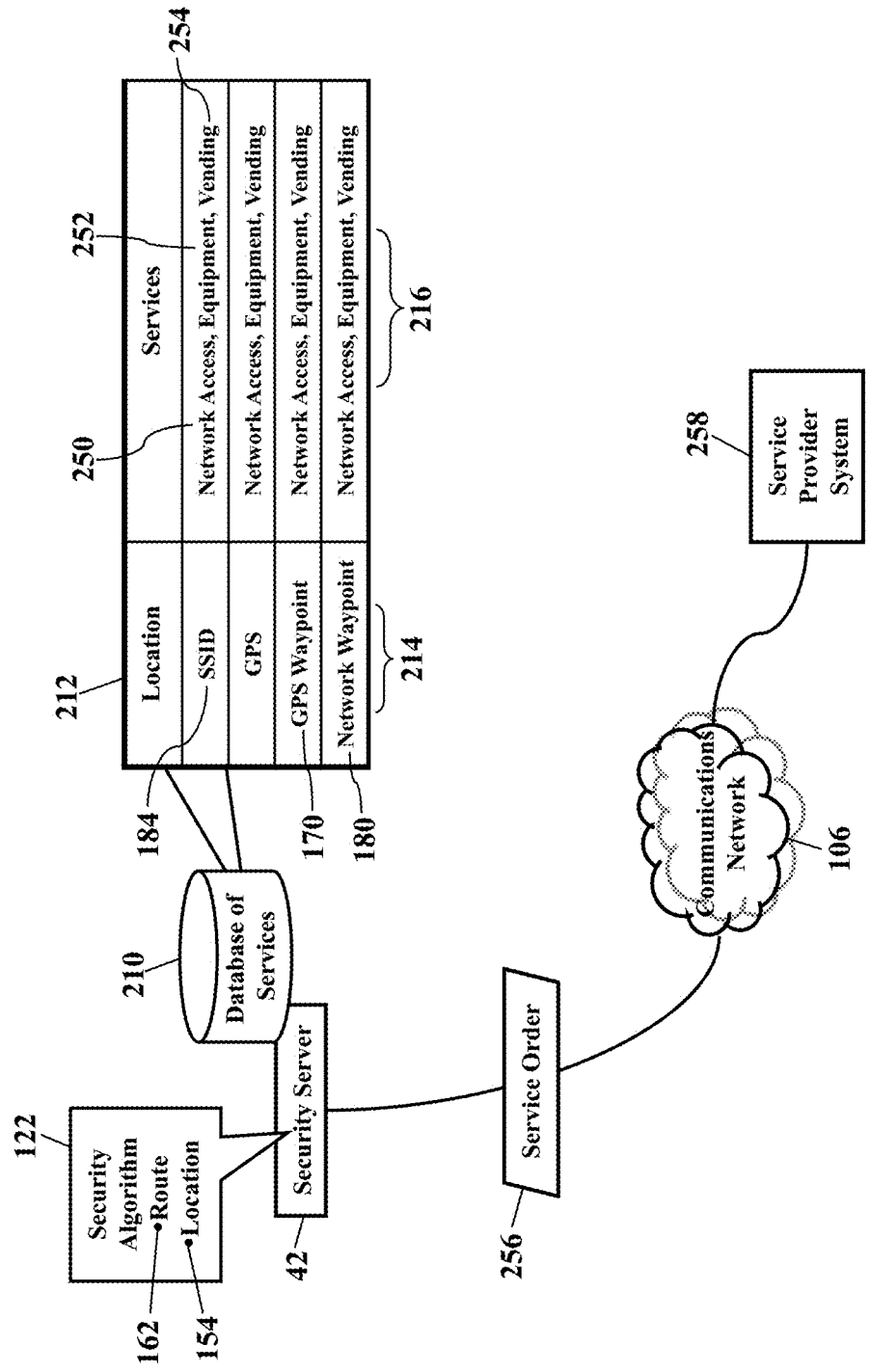

FIG. 22 illustrates other services. Exemplary embodiments may also coordinate many other services for the comfort and convenience of the invitees/attendees. The database 210 of services, for example, may also have entries for other services, such as network access 250, equipment 252, and vending 254. Continuing with the above examples, the security server 42 may query the database 210 of services for the SSID 184 of the meeting location 154. The security server 42 may thus retrieve the corresponding services 216 defined for that meeting location 214. The security server 42 may then generate a service order 256 that routes to a network address of a service provider system 258. For example, when each invitee arrives at the destination meeting location 154, the security server 42 may arrange or prearrange wireless network access 250 for each attendee's mobile wireless device. The security server 42, for example, knows the SSID 184 of the WI-FI® network serving the destination conference room, along with the unique cellular identifier 110 of each attendee's wireless device (as explained with reference to FIGS. 11-14). The security server 42 may thus pre-authorize each attendee's wireless device with the access device 100 providing wireless service in the destination conference room. Each attendee's device thus has immediate access to wireless services.

The equipment 252 may also be ordered. Computers, projectors, conference phone set-up, pens, and whiteboards are just some of the equipment 252 that may be pre-ordered, based on the location 214. The meeting organizer (illustrated as reference numeral 152 in FIG. 12) may thus enter any data or description of the equipment 252 desired for the meeting. The security server 42 may thus pre-arrange arrival and set-up of the equipment 252. As the attendees enter the destination meeting location 154, the equipment 252 they need is automatically ordered and waiting for use.

Vending 254 may also be pre-arranged. The meeting organizer may thus enter or request any food and drink for the meeting. The security server 42 may thus issue orders or commands for on-time delivery of food and drink from some identified vendor. As the attendees enter the destination meeting location 154, the requested food and drink is automatically ordered and waiting for consumption.

Figure 23:
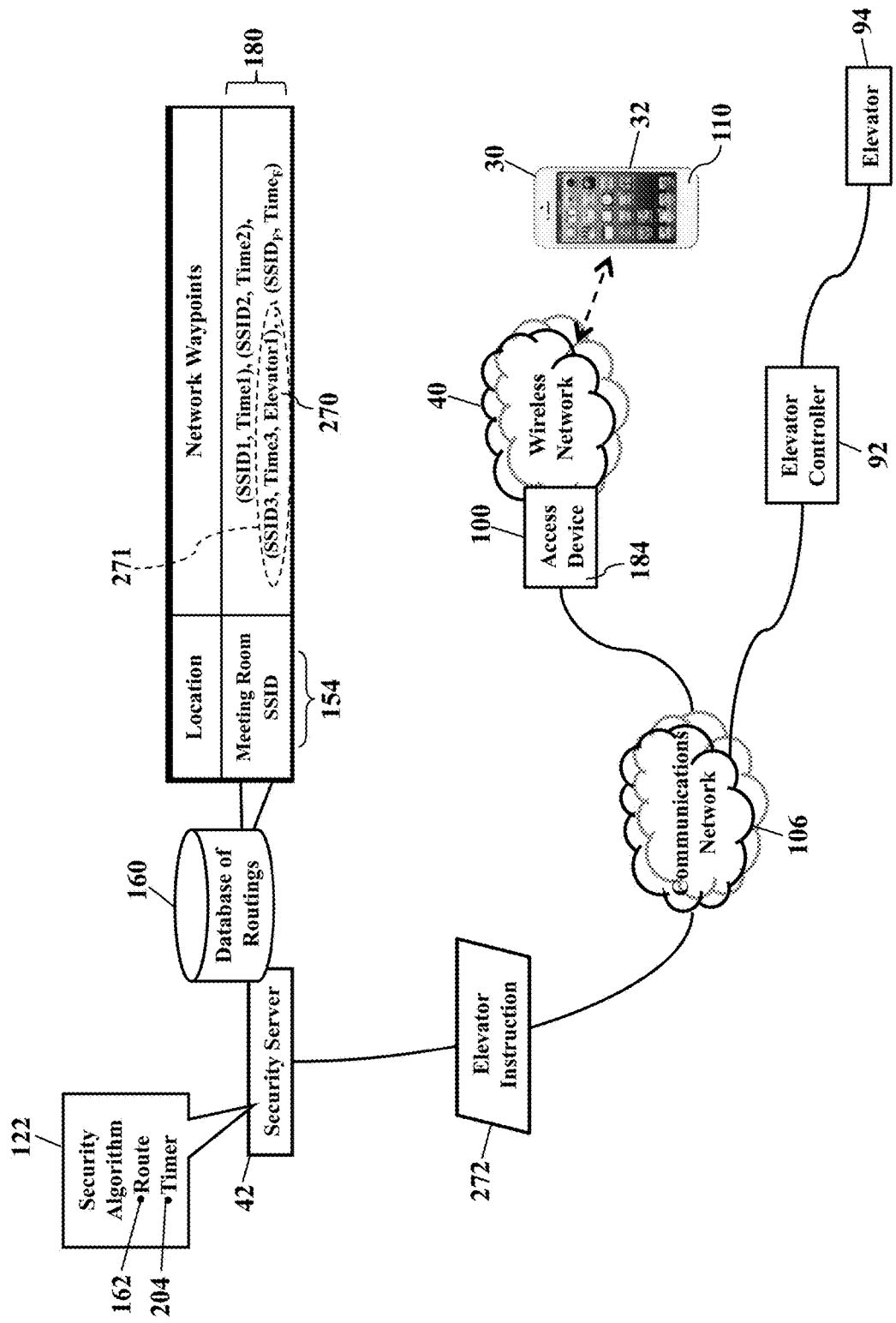
FIG. 23 is a schematic illustrating elevator summons, according to exemplary embodiments.

FIG. 23 is a schematic illustrating elevator summons, according to exemplary embodiments. As the smartphone 32 moves along the pre-approved route 162 to the destination meeting location 154, at some point elevator service may be required. Exemplary embodiments may thus track the smartphone's movement and generate elevator commands at appropriate moments in time or location. FIG. 23, for example, illustrates an elevator command 270 as a data triplet 271 inserted into one of the network waypoints 180. The elevator command 270 identifies which elevator (elevator number or identifier) is summoned for vertical travel from an entry floor to an exit floor. If a building only has one elevator, then perhaps the elevator command 270 may be simplified to a pair of data values. But many buildings may have multiple elevators, perhaps serving different floors. The elevator command (3, 1, 22), for example, may call or summon "Elevator #3" to "Floor #1" for lift service to "Floor #22." The opposite elevator command (3, 22, 1) would call "Elevator #3" to "Floor #22" for descend service to "Floor #1." Each elevator command 270 may thus be generated for insertion into the pre-determined sequential network waypoints 180. As the smartphone 32 satisfied each sequential network waypoint 180, the security server 42 may summon the corresponding elevator in the sequence. The security algorithm 122 may further initialize the timer 204 to count up or down until the summons. Exemplary embodiments, then, may insert the elevator command 270 at appropriate positions and/or times in the sequential network waypoints 180 and/or the sequential GPS waypoints (illustrated as reference numeral 170 in FIG. 15). As the security server 42 tracks the smartphone 32, the security server 42 may thus read, retrieve, and/or execute the elevator command 270 as one of the sequential steps. The security server 42 may thus generate an elevator instruction 272 that is sent into the communications network 106 for delivery to the network address associated with the elevator controller 92. Elevator service may thus be summoned to coincide with the current location of the smartphone 32.

Figure 24:
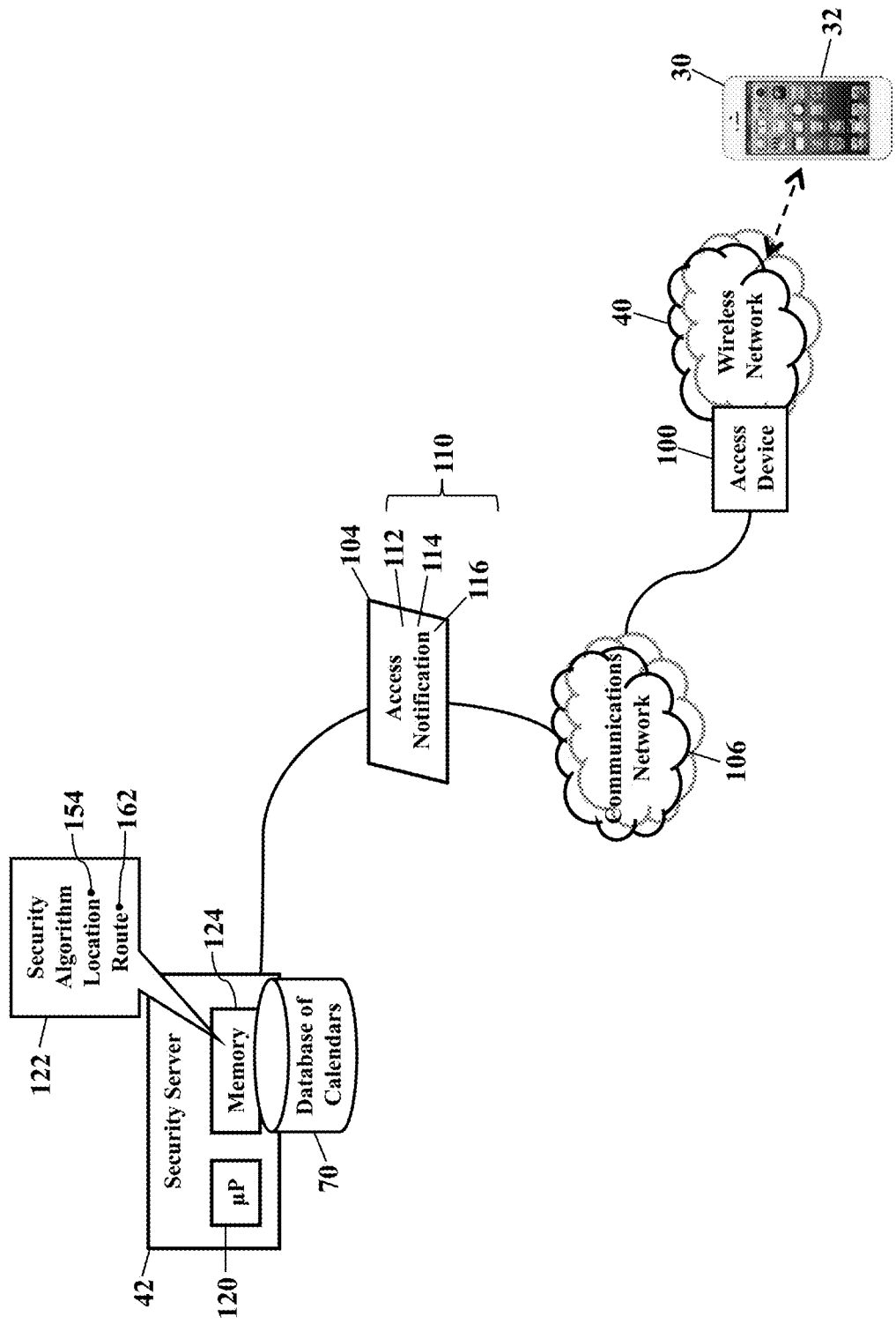
FIGS. 24-25 are schematics further illustrating a database of calendars, according to exemplary embodiments.
Figure 25:
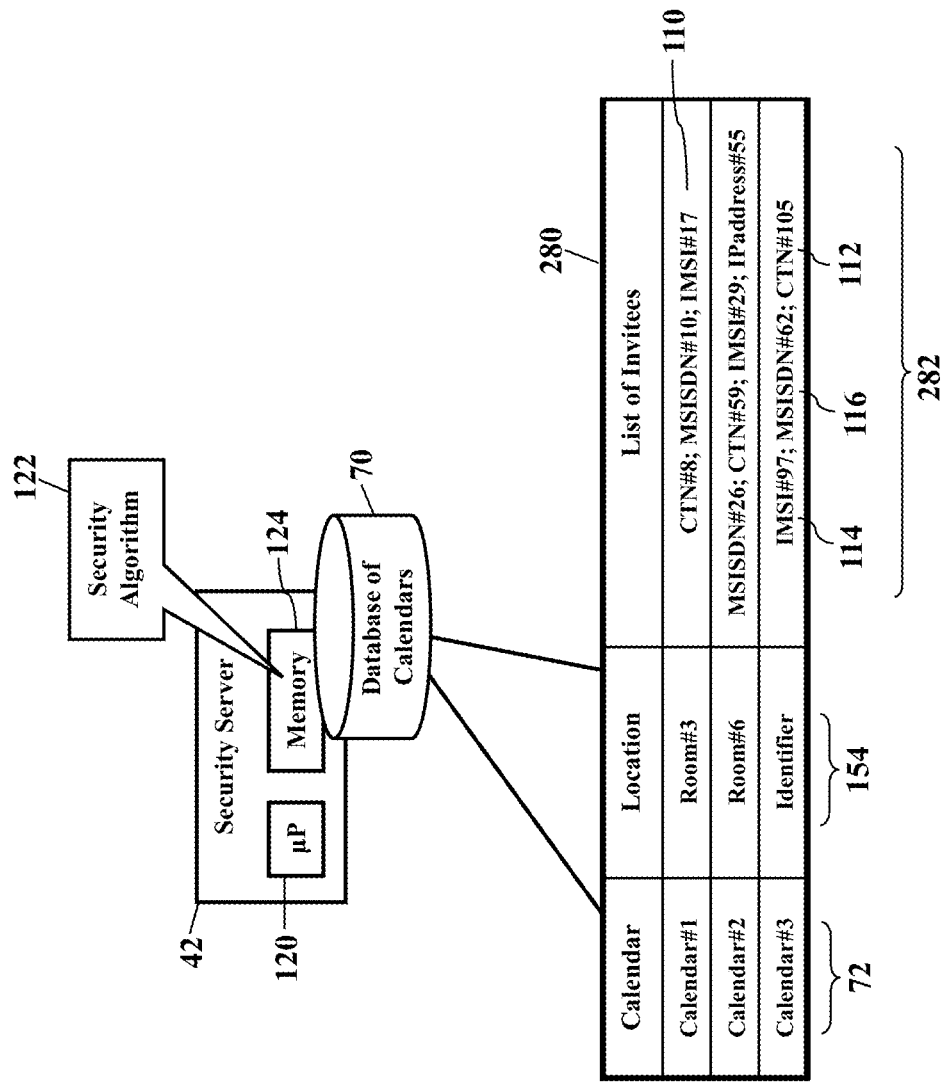

FIGS. 24-25 are schematics further illustrating the database 70 of calendars, according to exemplary embodiments. When the wireless network 40 detects the radio presence of the visitor's smartphone 32, the access device 100 sends the access notification 104 (as earlier explained). The security server 42 may then query the database 70 of calendars for a matching entry. The database 70 of calendars stores different electronic calendars for the different employees and/or tenants in the building. FIG. 25, for example, illustrates the database 70 of calendars as a table 280 that maps, relates, or associates different electronic calendars 72 to different invitees 282. As there may be hundreds of employees or tenants, the database 70 of calendars may store a memory pointer or network address to an individual person's electronic calendar 72. Regardless, when the visitor's smartphone 32 requests access to the wireless network 40, the database 70 of calendars may be searched or queried for a matching entry. For example, FIG. 25 illustrates the database 70 of calendars storing electronic database associations between electronic calendar entries 72 and their respective invitees 282. Whenever a person schedules a meeting or telephone call, for example, the invitee may be uniquely identified by his or her unique cellular identifier 110. An appointment in an electronic calendar, in other words, may be arranged or associated with the CTN 112, the IMSI 114, and/or the MSISDN 116 of a participant 282.

The security server 42 may authorize entry. When the security server 42 receives the access notification 104, the security server 42 may query the database 70 of calendars for the visitor's unique cellular identifier 110. If a matching entry is determined, the security server 42 may permit physical entry, as the visitor is scheduled for an appointment with an employee or tenant. If the database 70 of calendars identifies the destination meeting location 154, the security server 42 may further retrieve and monitor the predetermine route 162 to the meeting location 154 (as this disclosure explains).

FIGS. 26-29 are schematics illustrating historical network tracking, according to exemplary embodiments. Here, historical observances of wireless detections may be used to infer future actions. That is, a user's habitual usage of the smartphone 32 may be used to predict where she will move, and/or what she will do, based on her past wireless network access. For example, as the smartphone 32 repeatedly moves within the building 24, over time exemplary embodiments may make recommendations and assumptions, based on habitual observance of its network usage. Whenever the smartphone 32 is detected at some location or requesting access to any network, exemplary embodiments may match that detection to some past occurrence. In other words, most people are creatures of habit, so exemplary embodiments may predict our future movements and actions based on our historical behaviors.

Figure 26:
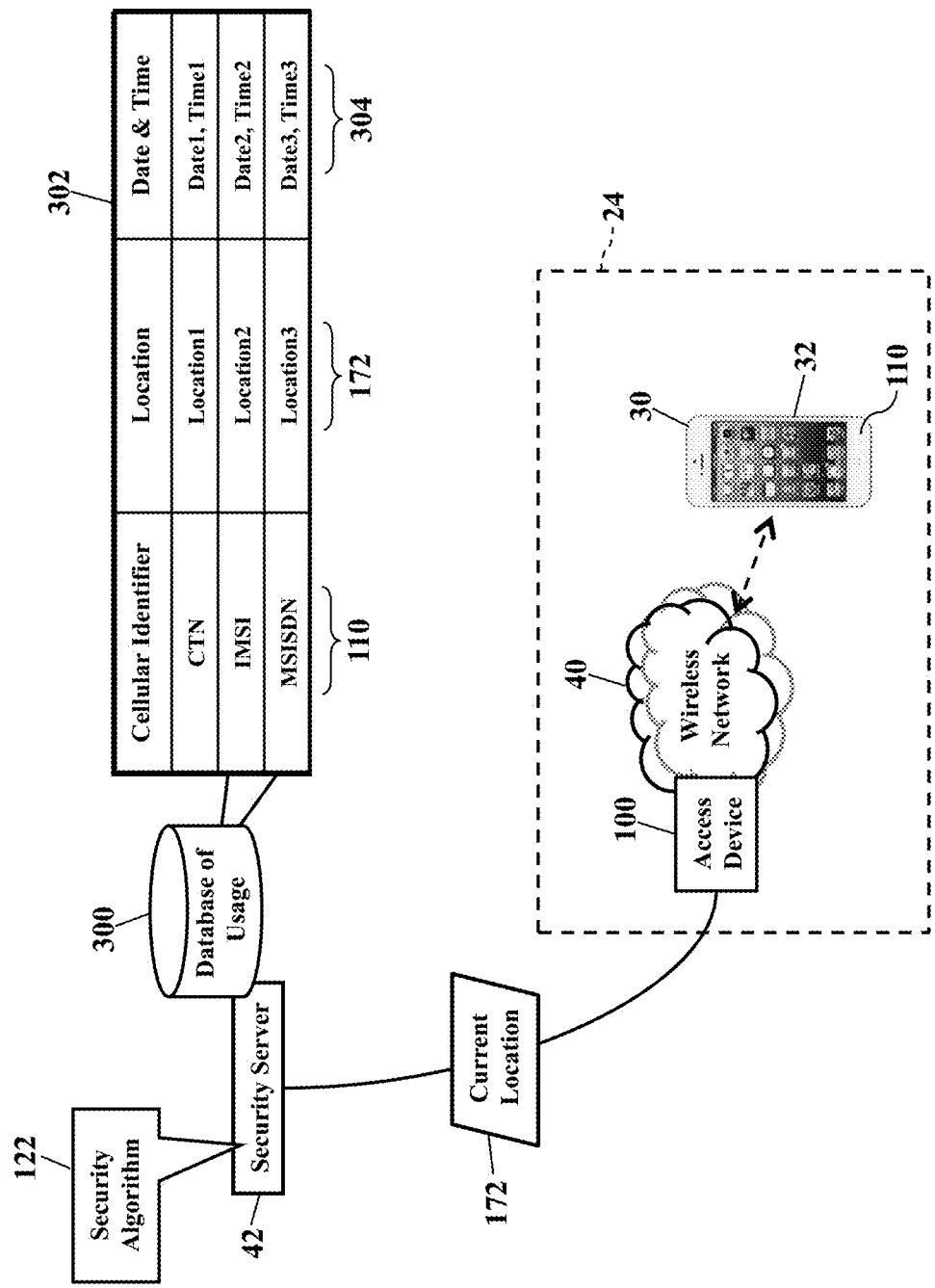
FIGS. 26-29 are schematics illustrating historical network tracking, according to exemplary embodiments.

FIG. 26 illustrates a database 300 of usage. The database 300 of usage tracks historical usage of any user's wireless device 30 (such as the smartphone 32). The database 300 of usage may store entries related to usage at different times of days and/or at different locations. Whenever the smartphone 32 reports its GPS current location 172, for example, exemplary embodiments may query the database 300 of usage for historical usage at that same location. The database 300 of usage may thus log each current location 172 reported by the smartphone 32. As the smartphone 32 moves within the building 24, the smartphone 32 may send its current location 172 (such as GPS information) to the security server 42 for storage in the database 300 of usage. The database 300 of usage is illustrated as being locally stored within the security server 42, but any of the database entries may be remotely maintained at other network-accessible locations or servers. FIG. 26 illustrates the database 300 of usage as a table 302 that electronically maps, relates, or associates the cellular identifier 110 to different location reports. That is, each time the smartphone 32 reports its current location 172, the database 300 of usage may add an entry for the unique cellular identifier 110, the reported current location 172, and a date and time 304 of the report. Over time, then, the database 300 of usage may store long-term records of the movements of the smartphone 32 within the building 24.

Figure 27:
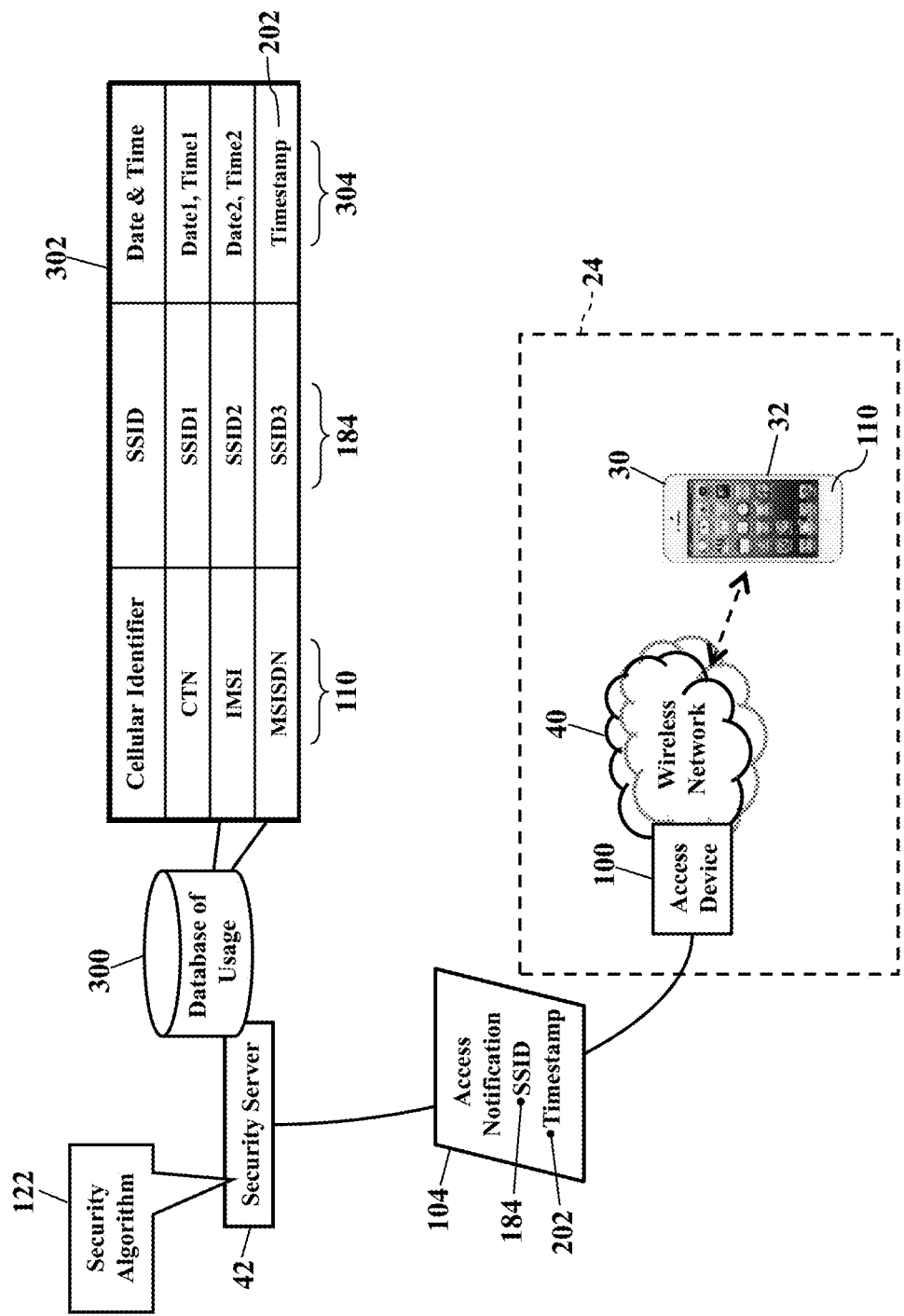

FIG. 27 illustrates historical network usage. Each time the smartphone 32 requests access to the wireless network 40, the corresponding access device 100 sends the access notification 104 to alert the security server 42 (as this disclosure earlier explained). The security server 42 may thus instruct the database 300 of usage to log the access notification 104, perhaps also with the date and time 304. That is, each time the smartphone 32 requests wireless access to the wireless network 40, the database 300 of usage may add an entry for the unique cellular identifier 110, the service set identifier ("SSID") 184 of the wireless fidelity ("WI-FI®") network 40, and the date and time 304 of the request. As FIG. 27 illustrates, the database 300 of usage may merely log the timestamp 202 reported in the access notification 104, or the database 300 of usage may log some other measure of time (such as receipt of the access notification 104). Regardless, over time the database 300 of usage reveals a comprehensive long-term central repository of network access requested by the smartphone 32.

The security server 42 may thus exploit the historical information. The security server 42, for example, may query the database 300 of usage for any search terms and retrieve matching historical entries. The security server 42, as an example, may query for historical entries associated with the cellular identifier 110. The security server 42 may thus retrieve historical locations or networks logged in the database 300 of usage. Indeed, the security server 42 may even query for historical entries having the same or approximate date and time 304. The security server 42 may thus retrieve historical entries that match the same or similar day, time, current location 172, or network SSID 184.

Figure 28:
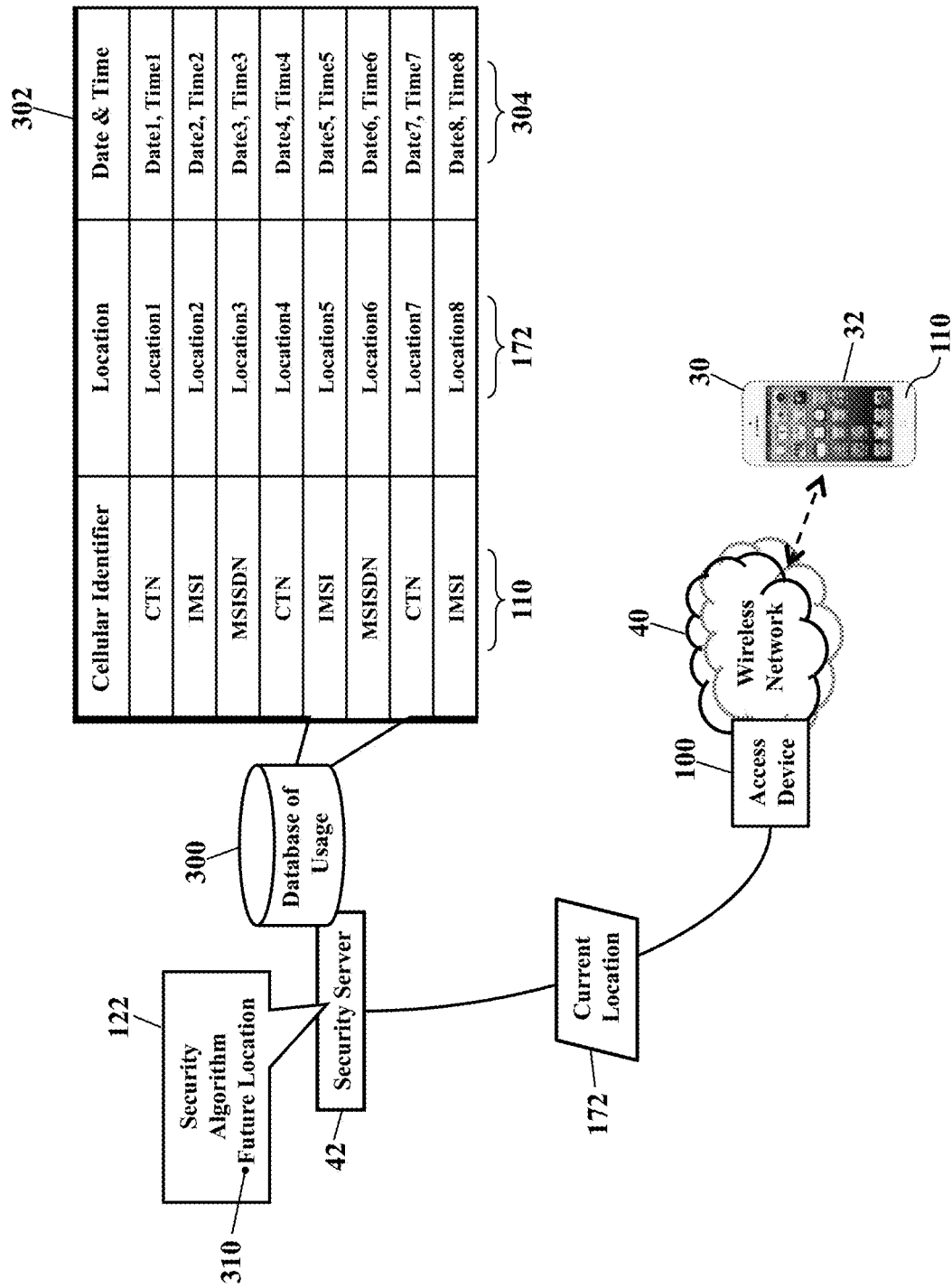

FIG. 28 illustrates locational prediction. Whenever the smartphone 32 reports its current location 172, the security server 42 may predict or infer a future location 310. For example, the security server 42 may query for a series or sequence of entries having about the same location 172 and/or the same date and time 304. For example, if one or more of the smartphone's recent locational reports match one or more historical entries, then the security algorithm 122 may infer that the smartphone 32 is moving along a path historically observed. That is, the smartphone 32 is being carried along a familiar route to a historical destination previously logged in the database 300 of usage. In other words, if a recent string or sequence of locational reports matches some sequence of historical entries, then the security algorithm 122 may conclude that the smartphone 32 is traveling along the same route to the same destination. If the smartphone 32 reports the same current locations 172 within a ten minute (10 min.) window of time as historically seen, the security server 42 may thus predict or infer that the smartphone 32 will have the future location 310 that matches at least one of the historical entries in the same series. As one example, if the smartphone's most recent five (5) location reports match some historical observance in the database 300 of usage, then the security server 42 may predict the smartphone's future location 310 will match the next historical sixth ($6^{th}$) entry in the same historical sequence. The security server 42 may thus query for any search terms and retrieve one or multiple historical entries that match recent locational reports. As most people are creatures of habit, the security server 42 may thus predict the future location 310 of the smartphone 32 based on historical observances.

Figure 29:
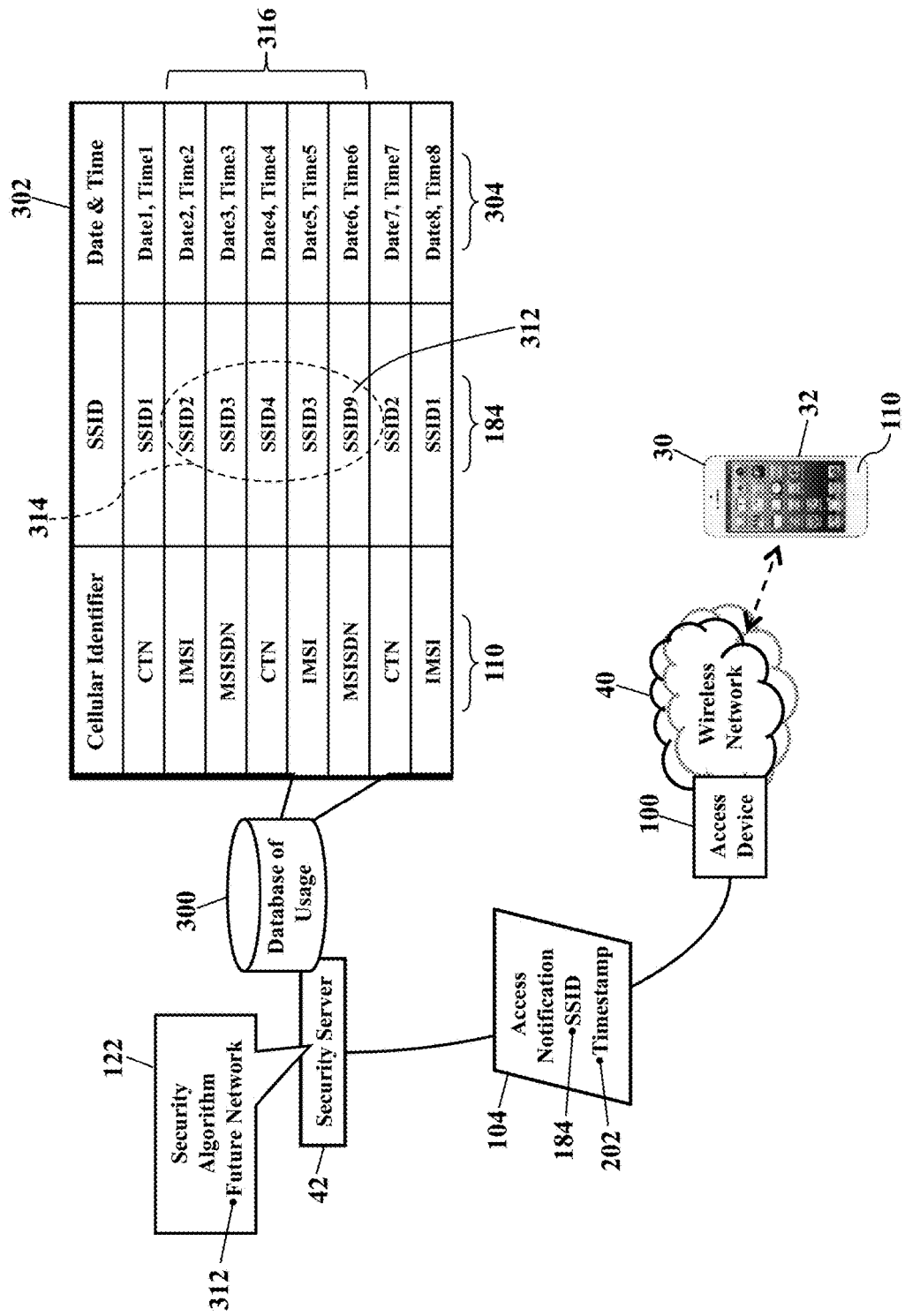

FIG. 29 illustrates network prediction. As the database 300 of usage may also log historical network requests, exemplary embodiments may predict or infer a future network 312. For example, the security algorithm 122 may predict the smartphone's access request to a wireless fidelity ("WI-FI®") network, based on the historical entries in the database 300 of usage. The security server 42 may query for a series or sequence of entries having one or more matching SSID 184 entries and/or about the same date and time 304. For example, if one or more of the recent access notifications 104 match one or more historical entries, then the security algorithm 122 may infer that the smartphone 32 is requesting access permissions along a path historically observed. In other words, if a recent string or sequence of access notifications 104 matches some sequence of historical entries, then the security algorithm 122 may conclude that the smartphone 32 is requesting wireless access as historically seen. If a string or sequence 314 of the access notifications 104 match historical entries within a ten minute (10 min.) window 316 of time, the security server 42 may thus predict or infer that the smartphone 32 will request access to a next entry historically observed in the same series. As FIG. 29 illustrates, if the recent access notifications 104 report the sequence 314 "SSID2, SSID3, SSID4, SSID3," then the security algorithm 122 may retrieve the next entry in the same sequence 314 and predict that the smartphone 32 will next request access to "SSID9." The security algorithm 122, in other words, infers the future network 312 as the next entry in the matching sequence 314. The security algorithm 122 may thus pre-arrange wireless access, elevator service, lighting, and other services based on this prediction.

Figure 30:
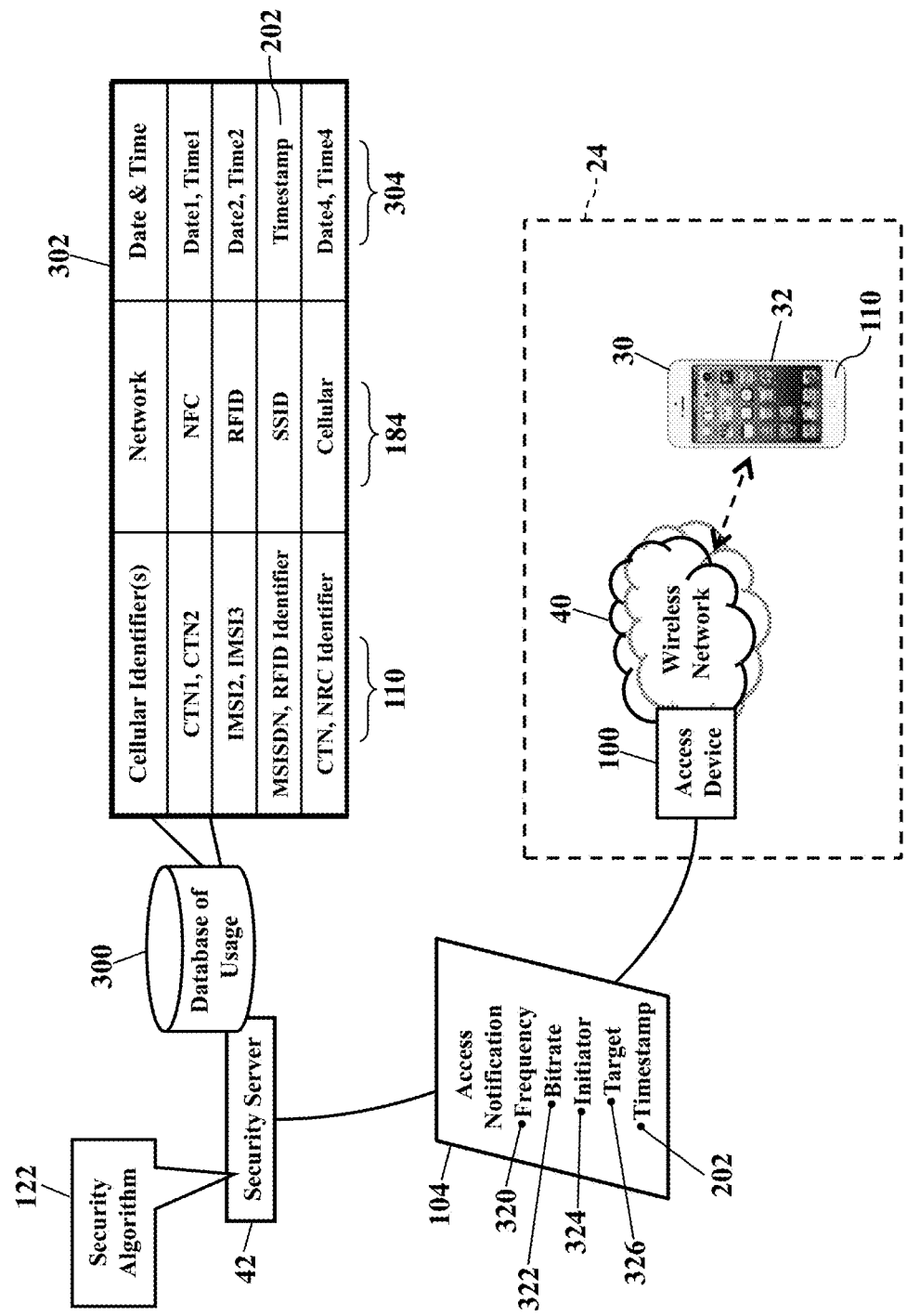
FIG. 30 is a schematic illustrating network tracking, according to exemplary embodiments.

FIG. 30 is another schematic illustrating network tracking, according to exemplary embodiments. Here exemplary embodiments may track usage or access requests to any networking environment. As FIG. 30 illustrates, whenever the smartphone 32 requests access to any wireless network 40, the access notification 104 may report the networking details. The access notification 104, for example, may report a radio frequency 320 and/or bitrate 322 of communication between the smartphone 32 and some other wireless device. The timestamp 202 may be further added. When the security server 42 receives the access notification 104, the security algorithm 122 may thus log these details in the database 300 of usage. For example, the radio frequency 320 and/or bitrate 322 may allow the security algorithm 122 to log whether the wireless network 40 operates at cellular frequencies or WI-FI® frequencies.

Other networking environments may also be tracked. When the security server 42 receives the access notification 104, the radio frequency 320 and/or the bitrate 322 may reveal near-field communications and/or radio frequency identification ("RFID") communications. For example, when the smartphone 32 participates in near-field communication, the access notification 104 may additionally or alternatively report an initiator device 324 and a target device 326. Likewise, the access notification 104 may also detail unique radio frequency identification tags and readers. When the security server 42 receives the access notification 104, the security algorithm 122 may thus log these details in the database 300 of usage. Over time, then, the database 300 of usage contains historical entries detailing the near field and RFID transactions involving the smartphone 32. If any current transaction matches some historical entry, the security algorithm 122 may predict or infer future actions and/or locations, based on the match. The security algorithm 122 may thus pre-arrange wireless access, elevator service, lighting, and other services based on this prediction.

Figure 31:
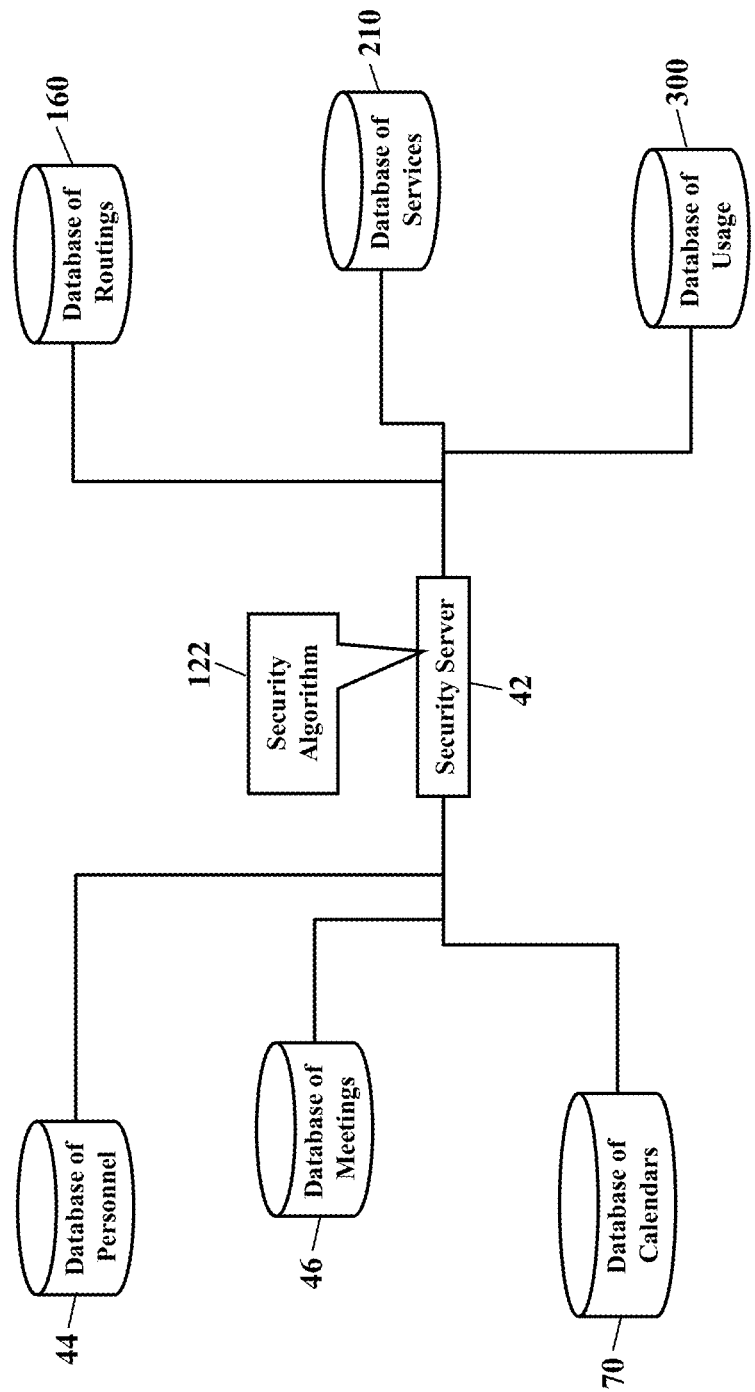
FIG. 31 is a schematic illustrating an overall database scheme, according to exemplary embodiments.

FIG. 31 is a schematic illustrating an overall database scheme, according to exemplary embodiments. Here the security server 42 may access any of the databases (illustrated as reference numerals 44, 46, 70, 160, 210, and 300) to authorize access, to coordinate services, and to predict actions, as this disclosure explains. The databases may be individually maintained or grouped together, depending on networking, processing, and storage capabilities.

Figure 32:
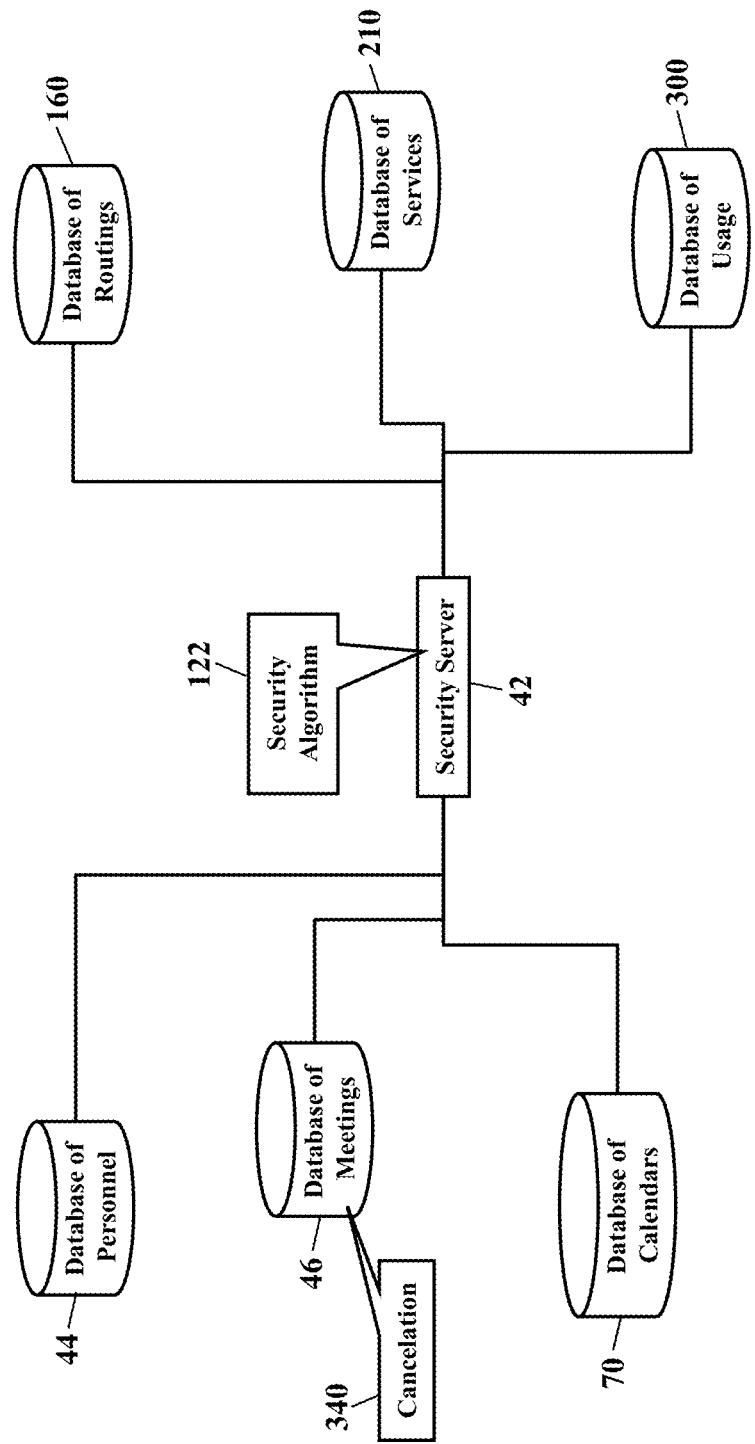
FIG. 32 is a schematic illustrating cancelations, according to exemplary embodiments.

FIG. 32 is a schematic illustrating cancelations, according to exemplary embodiments. Even though the security server 42 may have authorized access, coordinated services, and/or predicted actions, sometimes cancelations are determined. For example, a meeting organizer may simply cancel a scheduled meeting in the database 46 of meetings. This cancelation 340 may then trickle down and affect access, services, and predictions. For example, if the cancelation 340 is determined in the database 46 of meetings, the security server 42 may disperse that cancelation 340. The invitees' devices to the now-canceled meeting may be notified (perhaps using the notification message 80 illustrated in FIG. 6). Entry authorization for the invitees' devices may be canceled by removal from the database 46 of meetings and/or removal from the database 70 of calendars. The entry instruction (illustrated as reference numeral 86 in FIG. 7) may be canceled, thus stopping or ceasing any entry process. The elevator instruction (illustrated as reference numeral 272 in FIG. 23) may be canceled, thus removing any summons for elevators. Likewise, any retrieval and/or analysis of routes in the database 160 of routings may be canceled or aborted. Any retrieval and/or electronic order of services in the database 210 of services may also be canceled or aborted. Moreover, electronic notifications of the cancelation 340 may be sent to service providers (such as contractors and vendors). Any historical analysis of entries in the database 300 of usage may be halted or aborted. The cancelation 340 may thus electronically cancel any reservation for a conference room, HVAC needs, and lighting requirements.

Figure 33:
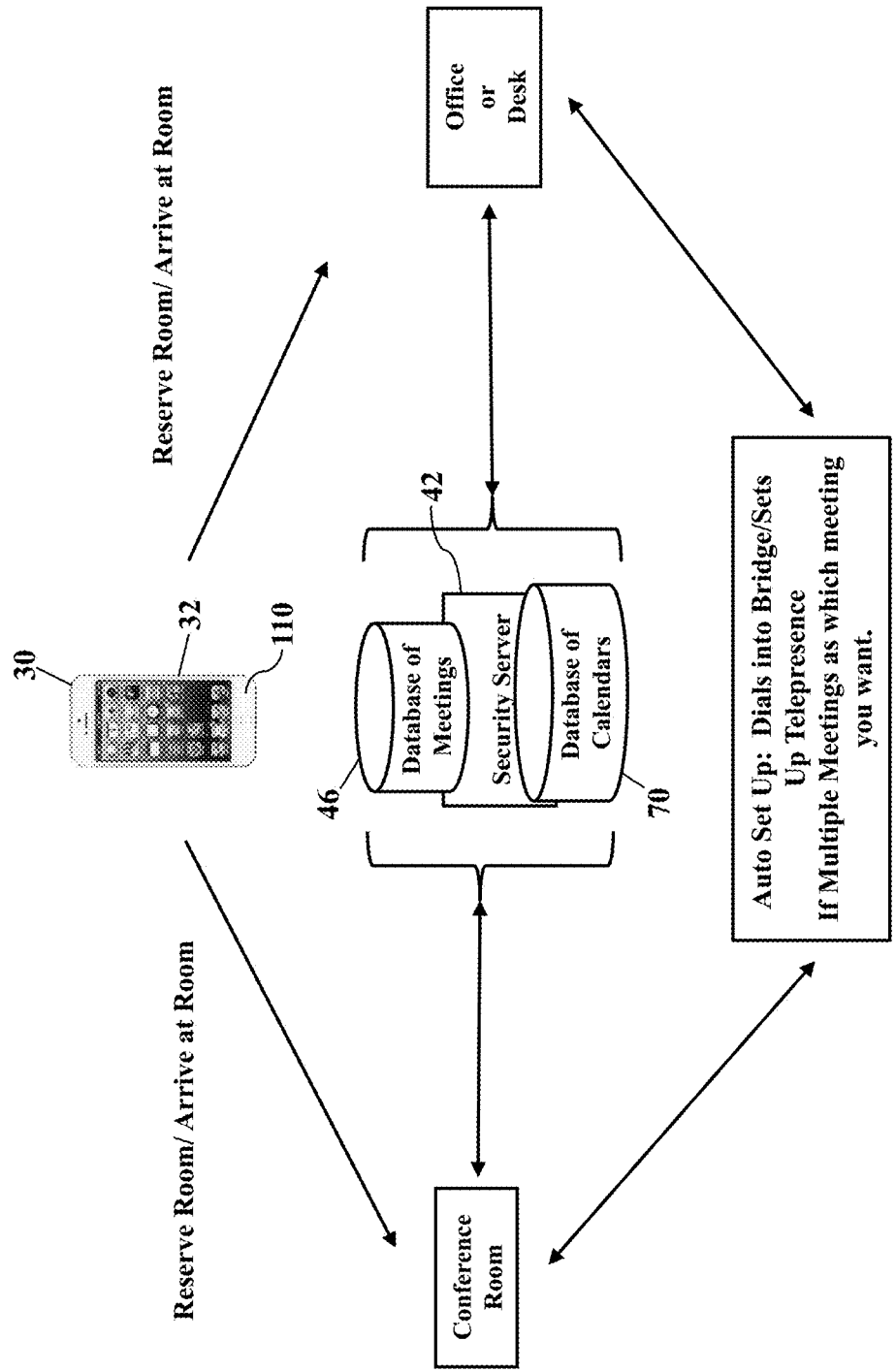
FIG. 33 is a schematic illustrating conferencing activities, according to exemplary embodiments.

FIG. 33 is a schematic illustrating conferencing activities, according to exemplary embodiments. Here exemplary embodiments may arrange and set-up a teleconference call and/or a telepresence video call between the visitor's smartphone 32 and other participants. When the visitor arrives, the visitor's smartphone 32 requests wireless access (as earlier explained). The security server 42 may thus use the unique cellular identifier 110 to retrieve any meeting entries in the database 46 of meetings and/or in the database 70 of calendars. The security server 42 may arrange a conference room and/or an office or desk for the visitor, in response to a matching entry. The security server 42 may also automatically set-up a teleconference call or a videoconference call to the meeting invitee devices retrieved from the database 46 of meetings and/or the database 70 of calendars. The security server 42 may also concomitantly arrange video cameras, whiteboards, beverages, lighting, and other services (perhaps revealed by the database 210 of services, as previously explained).

FIGS. 34-39 are schematics illustrating dynamic assignment of facilities, according to exemplary embodiments. This disclosure explains how wireless detection of any person's mobile device 30 (such as the smartphone 32) may be used to make any prediction of location, action, and/or usage. That is, wireless detection of our mobile devices allows intelligent inferences and predictions of our habits and needs. For example, patterns of wireless usage may be used to optimally configure the locations of retail displays, employee tools, service kiosks, vending machines, and advertising displays. Analysis of wireless access may yield insights into group interactions, electronic communications and collaboration, prior locational trends, and calendar schedules. Exemplary embodiments may thus predict your daily schedule, your daily movements (e.g., work and play), friends and coworkers, and your activities, all based on patterns of wireless access associated with your mobile devices. As any person or user moves or roams, the wireless detection of the mobile device 30 (such as the smartphone 32) may be tracked and historically monitored to discern and predict patterns of repeated movement and reception. These predictions may thus be used to correlate physical and logical interpersonal relationships to automatically and more effectively assign personnel to specific work locations on demand, thus maximizing productivity. Opportunities for dynamic innovation, perhaps through face-to-face interaction between people, are increased, thus allowing architects and building planners to more accurately and efficiently predict utilization and occupancy trends for use in future capacity planning.

Exemplary embodiments thus reveal much information about users. The database 300 of usage, for example, may log interactions between the smartphone 32 and other wireless devices. This information thus reveals with whom the user is actually communicating and collaborating across both physical and electronic interactions. These interactions may be used to dynamically optimize physical work environments. These interactions may also be used to accurately adjust physical locations as relationships change over time. Due to the dynamic nature of today's global business, a person's sphere of interest and required contacts may change on a regular basis. Some users may have collaborational needs that change on a daily basis, while other users may have needs that change hourly or monthly. Exemplary embodiments may thus dynamically react, regardless of the time frame. These regular or irregular changes may result in broad changes of an enterprise's voice and data network service requirements, including access, bandwidth, and service quality.

Exemplary embodiments may thus utilize big data analytics. As the reader may understand, information is currently generated for every phone call, instant message, email, social media posting, calendar event(s), work project(s), and audio or video conference (perhaps in both an enterprise environment and in a carrier environment). More data is created on the location of a person geospatially depending upon the configuration and capabilities of their laptop, smartphone, tablet or wearable device. Even though many enterprises and service providers generate and collect these data, exemplary embodiments add correlation to effect improvements in user productivity, to increase the opportunity for dynamic collaboration through face-to-face interactions, and to identify trends for capacity planning. For example, exemplary embodiments may automatically allocate workspace based on wireless detection of mobile devices. That is, teams of individuals may be defined by their respective cellular identifiers 110. Physical space, and even work desks and conference rooms, may be allocated based on the wireless detection of their smartphones 32. In other words, office space is automatically located with other team members having the same goals, projects and/or tasks. As projects change over time, physical workplace assignments are optimally configured to enable regular, consistent, face-to-face and virtual interactions between team members, according to their unique cellular identifiers 110. One day the physical space may reduce when few smartphones are detected or predicted in advance by analysis, while the next day the physical space may be expanded when many team members' smartphones request wireless access.

Exemplary embodiments may thus collect electronic data regarding members of groups. As the members collaborate and communicate, their respective mobile devices generate electronic data. All this electronic data is conveyed along the wireless network 40 and/or the communications network 106 for delivery to different destinations. Any electronic data associated with the mobile devices 30 (such as the unique cellular identifier 110 of their smartphone 32) may thus be used to dynamically alter physical building needs. Small conference rooms may thus be scheduled when only a few cellular identifiers 110 are detected. Larger conference rooms are scheduled when many team members are detected.

Usage patterns are also valuable for designers. Over time the databases (illustrated as reference numerals 44, 46, 70, 160, 210, and 300 in this disclosure) may reveal long-term historical information that is of value to architects and other designers. Exemplary embodiments, for example, may reveal that only forty percent (40%) of employees' smartphones are detected or predicted on any given day. Physical needs may thus be significantly reduced, as one hundred percent (100%) capacity is not needed. Indeed, one general all-purpose space (such as an auditorium, cafeteria, lobby, warehouse footage, etc.) may be developed to accommodate abnormally large gatherings of employees. Alternatively, the security server 42 may sum or tally the predicted or actual number of detected wireless devices and automatically reserve or arrange off-site space (such as a hotel conference room or school gymnasium). Long term patterns of wireless detection and usage may also reveal the need for physical and technological renovations of existing facilities.

Exemplary embodiments may thus adapt to changing times and needs. As the security server 42 monitors wireless detection of mobile devices, floor space and office equipment become adaptive tools that generate data on their health and occupancy. Physical spaces may be dynamically optimized based on virtual or electronic interactions as those relationships change and evolve. Increasing the probability of face-to-face interactions as work locations are assigned enhances the opportunity for dynamic interpersonal innovation. Moreover, exemplary embodiments improve real estate planning efforts, thus leveraging actual user data to predict future workplace capacity and utilization patterns. Depending upon the location and size of the user base, this approach also has potential impacts on energy utilization, commuter traffic utilization, civil/environmental engineering and employee satisfaction, recruiting/retention, and work-life balance.

Figure 34:
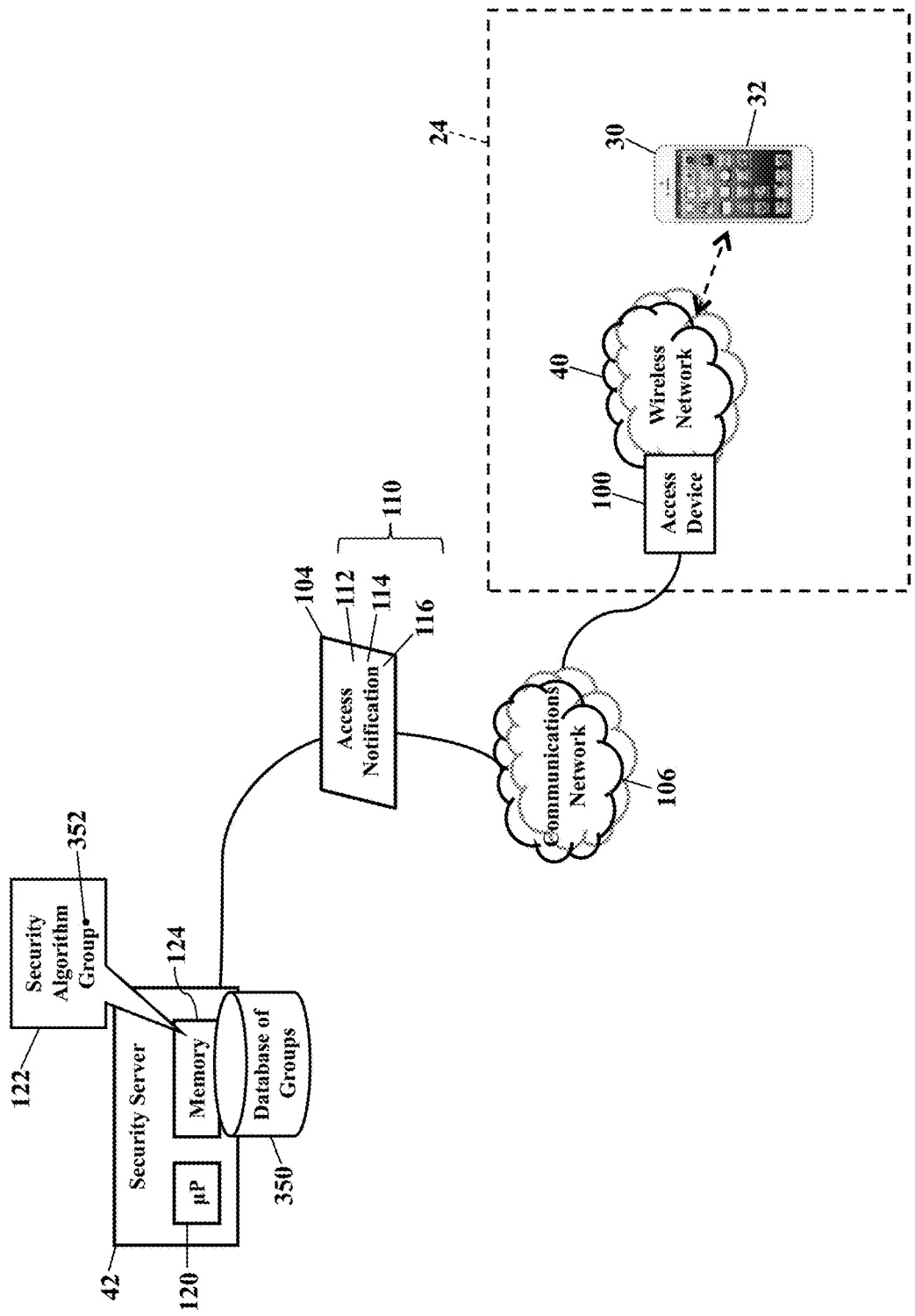
FIGS. 34-40 are schematics illustrating dynamic assignment of facilities, according to exemplary embodiments.

FIG. 34 thus illustrates a database 350 of groups. The database 350 of groups stores a roster for different groups 352 of employees, contractors, and other personnel. The database 350 of groups, in other words, stores the membership of teams, departments, offices, and any other grouping or organization of people. However the groups 352 of people are organized, the database 350 of groups stores the different memberships of those groupings.

Each member, though, is uniquely identified by their mobile device 30 (illustrated as the smartphone 32). As each group member enters the building 24, exemplary embodiments may log their presence in the database 350 of groups. That is, when each group member's smartphone 32 is wirelessly detected, exemplary embodiments may update the database 350 of groups. Exemplary embodiments, for example, may define membership according to each person's unique cellular identifier 110. Each different group 352, in other words, may be defined according to the unique cellular identifiers 110 of its members. As each member's smartphone 32 requests wireless access to the wireless network 40, exemplary embodiments may determine the corresponding membership in one or more teams, departments, or other groupings.

The security server 42 may query the database 350 of groups. When the security server 42 receives the access notification 104, the security algorithm 122 causes the processor 120 to query for entries that match the query search term(s) detailed or described in the electronic access notification 104. The security server 42 may thus query the database 350 of groups for the cellular identifier 110 associated with the personal wireless device 30 (such as the smartphone 32) requesting wireless access to the wireless network 40. If the database 350 of groups contains a matching entry, then the security server 42 knows that one of the members of the group 352 is present in the building 24. The security server 42 may then dynamically configure physical facilities, as later paragraphs will further explain.

Figure 35:
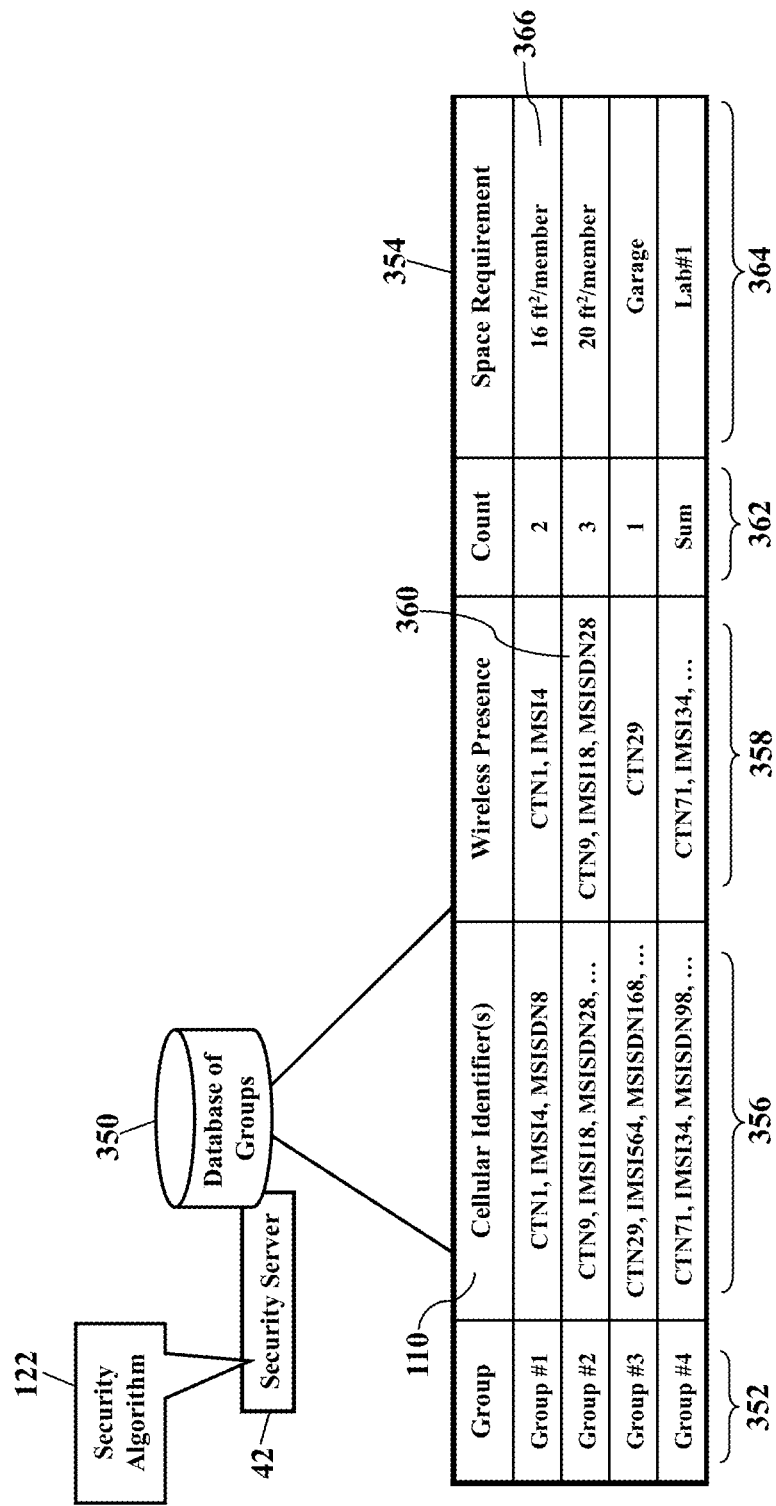

FIG. 35 further illustrates the database 350 of groups. The security server 42 may query the database 350 of groups. For simplicity the database 350 of groups is illustrated as a table 354 that electronically maps, relates, or associates different groups 352 to their corresponding membership 356. Here, though, each member 356 is defined by the cellular identifier 110 associated with the member's personal wireless device (such as the smartphone 32 illustrated in FIG. 34). Each member 356, though, may be additionally or alternatively uniquely identified by any other alphanumeric combination, such as an employee number, a network address, a manufacturer's serial number, or even a name. FIG. 35 illustrates the database 350 of groups as being locally stored in the memory 124 of the security server 42, but some or all of the database entries may be remotely maintained at some other server or location in the communications network (illustrated as reference numeral 106 in FIG. 8). While FIG. 35 only illustrates a few entries, in practice the database 350 of groups may contain many entries for hundreds or thousands of groupings.

Exemplary embodiments may thus track a wireless presence 358 of different groups. When any wireless device requests wireless access, the security server 42 may determine its corresponding membership 356 in the one or more groups 352. As FIG. 35 also illustrates, exemplary embodiments may also track the current wireless presence 358 of the different group members 356. That is, whenever the member's cellular identifier 110 is matched as one of the group members 356, the database 350 of groups may also log that wireless presence 358. Exemplary embodiments, in other words, may generate a listing 360 of members who have a physical presence in the building (illustrated as reference numeral 24 in FIG. 34), as determined by their wireless presence 358. The listing 360 of members, for example, may be a list or string of the different cellular identifiers 110 associated with the members' personal wireless devices requesting wireless access. At any time, then, the security server 42 may query the database 350 of groups and retrieve the listing 360 of members who are physically present in the building 24, as determined by their respective cellular identifiers 110.

Exemplary embodiments may maintain a numerical count 362. As members come and go, their respective wireless devices will change their wireless presence 358. For example, as a member's smartphone accesses the wireless network (illustrated, respectively, as reference numerals 32 and 40 in FIG. 34), the listing 360 of members will increase in number to reflect an addition of the team member 356. When the member leaves or exits the building 24, the smartphone 32 leaves or disconnects from the wireless network 40 (e.g., no longer accesses the wireless network 40), the listing 360 of members may decrease in number to reflect a subtraction of the team member 356. The database 350 of groups may thus maintain the current numerical count 362 of the listing 360 of members who are physically present in the building 24, as determined by their respective cellular identifiers 110 accessing the wireless network 40. Exemplary embodiments may sum the entries in listing 360 of members to determine the current numerical count 362. At any time, then, the security server 42 may query the database 350 of groups and retrieve the current numerical count 362 of the corresponding group members 356 who are physically present in the building 24 (as determined by their respective cellular identifiers 110).

As FIG. 35 also illustrates, the database 350 of groups may include a physical space requirement 364. Each different group 352 may have requirements for its physical space. Some groups, for example, may require a large space to complete their assigned task. A repair group, for example, may require a large physical space to accommodate both the members and their tools/equipment. Likewise, an engineering group may require a larger physical space to accommodate workstations, design mockups, and collaborative video conferencing tools. A smaller group, with lesser needs, may thus require a much smaller physical space. Each group 352 may thus have its associated physical space requirements 364.

For example, FIG. 35 illustrates a square footage 366. That is, the physical space requirement 364 may be defined in terms of the square footage 366 per member who is physically present. As this disclosure previously explained, a group 352 may only have a fraction of its total membership present on any particular day. Some members may be on vacation, some may be sick, and some may work off-site. Physical needs may thus be significantly reduced, as one hundred percent (100%) capacity is not needed. Exemplary embodiments may thus calculate any group's physical space according to the square footage 366 per member who is physically present. The security server 42 may thus query the database 350 of groups and retrieve the current numerical count 362 of the corresponding group members 356 having the wireless presence 358 (as determined by summing their respective cellular identifiers 110). The security server 42 may then multiply the current numerical count 362 by the square footage 366 per member to determine the physical space requirement 364. For example, if five (5)

team members are wirelessly detected, and each member requires sixteen square feet (16 ft$^2$), then $$\text{physical space requirement} = (5 \text{ members}) \times (16 \text{ ft}^2/\text{member}) = 80 \text{ ft}^2.$$

As only five (5) team members' devices are wirelessly detected, the group 352 only requires 80 ft$^2$ of physical space. The group 352, in other words, may only require a small conference room or lounge to accomplish their assigned task. A larger physical space is likely wasted on such a small wireless presence. A larger physical space, in other words, may be reserved for a larger group whose members are wirelessly detected.

Figure 36:
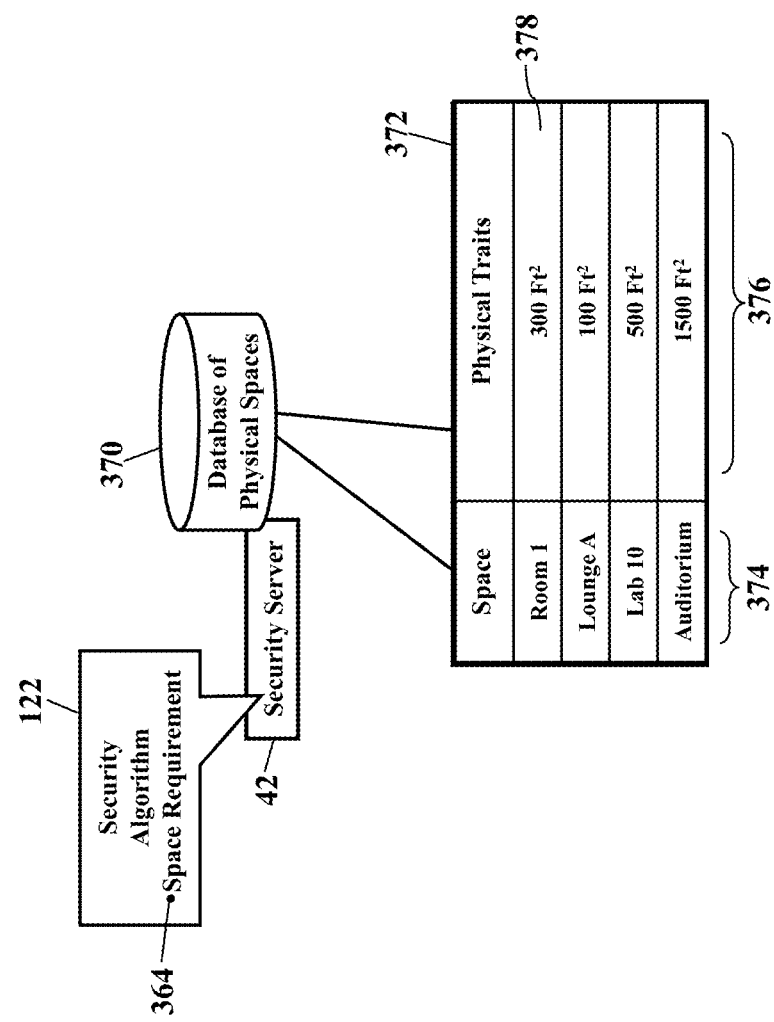

FIG. 36 illustrates a database 370 of physical spaces. Once the security server 42 determines the physical space requirement 364 for the members' devices wirelessly detected, the security server 42 may query the database 370 of physical spaces. The database 370 of physical spaces allows the security server 42 to dynamically assign facilities, according to the physical space requirement 364 for the members wirelessly detected. For simplicity the database 370 of physical spaces is illustrated as a table 372 that electronically maps, relates, or associates different physical spaces 374 to their corresponding physical traits 376. The database 370 of physical spaces, for example, may have electronic database associations between different rooms and offices to their corresponding physical measurements (e.g., such as their square footage 378). FIG. 36 illustrates the database 370 of physical spaces as being locally stored in the memory 124 of the security server 42, but some or all of the database entries may be remotely maintained at some other server or location in the communications network (illustrated as reference numeral 106 in FIG. 8). While FIG. 36 only illustrates a few entries, in practice the database 370 of physical spaces may contain many entries for hundreds or thousands of physical spaces. Regardless, once the security server 42 determines the physical space requirement 364 for the members wirelessly detected, the security server 42 may query the database 370 of physical spaces and retrieve the physical space 374 that matches the physical space requirement 364 for the detected members. The security server 42 may thus dynamically assign and reserve the physical space 374 that best meets the physical space requirement 364 for the members wirelessly detected.

Exemplary embodiments may thus dynamically assign facilities. Again, a group 352 of one hundred different members 356 may only have twenty (20) present at any time, given different personal and work schedules. Exemplary embodiments thus use wireless detection of each member's mobile device 30 to determine physical needs. Exemplary embodiments may thus dynamically assign desks, workspaces, and other physical needs, based on wireless detection.

Figure 37:
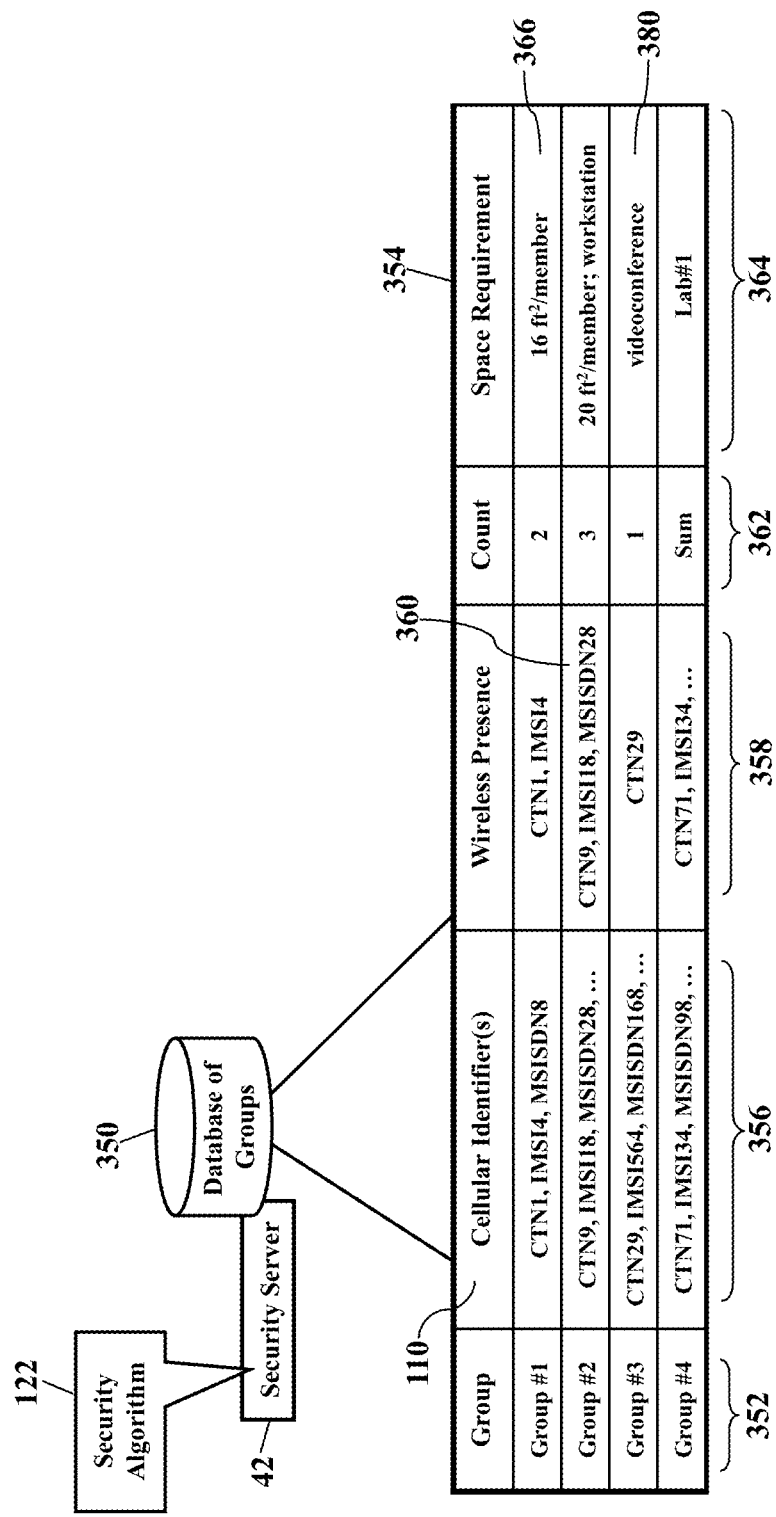
Figure 38:
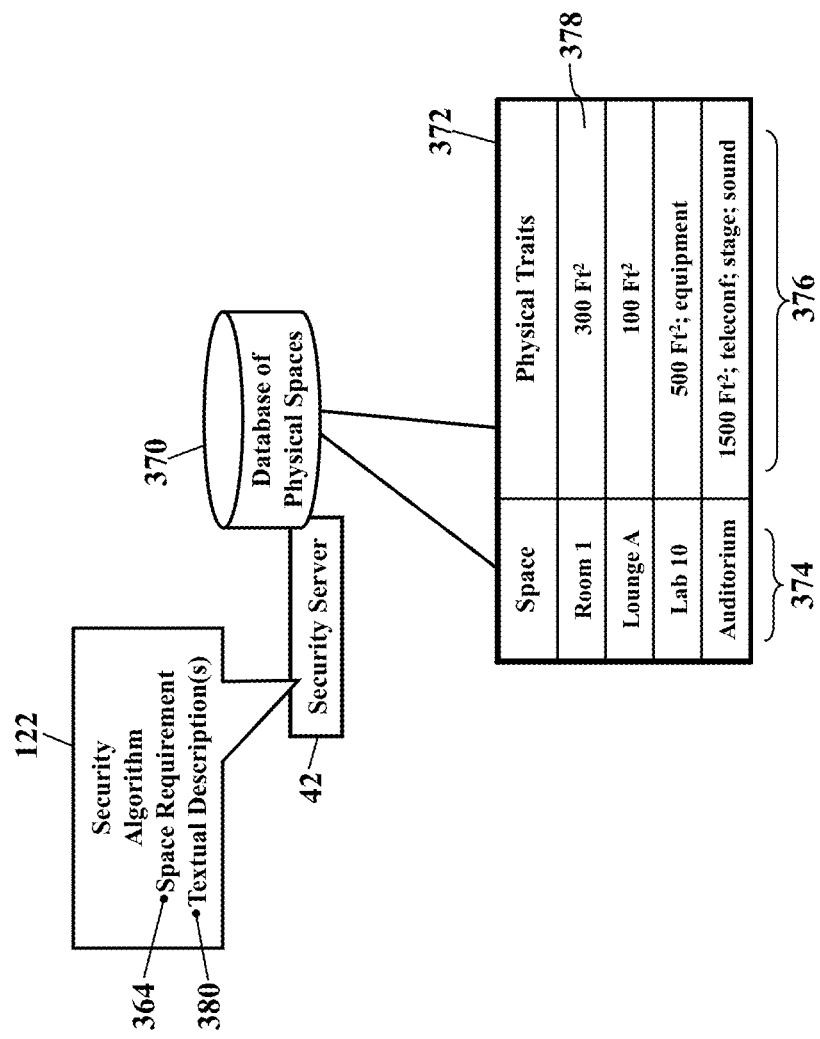

FIGS. 37-38 illustrate other physical space requirements 364. As the reader may understand, some groups 352 may have other requirements for its physical space. Some groups, for example, may require at least one workstation computer for complex analysis of design parameters. Another group 352 may require video conferencing capability, with a large display for conducting business or research. Still another group 352 may require a special laboratory with special equipment to perform research activities. The database 350 of groups may thus further include a textual description 380 of any additional physical space requirements 364. As FIG. 38 illustrates, when the security server 42 queries the database 370 of physical spaces, the search term(s) may thus also include the textual description 380 of any additional physical space requirements 364. The security server 42 may thus retrieve the physical space 374 that also matches the textual description 380 of any additional physical space requirements 364. The security server 42 may thus dynamically assign and reserve the physical space 374 that best meets the textual description 380 of the additional physical space requirements 364 for the members wirelessly detected. The security server 42, in other words, may dynamically assign rooms or labs having specialized equipment needed by any group to accomplish their assigned task.

Exemplary embodiments may also operate as previously mentioned. For example, once the security server 42 determines the physical space 374, the security server 42 may retrieve the route 162 to the physical space 374 (as explained with reference to FIGS. 14-18). Exemplary embodiments may determine any of the services 216 associated with the physical space 374 (as explained with reference to FIGS. 19-22). An elevator may be summoned, as explained with reference to FIG. 23. Exemplary embodiments may also track network usage and make predictions, as explained with reference to FIGS. 26-29.

Figure 39:
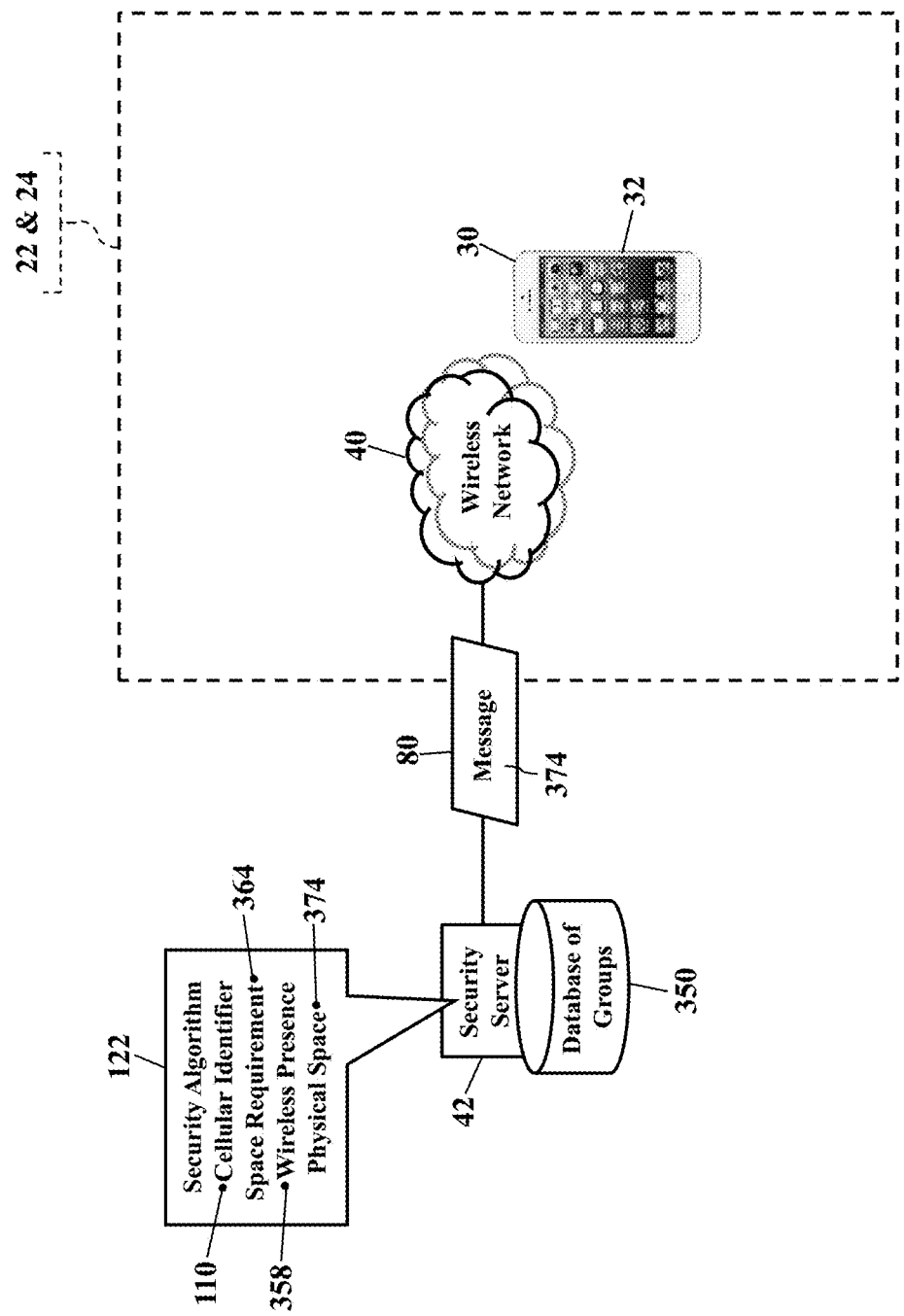

FIG. 39 illustrates notification. Once the security server 42 determines the physical space 374 for the members wirelessly detected, electronic notifications may be sent. The security server 42 may thus generate the electronic message 80 detailing the physical space 374 assigned to the group 352. Most likely the electronic message 80 will include digital or electronic information uniquely describing a desk or room number assigned to members wirelessly detected. The electronic message 80, for example, may identify a lounge or conference room selected to satisfy the physical space requirements 364 for the members wirelessly detected. For simplicity, the electronic message 80 may be addressed to the unique cellular identifier 110 associated with each member's device. For simplicity, FIG. 30 illustrates the electronic message 80 routing for transmission by the wireless network 40 to the smartphone 32 having the wireless presence 358 in the database 350 of groups. Each member may thus be notified of the physical space 374 assigned to the group 352.

Exemplary embodiments may thus dynamically allocate and reserve based on wireless presence. If only a single member of the group needs physical space, perhaps only a single desk or office is needed. Exemplary embodiments, then, may select a desk or office satisfying the locational and/or equipment needs of the single member. Exemplary embodiments may thus generate an electronic reservation to reserve the desk or office for the use of the single member. Exemplary embodiments, in other words, may form or generate an electronic database association between the member's unique cellular identifier 110 and a desk number and/or office number. A larger physical space may be reserved and electronically associated with a larger group of members' cellular identifiers 110. The database 350 of groups may thus contain a central repository of reservations between the members 356 having the wireless presence 358 and their assigned, reserved physical space 374.

Figure 40:
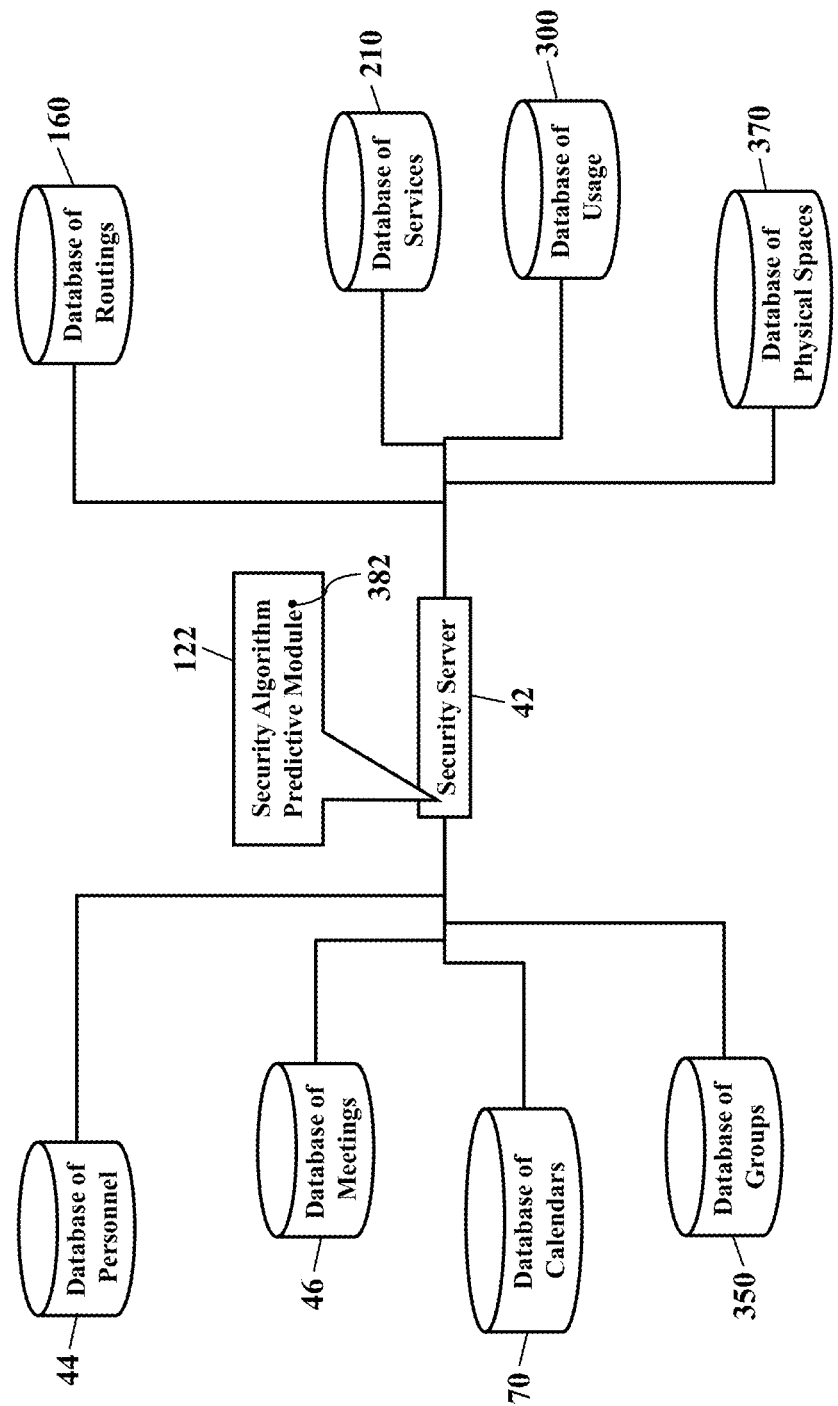

FIG. 40 illustrates predictive analysis. Now that the architectural scheme is developed, exemplary embodiments may implement a predictive component to further maximize collaboration and efficiency of physical space. For example, as the security server 42 executes the security algorithm 122, the security server 42 may also access and execute a predictive module 382. The predictive module 382 has instructions, programming, or code that causes the security server 42 to infer physical assignments, based on analysis of the electronic data or entries in any of the electronic databases 44, 46, 70, 160, 210, 300, 350, and/or 370. The predictive module 382 may thus have access to rules and other logical relationships defining conditions, parameters, and/or threshold values for predictive decisions.

Predictive analytics may thus be applied to physical needs. This disclosure explains how each person's mobile device 30 may be tracked and monitored for movements. Moreover, this disclosure also explains how historical observances of mobile devices may be used to infer future actions. Over time, then, the database 300 of usage reveals habitual usage for any mobile device (such as the smartphone 32). Whenever any person's mobile device 30 is detected, the security server 42 may retrieve the corresponding usage pattern and predict future movements and actions, based on historical or habitual observance. This repeated observance thus reveals what mobile devices are typically detected at the same (or nearly the same) work location. Wireless detection also reveals which employees only intermittently work on site (such as those who remotely work from home or other facilities). The entries in the electronic databases 44, 46, 70, 160, 210, 300, 350, and/or 370 reveal which workers often collaborate, whether or not assigned to the same group or team. Exemplary embodiments also know the locations of these formal or informal collaborations. Exemplary embodiments may thus automatically assign a typical or formal location for repeated collaborative efforts, thus promoting consistency in work location that fosters successful face-to-face communication. However, the security server 42 may determine that a random or different physical location is preferred, perhaps in an effort to spawn new ideas with new people.

Calendric and locational information may be especially predictive. Whenever mobile devices 30 are wirelessly detected, the security server 42 may retrieve the corresponding electronic calendars and habitual usage (as earlier explained). The security server 42 may then assign a physical location based on this calendric and locational information. As one example, if a majority of the invitees or members of a group are nearly co-located, the security server 42 may select a physical space in the vicinity of the majority. However, if the invitees or group have special or unique space requirements (as illustrated with reference to FIGS. 35-38), a compatible physical space may be assigned. Personal days, holidays, and other calendric entries may be used to dynamically reduce headcounts and, thus, physical needs. Impending weather events (perhaps as revealed by the weather data 249 illustrated in FIG. 21) may also be used to dynamically reduce headcounts and, thus, physical needs.

Intelligent notifications may be sent. Whenever any physical space is selected for any collaboration, people may be notified. This disclosure, for example, previously explained how the electronic message 80 may be sent any user's destination device 82. Exemplary embodiments may thus additionally or alternatively send the electronic message 80 when alerting of a physical location assigned to a collaborative effort. Emails, text messages, and/or SMS messaging may be used to identify workspace assigned to a collaborative effort. Yet these electronic notifications may themselves be intelligently dispatched. For example, if an employee only occasionally enters the building 22, then the electronic message 80 may be sent detailing an assigned workspace for that day. However, if a group habitually meets every Thursday in the same physical location, exemplary embodiments may decline to send the electronic message 80. Exemplary embodiments may simply decline to clutter or clog messaging inboxes with known, habitual information describing a consistent work location. However, should the habitual routine change, then exemplary embodiments may send notifications to alert of an atypical, new, or more optimal location. For example, maintenance efforts may force the group to meet in a different location. A special event may also force the group to meet in a different location. Whatever the reason, exemplary embodiments need only notify when necessary or desired. Again, then, exemplary embodiments promote consistency in assignment.

Another example is provided. Suppose the security server 42 accesses the database 70 of calendars and retrieves electronic information describing one or more electronic calendars of employees (perhaps as identified by their respective mobile device 30, as this disclosure explains). If any of the electronic calendars have entries indicating an absence, then the predictive module 382 may cause the security server 42 to infer or predict that those employees will not need physical space (e.g., a desk or office) for the absent times of days. If any of those absent employees are invitees to a meeting (as revealed by the database 46 of meetings), the security server 42 may infer or predict that those same absent employees will not be attendees to the scheduled meeting. Services may be reduced or even eliminated, as revealed by the database 210 of services. The absentees may be noted or logged in the database 350 of groups, thus perhaps further reducing any physical needs detailed in the database 370 of physical spaces. Perhaps electronic notifications need not be sent to the mobile devices of the absentees, as the messaging content may not be relevant for those not present. A simple electronic calendar entry, in other words, may cascade throughout the architecture for maximum efficiency of physical spacing.

Exemplary embodiments thus promote efficient and maximized collaboration. The entries in the electronic databases 44, 46, 70, 160, 210, 300, 350, and/or 370 may be mined using data analytics to reveal habitual collaboration between people (based on wireless detection of their respective mobile devices 30). The locations of these collaborations may thus be matched with performance goals, product launches, and even sales figures. Exemplary embodiments, in other words, may be matched against performance metrics to determine which collaborations yield successful outcomes. As one example, some employees may repeatedly collaborate on products that generate a steady stream or majority of revenues. Some physical locations may be better at spawning creative, new ideas (such as objectively measured by patent filings according to conference room, lobby, or other physical location within the building 22).

Figure 41:
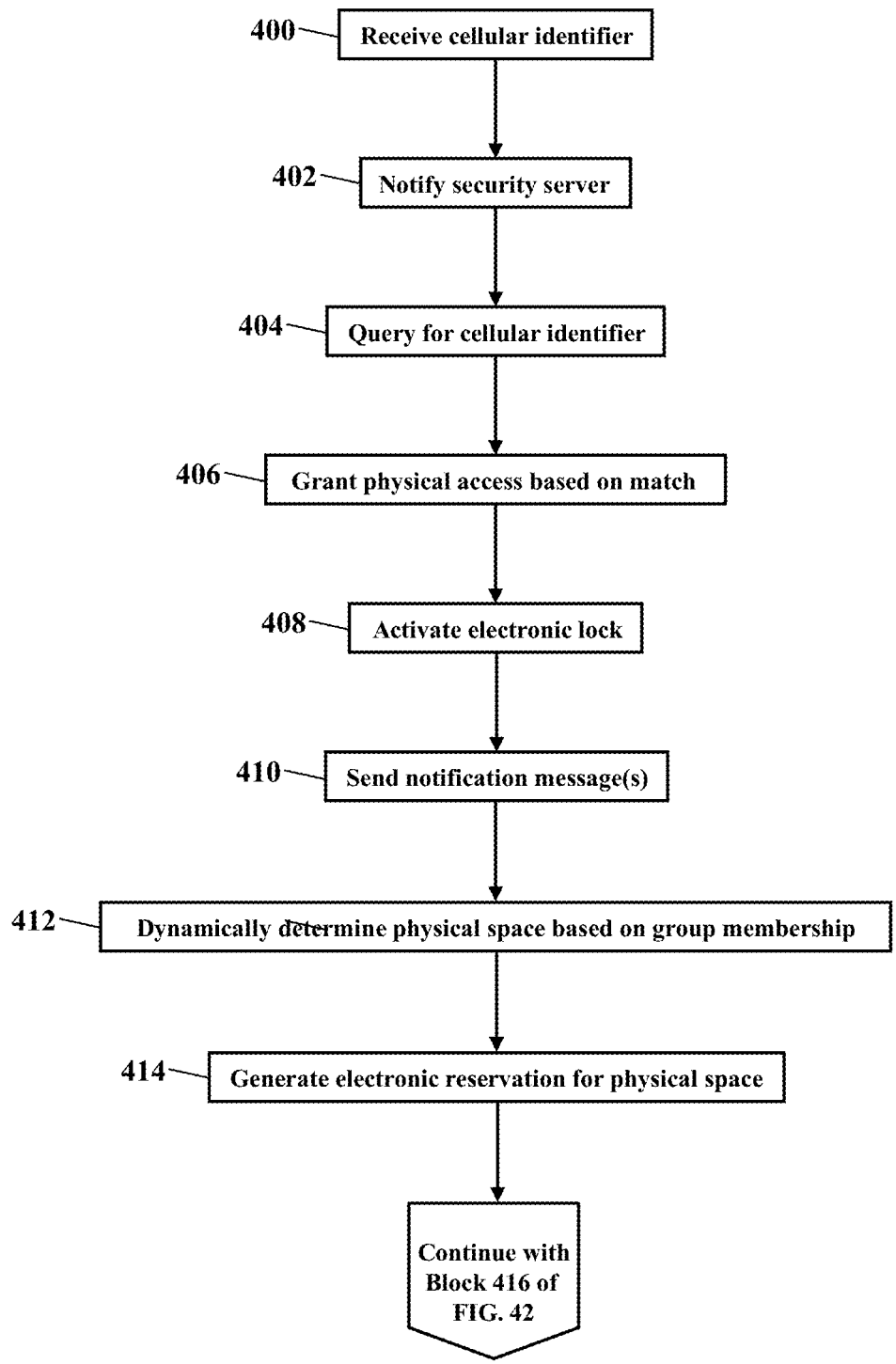
FIGS. 41-42 are flowcharts illustrating an algorithm for access authorization, according to exemplary embodiments.
Figure 42:
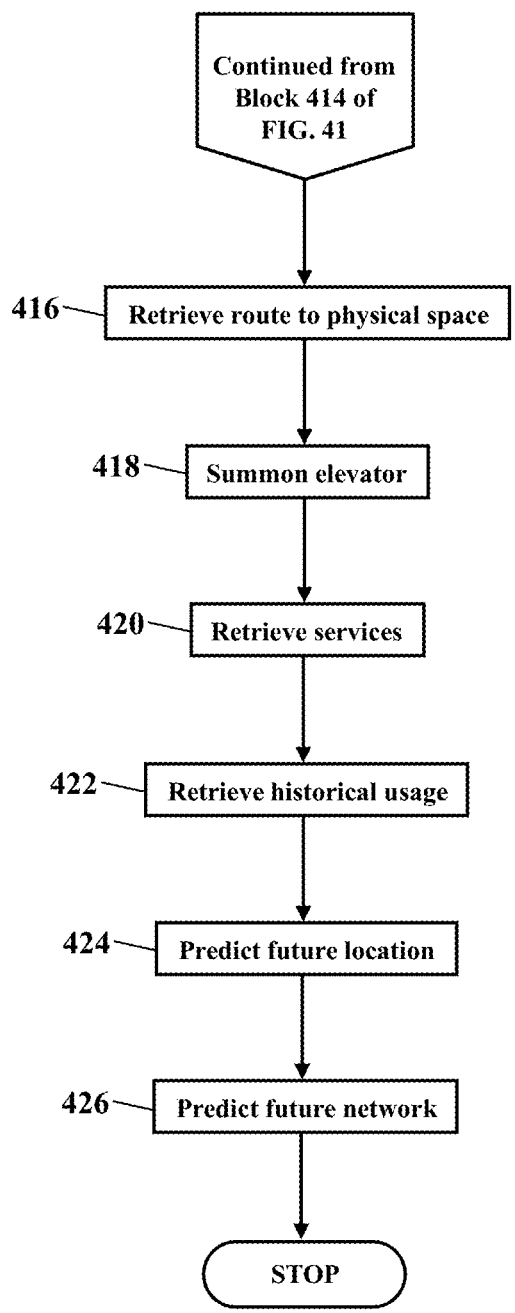

FIGS. 41-42 are flowcharts illustrating an algorithm for access authorization, according to exemplary embodiments. A unique cellular identifier 110 is received (Block 400) and the security server 42 is notified (Block 402). A database is queried for the cellular identifier 110 (Block 404). Physical access to a secure area is granted, based on a matching entry in the database (Block 406). The electronic lock 90 may be activated to permit entry (Block 408). The electronic notification message 80 may be sent to a meeting organizer and/or other invitees, thus alerting to the arrival and access of the user associated with the cellular identifier (Block 410). The physical space 374 may also be dynamically determined, based on the membership 356 in the group 352 (Block 412). An electronic reservation is generated for the physical space 374 (Block 414).

The flowchart continues with FIG. 42. Once the physical space 374 is known, the corresponding route 162 may be retrieved (Block 416). The elevator 94 may be summoned (Block 418). The corresponding services 216 may also be retrieved (Block 420). Historical usage may be retrieved (Block 422). The future location 310 (Block 424) and/or the future network 312 (Block 426) may be predicted.

Figure 43:
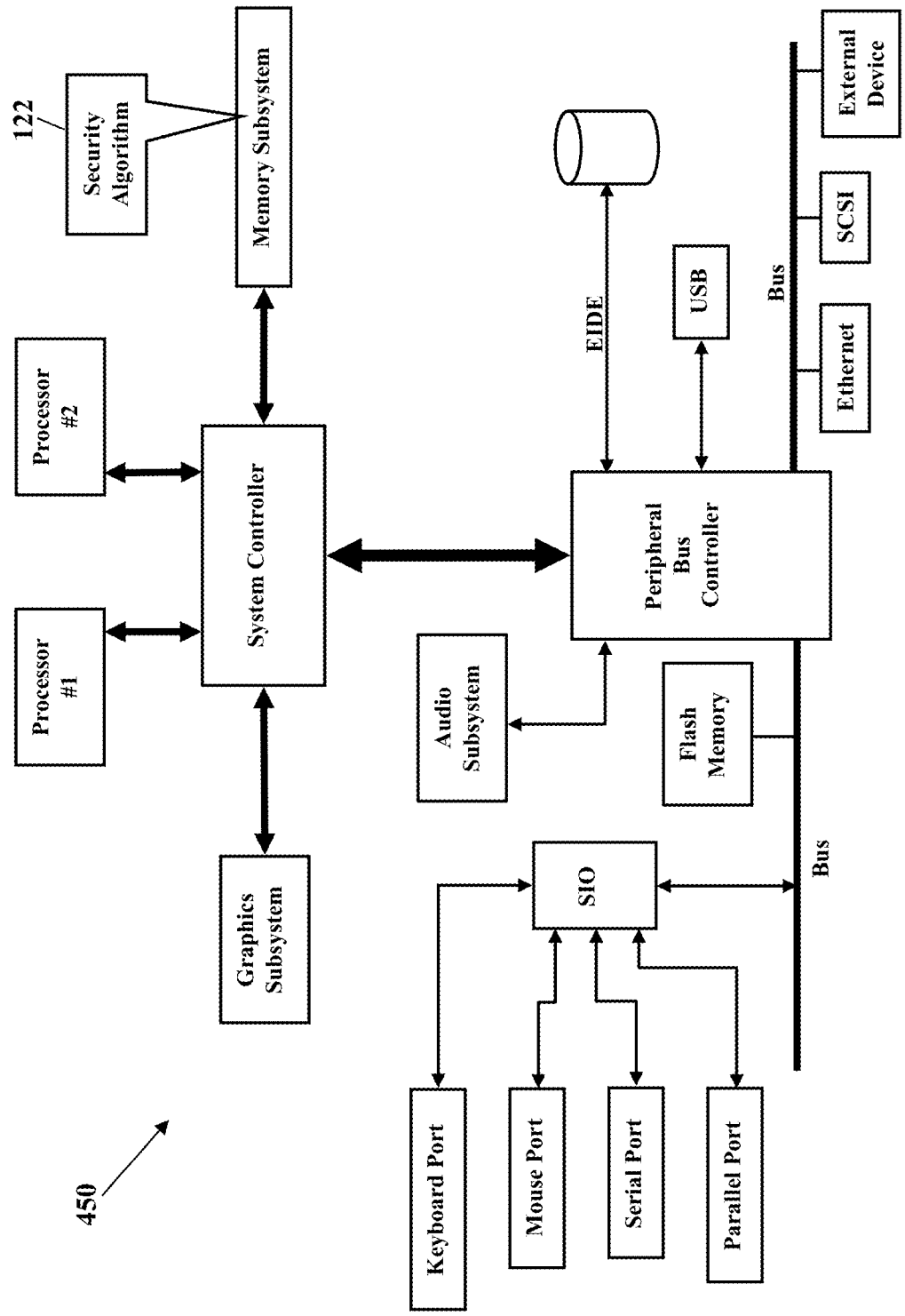
FIGS. 43-44 depict still more operating environments for additional aspects of the exemplary embodiments.

FIG. 43 is a schematic illustrating still more exemplary embodiments. FIG. 43 is a more detailed diagram illustrating a processor-controlled device 450. As earlier paragraphs explained, exemplary embodiments may partially or entirely operate in any mobile or stationary processor-controlled device. FIG. 43, then, illustrates the security algorithm 122 stored in a memory subsystem of the processor-controlled device 450. One or more processors communicate with the memory subsystem and execute either, some, or all applications. Because the processor-controlled device 450 is well known to those of ordinary skill in the art, no further explanation is needed.

Figure 44:
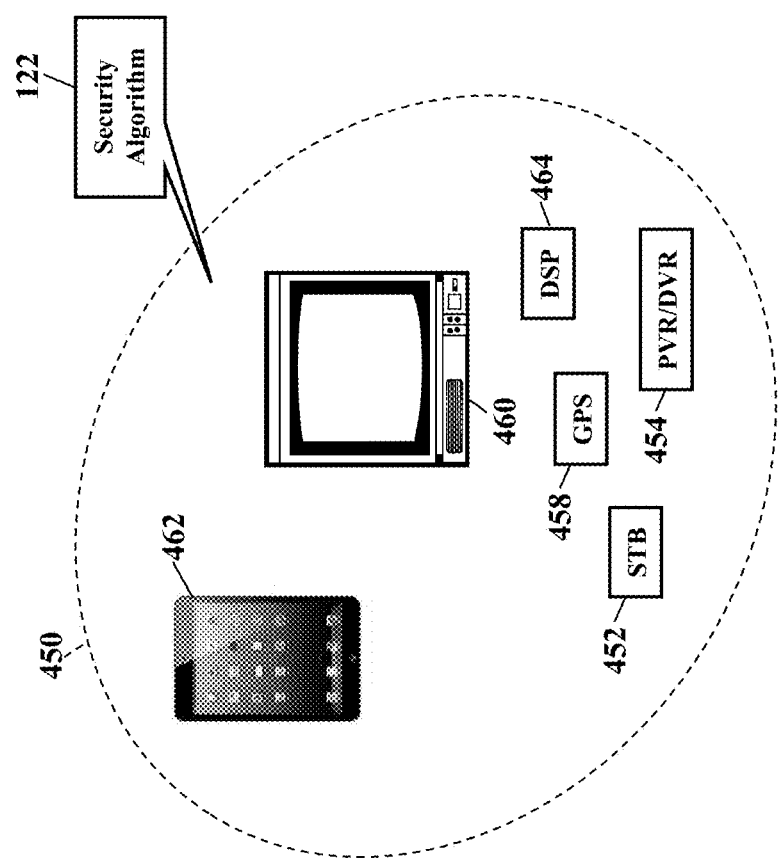

FIG. 44 depicts other possible operating environments for additional aspects of the exemplary embodiments. FIG. 44 illustrates the security algorithm 122 operating within various other processor-controlled devices 450. FIG. 44, for example, illustrates that the security algorithm 122 may entirely or partially operate within a set-top box ("STB") (452), a personal/digital video recorder (PVR/DVR) 454, a Global Positioning System (GPS) device 458, an interactive television 460, a tablet computer 462, or any computer system, communications device, or processor-controlled device utilizing the processor and/or a digital signal processor (DP/DSP) 464. The device 450 may also include watches, radios, vehicle electronics, clocks, printers, gateways, mobile/implantable medical devices, and other apparatuses and systems. Because the architecture and operating principles of the various devices 450 are well known, the hardware and software componentry of the various devices 450 are not further shown and described.

Exemplary embodiments may be physically embodied on or in a computer-readable storage medium. This computer-readable medium, for example, may include CD-ROM, DVD, tape, cassette, floppy disk, optical disk, memory card, memory drive, and large-capacity disks. This computer-readable medium, or media, could be distributed to end-subscribers, licensees, and assignees. A computer program product comprises processor-executable instructions for dynamic assignment of physical space, as the above paragraphs explained.

While the exemplary embodiments have been described with respect to various features, aspects, and embodiments, those skilled and unskilled in the art will recognize the exemplary embodiments are not so limited. Other variations, modifications, and alternative embodiments may be made without departing from the spirit and scope of the exemplary embodiments.

The invention claimed is:

1. A method, comprising:
   receiving, by a server, a notification specifying a wireless device requesting an access to a wireless network;
   determining, by the server, an identifier specifying the wireless network;
   determining, by the server, a physical space that is associated with the identifier specifying the wireless network; and
   assigning, by the server, the physical space to the wireless device requesting the access to the wireless network specified by the identifier.

2. The method of claim 1, further comprising determining the wireless device is associated with a group of wireless devices.

3. The method of claim 2, further comprising assigning the physical space to the group of wireless devices.

4. The method of claim 1, further comprising determining a cellular identifier specified by the wireless device requesting the access to the wireless network.

5. The method of claim 1, further comprising determining a cellular identifier specified by the notification.

6. The method of claim 1, further comprising generating a reservation associated with the physical space.

7. The method of claim 1, further comprising generating a reservation associated with the wireless device.

8. A system, comprising:
   a hardware processor; and
   a memory device, the memory device storing instructions, the instructions when executed causing the hardware processor to perform operations, the operations comprising:
   receiving a notification specifying a wireless device requesting an access to a wireless network;
   determining an identifier associated with the wireless network;
   determining a physical space that is associated with the identifier; and
   assigning the physical space to the wireless device requesting the access to the wireless network.

9. The system of claim 8, wherein the operations further comprise determining the wireless device is associated with a group of wireless devices.

10. The system of claim 9, wherein the operations further comprise assigning the physical space to the group of wireless devices.

11. The system of claim 8, wherein the operations further comprise determining a cellular identifier associated with the wireless device requesting the access to the wireless network.

12. The system of claim 8, wherein the operations further comprise determining a cellular identifier specified by the notification.

13. The system of claim 8, wherein the operations further comprise generating a reservation associated with the physical space.

14. The system of claim 8, wherein the operations further comprise generating a reservation associated with the wireless device.

15. A memory device storing instructions that when executed cause a processor to perform operations, the operations comprising:
   receiving a notification specifying a wireless device requesting an access to a wireless network;
   determining an identifier associated with the wireless network;
   determining a physical space that is associated with the identifier; and
   assigning the physical space to the wireless device requesting the access to the wireless network.

16. The memory device of claim 15, wherein the operations further comprise determining the wireless device is associated with a group of wireless devices.

17. The memory device of claim 16, wherein the operations further comprise assigning the physical space to the group of wireless devices.

18. The memory device of claim 15, wherein the operations further comprise determining a cellular identifier associated with the wireless device requesting the access to the wireless network.

19. The memory device of claim 15, wherein the operations further comprise determining a cellular identifier specified by the notification.

20. The memory device of claim 15, wherein the operations further comprise generating a reservation associated with the physical space.

\* \* \* \* \*